US007854654B2

(12) United States Patent
Baerlocher et al.

(10) Patent No.: US 7,854,654 B2
(45) Date of Patent: Dec. 21, 2010

(54) GAMING SYSTEM HAVING MULTIPLE GAMING MACHINES WHICH PROVIDE BONUS AWARDS

(75) Inventors: Anthony J. Baerlocher, Reno, NV (US); James A. Vasquez, Carson City, NV (US); Tonja M. Peterson, Reno, NV (US); Erick T. Ching, Reno, NV (US)

(73) Assignee: IGT, Reno, NV (US)

( * ) Notice: Subject to any disclaimer, the term of this patent is extended or adjusted under 35 U.S.C. 154(b) by 998 days.

(21) Appl. No.: 11/204,101

(22) Filed: Aug. 15, 2005

(65) Prior Publication Data

US 2006/0040732 A1 Feb. 23, 2006

Related U.S. Application Data

(60) Provisional application No. 60/603,144, filed on Aug. 19, 2004.

(51) Int. Cl.
*A63F 13/00* (2006.01)

(52) U.S. Cl. ............................ 463/27; 463/16; 463/17; 463/18; 463/19; 463/20; 463/25; 463/26

(58) Field of Classification Search ............ 463/16–20, 463/25–27

See application file for complete search history.

(56) References Cited

U.S. PATENT DOCUMENTS

| | | | |
|---|---|---|---|
| 2,942,574 | A | 6/1960 | Golay |
| 3,618,019 | A | 11/1971 | Nemirovsky |
| 3,998,309 | A | 12/1976 | Mandas et al. |
| 4,072,930 | A | 2/1978 | Lucero et al. |
| 4,238,127 | A | 12/1980 | Lucero et al. |
| 4,277,064 | A | 7/1981 | Newman |
| 4,283,709 | A | 8/1981 | Lucero et al. |
| 4,335,809 | A | 6/1982 | Wain |

(Continued)

FOREIGN PATENT DOCUMENTS

| | | |
|---|---|---|
| AU | 39363/78 | 3/1980 |

(Continued)

OTHER PUBLICATIONS

Court Ruling on Claim Construction in *Cynthia Jean Goff* v. *Harrah's Operating Company, Inc., et al.*, dated Dec. 30, 2005.

(Continued)

*Primary Examiner*—Peter DungBa Vo
*Assistant Examiner*—David Duffy
(74) *Attorney, Agent, or Firm*—K&L Gates LLP

(57) ABSTRACT

A gaming system including a central server linked to a plurality of gaming machines and a plurality of bonus awards. The central server monitors wagers on the gaming machines. Based at least in part on the wagers the central server determines when bonus events will occur and which gaming machine(s) will provide the bonus awards. In one embodiment, the central server determines which gaming machine will provide a primary bonus award and any secondary bonus awards. In one embodiment, the number of secondary bonus awards is determined based on the number of active gaming machines. The selected gaming machine then determines a component of or the amount of the bonus award to be provided to the gaming machine selected by the central server.

16 Claims, 23 Drawing Sheets

U.S. PATENT DOCUMENTS

| | | | |
|---|---|---|---|
| 4,409,656 | A | 10/1983 | Andersen et al. |
| 4,448,419 | A | 5/1984 | Telnaes |
| 4,494,197 | A | 1/1985 | Troy et al. |
| 4,573,681 | A | 3/1986 | Okada |
| 4,582,324 | A | 4/1986 | Koza et al. |
| 4,624,459 | A | 11/1986 | Kaufman |
| 4,636,951 | A | 1/1987 | Harlick |
| 4,652,998 | A | 3/1987 | Koza et al. |
| 4,657,256 | A | 4/1987 | Okada |
| 4,669,731 | A | 6/1987 | Clarke |
| 4,721,307 | A | 1/1988 | Okada |
| 4,743,024 | A | 5/1988 | Helm et al. |
| 4,760,527 | A | 7/1988 | Sidley |
| 4,764,666 | A | 8/1988 | Bergeron |
| 4,772,023 | A | 9/1988 | Okada |
| 4,775,155 | A | 10/1988 | Lees |
| 4,805,907 | A | 2/1989 | Hagiwara |
| 4,837,728 | A | 6/1989 | Barrie et al. |
| 4,842,278 | A | 6/1989 | Markowicz |
| 4,856,787 | A | 8/1989 | Itkis |
| 4,871,171 | A | 10/1989 | Rivero |
| 4,880,237 | A | 11/1989 | Kishishita |
| 4,926,327 | A | 5/1990 | Sidley |
| 4,964,638 | A | 10/1990 | Ishida |
| 4,991,848 | A | 2/1991 | Greenwood et al. |
| 5,016,880 | A | 5/1991 | Berge |
| 5,038,022 | A | 8/1991 | Lucero |
| 5,048,833 | A | 9/1991 | Lamle |
| 5,074,559 | A | 12/1991 | Okada |
| 5,116,055 | A | 5/1992 | Tracy |
| 5,123,649 | A | 6/1992 | Tiberio |
| 5,127,651 | A | 7/1992 | Okada |
| 5,158,293 | A | 10/1992 | Mullins |
| 5,178,390 | A | 1/1993 | Okada |
| 5,209,479 | A | 5/1993 | Nagao |
| 5,217,224 | A | 6/1993 | Sincock |
| 5,249,800 | A | 10/1993 | Hilgendorf et al. |
| 5,259,616 | A | 11/1993 | Bergmann |
| 5,265,874 | A | 11/1993 | Dickinson et al. |
| 5,275,400 | A | 1/1994 | Weingardt |
| 5,276,312 | A | 1/1994 | McCarthy |
| 5,277,424 | A | 1/1994 | Wilms |
| 5,280,909 | A | 1/1994 | Tracy |
| 5,282,620 | A | 2/1994 | Keesee |
| 5,286,023 | A | 2/1994 | Wood |
| 5,292,127 | A | 3/1994 | Kelly et al. |
| 5,321,241 | A | 6/1994 | Craine |
| 5,324,035 | A | 6/1994 | Morris et al. |
| 5,326,104 | A | 7/1994 | Pease et al. |
| 5,342,047 | A | 8/1994 | Heidel et al. |
| 5,342,049 | A | 8/1994 | Wichinsky et al. |
| 5,344,144 | A | 9/1994 | Canon |
| 5,351,970 | A | 10/1994 | Fioretti |
| 5,377,993 | A | 1/1995 | Josephs |
| 5,380,008 | A | 1/1995 | Mathis et al. |
| 5,393,057 | A | 2/1995 | Marnell, II |
| 5,398,932 | A | 3/1995 | Eberhardt et al. |
| 5,401,024 | A | 3/1995 | Simunek |
| 5,417,430 | A | 5/1995 | Breeding |
| 5,423,539 | A | 6/1995 | Nagao |
| 5,429,361 | A | 7/1995 | Raven et al. |
| 5,456,465 | A | 10/1995 | Durham |
| 5,470,079 | A | 11/1995 | LeStrange et al. |
| 5,472,194 | A | 12/1995 | Breeding et al. |
| 5,476,259 | A | 12/1995 | Weingardt |
| 5,489,101 | A | 2/1996 | Moody |
| 5,507,489 | A | 4/1996 | Reibel et al. |
| 5,511,781 | A | 4/1996 | Wood |
| 5,524,888 | A | 6/1996 | Heidel |
| 5,536,016 | A | 7/1996 | Thompson |
| 5,544,893 | A | 8/1996 | Jones et al. |
| 5,547,192 | A | 8/1996 | Ishibashi |
| 5,560,603 | A | 10/1996 | Seeling et al. |
| 5,564,700 | A | 10/1996 | Celona |
| 5,566,337 | A | 10/1996 | Szymanski |
| 5,570,885 | A | 11/1996 | Ornstein |
| 5,580,053 | A | 12/1996 | Crouch |
| 5,580,309 | A | 12/1996 | Piechowiak et al. |
| 5,584,763 | A | 12/1996 | Kelly et al. |
| 5,601,487 | A | 2/1997 | Oshima |
| 5,605,506 | A | 2/1997 | Hoorn et al. |
| 5,611,535 | A | 3/1997 | Tiberio |
| 5,611,730 | A | 3/1997 | Weiss |
| 5,626,341 | A | 5/1997 | Jones |
| 5,641,050 | A | 6/1997 | Smith et al. |
| 5,645,486 | A | 7/1997 | Nagao et al. |
| 5,655,961 | A | 8/1997 | Acres et al. |
| 5,674,128 | A | 10/1997 | Holch et al. |
| 5,702,304 | A | 12/1997 | Acres et al. |
| 5,707,285 | A | 1/1998 | Place et al. |
| 5,707,286 | A | 1/1998 | Carlson |
| 5,722,891 | A | 3/1998 | Inoue |
| 5,732,948 | A | 3/1998 | Yoseloff |
| 5,741,183 | A | 4/1998 | Acres et al. |
| 5,743,800 | A | 4/1998 | Huard et al. |
| 5,752,882 | A | 5/1998 | Acres et al. |
| 5,761,647 | A | 6/1998 | Boushy |
| 5,762,552 | A | 6/1998 | Vuong |
| 5,766,076 | A | 6/1998 | Pease et al. |
| 5,769,716 | A | 6/1998 | Saffari et al. |
| 5,772,511 | A | 6/1998 | Smeltzer |
| RE35,864 | E | 7/1998 | Weingardt |
| 5,779,545 | A | 7/1998 | Berg et al. |
| 5,779,547 | A | 7/1998 | SoRelle et al. |
| 5,779,549 | A | 7/1998 | Walker et al. |
| 5,788,573 | A | 8/1998 | Baerlocher et al. |
| 5,800,269 | A | 9/1998 | Holch et al. |
| 5,806,855 | A | 9/1998 | Cherry |
| 5,807,172 | A | 9/1998 | Piechowiak |
| 5,816,918 | A | 10/1998 | Kelly et al. |
| 5,820,459 | A | 10/1998 | Acres et al. |
| 5,823,874 | A | 10/1998 | Adams |
| 5,833,537 | A | 11/1998 | Barrie |
| 5,833,538 | A | 11/1998 | Weiss |
| 5,833,540 | A | 11/1998 | Miodunski et al. |
| 5,836,817 | A | 11/1998 | Acres et al. |
| 5,848,932 | A | 12/1998 | Adams |
| 5,851,011 | A | 12/1998 | Lott |
| 5,851,148 | A | 12/1998 | Brune et al. |
| 5,851,149 | A | 12/1998 | Xidos et al. |
| 5,855,514 | A | 1/1999 | Kamille |
| 5,855,515 | A | 1/1999 | Pease et al. |
| 5,876,284 | A | 3/1999 | Acres et al. |
| 5,885,158 | A | 3/1999 | Torango et al. |
| 5,902,184 | A | 5/1999 | Bennett |
| 5,902,983 | A | 5/1999 | Crevelt et al. |
| 5,910,048 | A | 6/1999 | Feinberg |
| 5,919,088 | A | 7/1999 | Weiss |
| 5,941,773 | A | 8/1999 | Harlick |
| 5,944,606 | A | 8/1999 | Gerow |
| 5,947,820 | A | 9/1999 | Morro et al. |
| 5,947,822 | A | 9/1999 | Weiss |
| 5,951,011 | A | 9/1999 | Potter et al. |
| 5,970,143 | A | 10/1999 | Schneier et al. |
| 5,980,384 | A | 11/1999 | Barrie |
| 5,984,779 | A | 11/1999 | Bridgeman et al. |
| 5,989,121 | A | 11/1999 | Sakamoto |
| 5,993,316 | A | 11/1999 | Coyle et al. |
| 5,997,400 | A | 12/1999 | Seelig et al. |
| 6,001,016 | A | 12/1999 | Walker et al. |
| 6,004,207 | A | 12/1999 | Wilson, Jr. et al. |
| 6,007,427 | A | 12/1999 | Wiener. |
| 6,012,982 | A | 1/2000 | Piechowiak et al. |
| 6,012,983 | A | 1/2000 | Walker et al. |

| | | | |
|---|---|---|---|
| 6,015,346 | A | 1/2000 | Bennett |
| 6,030,288 | A | 2/2000 | Davis et al. |
| 6,039,648 | A | 3/2000 | Guinn et al. |
| 6,039,649 | A | 3/2000 | Schulze |
| 6,048,269 | A | 4/2000 | Burns et al. |
| 6,050,895 | A | 4/2000 | Luciano et al. |
| 6,056,642 | A | 5/2000 | Bennett |
| 6,059,289 | A | 5/2000 | Vancura |
| 6,068,553 | A | 5/2000 | Parker |
| 6,077,162 | A | 6/2000 | Weiss |
| 6,080,062 | A | 6/2000 | Olson |
| 6,089,976 | A | 7/2000 | Schneider et al. |
| 6,089,977 | A | 7/2000 | Bennett |
| 6,089,978 | A | 7/2000 | Adams |
| 6,089,980 | A | 7/2000 | Gauselmann |
| 6,099,408 | A | 8/2000 | Schneier et al. |
| 6,110,041 | A | 8/2000 | Walker et al. |
| 6,110,043 | A | 8/2000 | Olsen |
| 6,117,013 | A | 9/2000 | Eiba |
| 6,135,884 | A | 10/2000 | Hedrick et al. |
| 6,142,872 | A | 11/2000 | Walker et al. |
| 6,146,270 | A | 11/2000 | Huard et al. |
| 6,146,273 | A | 11/2000 | Olsen |
| 6,149,521 | A | 11/2000 | Sanduski |
| 6,152,823 | A | 11/2000 | Lacoste et al. |
| 6,155,925 | A | 12/2000 | Giobbi et al. |
| 6,159,097 | A | 12/2000 | Gura |
| 6,159,098 | A | 12/2000 | Slomiany et al. |
| 6,162,121 | A | 12/2000 | Morro et al. |
| 6,162,122 | A | 12/2000 | Acres et al. |
| 6,167,523 | A | 12/2000 | Strong |
| 6,168,520 | B1 | 1/2001 | Baerlocher et al. |
| 6,183,366 | B1 | 2/2001 | Goldberg et al. |
| 6,186,894 | B1 | 2/2001 | Mayeroff |
| 6,190,255 | B1 | 2/2001 | Thomas et al. |
| 6,203,010 | B1 | 3/2001 | Jorasch et al. |
| 6,203,430 | B1 | 3/2001 | Walker et al. |
| 6,206,374 | B1 | 3/2001 | Jones |
| 6,210,275 | B1 | 4/2001 | Olsen |
| 6,210,277 | B1 | 4/2001 | Stefan |
| 6,217,448 | B1 | 4/2001 | Olsen |
| 6,224,482 | B1 | 5/2001 | Bennett |
| 6,224,483 | B1 | 5/2001 | Mayeroff |
| 6,224,484 | B1 | 5/2001 | Okuda et al. |
| 6,231,442 | B1 | 5/2001 | Mayeroff |
| 6,231,445 | B1 | 5/2001 | Acres |
| 6,234,896 | B1 | 5/2001 | Walker et al. |
| 6,238,288 | B1 | 5/2001 | Walker et al. |
| 6,241,608 | B1 | 6/2001 | Torango |
| 6,244,958 | B1 | 6/2001 | Acres |
| 6,254,483 | B1 | 7/2001 | Acres |
| 6,257,981 | B1 | 7/2001 | Acres et al. |
| 6,264,557 | B1 | 7/2001 | Schneier et al. |
| 6,270,409 | B1 | 8/2001 | Shuster |
| 6,287,194 | B1 | 9/2001 | Okada et al. |
| 6,287,202 | B1 | 9/2001 | Pascal et al. |
| 6,293,866 | B1 | 9/2001 | Walker et al. |
| RE37,414 | E | 10/2001 | Harlick |
| 6,302,790 | B1 | 10/2001 | Brossard |
| 6,302,793 | B1 | 10/2001 | Fertitta, III et al. |
| 6,302,794 | B1 | 10/2001 | Ogawa |
| 6,309,298 | B1 | 10/2001 | Gerow |
| 6,309,300 | B1 | 10/2001 | Glavich |
| 6,311,976 | B1 | 11/2001 | Yoseloff et al. |
| 6,312,330 | B1 | 11/2001 | Jones et al. |
| 6,312,333 | B1 | 11/2001 | Acres |
| 6,315,662 | B1 | 11/2001 | Jorasch et al. |
| 6,319,122 | B1 | 11/2001 | Packes, Jr. et al. |
| 6,319,125 | B1 | 11/2001 | Acres |
| 6,328,649 | B1 | 12/2001 | Randall et al. |
| 6,334,814 | B1 | 1/2002 | Adams |
| 6,336,857 | B1 | 1/2002 | McBride |
| 6,340,158 | B2 | 1/2002 | Pierce et al. |
| 6,346,043 | B1 | 2/2002 | Colin et al. |
| 6,347,738 | B1 | 2/2002 | Crevelt et al. |
| 6,347,996 | B1 | 2/2002 | Gilmore et al. |
| 6,358,147 | B1 | 3/2002 | Jaffe et al. |
| 6,358,149 | B1 | 3/2002 | Schneider et al. |
| 6,361,441 | B1 | 3/2002 | Walker et al. |
| 6,364,766 | B1 | 4/2002 | Anderson et al. |
| 6,364,768 | B1 | 4/2002 | Acres et al. |
| 6,364,769 | B1 | 4/2002 | Weiss et al. |
| 6,371,852 | B1 | 4/2002 | Acres |
| 6,375,567 | B1 | 4/2002 | Acres |
| 6,375,568 | B1 | 4/2002 | Roffman et al. |
| 6,375,569 | B1 | 4/2002 | Acres |
| 6,398,218 | B1 | 6/2002 | Vancura |
| 6,406,369 | B1 | 6/2002 | Baerlocher et al. |
| 6,416,408 | B2 | 7/2002 | Tracy et al. |
| 6,416,409 | B1 | 7/2002 | Jordan |
| 6,419,579 | B1 | 7/2002 | Bennett |
| 6,419,583 | B1 | 7/2002 | Crumby et al. |
| 6,428,412 | B1 | 8/2002 | Anderson et al. |
| 6,431,983 | B2 | 8/2002 | Acres |
| 6,435,511 | B1 | 8/2002 | Vancura et al. |
| 6,435,968 | B1 | 8/2002 | Torango |
| 6,454,651 | B1 | 9/2002 | Yoseloff |
| RE37,885 | E | 10/2002 | Acres et al. |
| 6,461,241 | B1 | 10/2002 | Webb et al. |
| 6,471,208 | B2 | 10/2002 | Yoseloff et al. |
| 6,481,713 | B2 | 11/2002 | Perrie et al. |
| 6,511,376 | B2 | 1/2003 | Walker et al. |
| 6,533,664 | B1 | 3/2003 | Crumby |
| 6,537,150 | B1 | 3/2003 | Luciano et al. |
| 6,546,134 | B1 | 4/2003 | Shrairman et al. |
| 6,546,374 | B1 | 4/2003 | Esposito et al. |
| 6,547,131 | B1 | 4/2003 | Foodman et al. |
| 6,554,705 | B1 | 4/2003 | Cumbers |
| 6,561,904 | B2 | 5/2003 | Locke et al. |
| 6,565,434 | B1 | 5/2003 | Acres |
| 6,569,015 | B1 | 5/2003 | Baerlocher et al. |
| 6,572,471 | B1 | 6/2003 | Bennett |
| 6,575,832 | B1 | 6/2003 | Manfredi et al. |
| 6,589,115 | B2 | 7/2003 | Walker et al. |
| 6,592,460 | B2 | 7/2003 | Torango |
| 6,595,853 | B1 | 7/2003 | Osawa |
| 6,599,185 | B1 | 7/2003 | Kaminkow et al. |
| 6,599,190 | B2 | 7/2003 | Osawa |
| 6,599,193 | B2 | 7/2003 | Baerlocher et al. |
| 6,607,438 | B2 | 8/2003 | Baerlocher et al. |
| 6,607,441 | B1 | 8/2003 | Acres |
| 6,609,973 | B1 | 8/2003 | Weiss |
| 6,620,046 | B2 | 9/2003 | Rowe |
| 6,626,758 | B1 | 9/2003 | Parham et al. |
| 6,634,944 | B2 | 10/2003 | Osawa |
| 6,637,747 | B1 | 10/2003 | Garrod |
| 6,645,074 | B2 | 11/2003 | Thomas et al. |
| 6,645,077 | B2 | 11/2003 | Rowe |
| 6,648,759 | B2 | 11/2003 | Vancura |
| 6,648,762 | B2 | 11/2003 | Walker et al. |
| 6,656,047 | B1 | 12/2003 | Tarantino et al. |
| 6,656,048 | B2 | 12/2003 | Olsen |
| 6,656,052 | B2 | 12/2003 | Abramopoulos et al. |
| 6,672,959 | B2 | 1/2004 | Moody et al. |
| 6,675,152 | B1 | 1/2004 | Prasad et al. |
| 6,682,419 | B2 | 1/2004 | Webb et al. |
| 6,682,420 | B2 | 1/2004 | Webb et al. |
| 6,682,421 | B1 | 1/2004 | Rowe et al. |
| 6,692,355 | B2 | 2/2004 | Baerlocher et al. |
| 6,702,674 | B1 | 3/2004 | De Bruin et al. |
| 6,712,695 | B2 | 3/2004 | Mothwurf et al. |
| 6,712,697 | B2 | 3/2004 | Acres |
| 6,719,630 | B1 | 4/2004 | Seelig et al. |
| 6,733,389 | B2 | 5/2004 | Webb et al. |
| 6,746,328 | B2 | 6/2004 | Cannon et al. |
| 6,749,510 | B2 | 6/2004 | Giobbi |

6,754,346 B2 6/2004 Eiserling et al.
6,761,632 B2 7/2004 Bansemer et al.
6,776,714 B2 8/2004 Ungaro et al.
6,776,715 B2 8/2004 Price
6,780,111 B2 8/2004 Cannon et al.
6,786,819 B2 9/2004 Baerlocher et al.
6,790,141 B2 9/2004 Muir
6,793,578 B2 9/2004 Luccesi et al.
6,800,026 B2 10/2004 Cannon
6,800,030 B2 10/2004 Acres
6,805,352 B2 10/2004 Hunter
6,811,483 B1 11/2004 Webb et al.
6,832,956 B1 12/2004 Boyd et al.
6,832,958 B2 12/2004 Acres et al.
6,837,788 B2 1/2005 Cannon
6,857,958 B2 2/2005 Osawa
6,869,361 B2 3/2005 Sharpless et al.
6,887,154 B1 5/2005 Luciano, Jr. et al.
6,889,849 B2 5/2005 Heidel et al.
6,899,625 B2 5/2005 Luciano, Jr. et al.
6,908,387 B2 6/2005 Hedrick et al.
6,910,964 B2 6/2005 Acres
6,916,245 B1 * 7/2005 Vancura et al. ............... 463/26
6,918,832 B2 7/2005 Baerlocher et al.
6,918,834 B2 7/2005 Vancura
6,932,707 B2 8/2005 Duhamel
6,935,951 B2 8/2005 Paulsen et al.
6,935,958 B2 8/2005 Nelson
6,939,234 B2 9/2005 Beatty
6,942,574 B1 9/2005 LeMay et al.
RE38,812 E 10/2005 Acres et al.
6,966,834 B1 11/2005 Johnson
6,981,917 B2 1/2006 Webb et al.
6,984,173 B1 1/2006 Piechowiak et al.
7,029,395 B1 4/2006 Baerlocher
7,056,215 B1 6/2006 Olive
7,156,741 B2 1/2007 Hornik et al.
2001/0024971 A1 9/2001 Brossard
2001/0049303 A1 12/2001 Found
2001/0055990 A1 12/2001 Acres
2002/0002674 A1 1/2002 Grimes et al.
2002/0010018 A1 * 1/2002 Lemay et al. ................ 463/20
2002/0071557 A1 6/2002 Nguyen
2002/0116615 A1 8/2002 Nguyen et al.
2002/0138594 A1 9/2002 Rowe
2002/0152120 A1 10/2002 Howington
2002/0165023 A1 11/2002 Brosnan et al.
2002/0187834 A1 12/2002 Rowe et al.
2003/0027625 A1 2/2003 Rowe
2003/0027630 A1 2/2003 Kelly et al.
2003/0045350 A1 3/2003 Baerlocher et al.
2003/0045353 A1 3/2003 Paulsen et al.
2003/0050111 A1 3/2003 Saffari
2003/0054878 A1 3/2003 Benoy et al.
2003/0060266 A1 3/2003 Baerlocher
2003/0060269 A1 3/2003 Paulsen et al.
2003/0060279 A1 3/2003 Torango
2003/0083943 A1 5/2003 Adams at al.
2003/0092484 A1 5/2003 Schneider et al.
2003/0144965 A1 7/2003 Prasad et al.
2003/0182574 A1 9/2003 Whitten et al.
2003/0199321 A1 10/2003 Williams
2003/0211879 A1 11/2003 Englman
2003/0222402 A1 12/2003 Olive
2003/0223803 A1 12/2003 De Schrijver
2003/0228904 A1 12/2003 Acres et al.
2003/0228912 A1 12/2003 Wells et al.
2003/0232647 A1 12/2003 Moser
2004/0009811 A1 1/2004 Torango
2004/0072615 A1 4/2004 Maya et al.
2004/0087368 A1 5/2004 Gavselmann
2004/0176161 A1 9/2004 Shelby et al.
2004/0219962 A1 11/2004 Vancura
2004/0235552 A1 11/2004 Gauselmann
2004/0242297 A1 12/2004 Walker
2005/0012818 A1 1/2005 Kiely et al.
2005/0026694 A1 2/2005 Kelly et al.
2005/0032573 A1 2/2005 Acres et al.
2005/0059467 A1 3/2005 Saffari et al.
2005/0070353 A1 3/2005 Webb et al.
2005/0070356 A1 3/2005 Mothwurf
2005/0079908 A1 4/2005 Pacey
2005/0079911 A1 4/2005 Nakatsu
2005/0086478 A1 4/2005 Pienado et al.
2005/0096125 A1 5/2005 LeMay et al.
2005/0101374 A1 5/2005 Acres
2005/0101375 A1 5/2005 Webb et al.
2005/0101384 A1 5/2005 Parham
2005/0119047 A1 6/2005 Olive
2005/0143168 A1 6/2005 Torango
2005/0143169 A1 6/2005 Nguyen et al.
2005/0159211 A1 7/2005 Englman
2005/0163377 A1 7/2005 Walch
2005/0176488 A1 8/2005 Olive
2005/0178716 A1 8/2005 Suri
2005/0192083 A1 9/2005 Iwamoto
2005/0192099 A1 9/2005 Nguyen et al.
2005/0209004 A1 9/2005 Torango
2005/0239542 A1 10/2005 Olsen
2005/0267610 A1 12/2005 Shinoda
2005/0282626 A1 12/2005 Manfredi et al.
2005/0282629 A1 12/2005 Gagner
2006/0003829 A1 1/2006 Thomas
2006/0009285 A1 1/2006 Pryzby et al.
2006/0025210 A1 2/2006 Johnson
2006/0026604 A1 2/2006 Tan et al.
2006/0030397 A1 2/2006 Chan
2006/0030403 A1 2/2006 Lafky et al.
2006/0035694 A1 2/2006 Fuller
2006/0035705 A1 2/2006 Jordan et al.
2006/0035706 A1 2/2006 Thomas et al.
2006/0036552 A1 2/2006 Gunyakti et al.
2006/0040732 A1 2/2006 Baerlocher et al.
2006/0052159 A1 3/2006 Cahill et al.
2006/0052161 A1 3/2006 Soukup et al.
2006/0052162 A1 3/2006 Soukup et al.
2006/0068897 A1 3/2006 Sanford et al.
2006/0073887 A1 4/2006 Nguyen et al.
2006/0073889 A1 4/2006 Edidin et al.
2006/0073897 A1 4/2006 Englman et al.
2006/0116201 A1 6/2006 Gauselmann
2006/0154718 A1 7/2006 Willyard et al.
2006/0183537 A1 8/2006 Dickerson
2006/0183538 A1 8/2006 Michaelson et al.
2006/0287077 A1 12/2006 Grav et al.
2007/0015585 A1 1/2007 Sartini et al.
2007/0060316 A1 3/2007 O'Halloran
2007/0060319 A1 3/2007 Block et al.
2007/0129131 A1 6/2007 Kaminkow et al.
2007/0202943 A1 8/2007 Thomas
2008/0020842 A1 1/2008 Kaminkow et al.
2008/0214263 A1 9/2008 Walker et al.

FOREIGN PATENT DOCUMENTS

AU 198166683 8/1981
AU 524709 9/1982
AU 542455 2/1985
AU 555905 10/1986
AU 567001 11/1987
AU 585160 6/1989
AU 630112 9/1989
AU 589158 10/1989
AU 593059 2/1990
AU 630112 3/1990
AU B-42326/89 3/1990

| | | | |
|---|---|---|---|
| AU | 628330 | | 9/1992 |
| AU | 633469 | | 1/1993 |
| AU | B 199220986 | | 1/1993 |
| AU | 667210 | | 2/1993 |
| AU | 680920 | | 2/1994 |
| AU | 649009 | | 5/1994 |
| AU | 656302 | | 8/1994 |
| AU | 655801 | | 1/1995 |
| AU | 70247/96 | | 4/1997 |
| AU | 704365 | | 6/1997 |
| AU | 704372 | | 6/1997 |
| AU | PO 7780 | | 7/1997 |
| AU | 680920 | | 8/1997 |
| AU | PO 9090 | | 9/1997 |
| AU | PO 9102 | | 9/1997 |
| AU | A-50327/96 | | 10/1997 |
| AU | 690499 | | 1/1998 |
| AU | 199662115 | | 2/1998 |
| AU | 722902 | | 6/1998 |
| AU | 680602 | | 7/1998 |
| AU | 199743615 | | 7/1998 |
| AU | 755826 | | 8/1998 |
| AU | 733963 | | 9/1998 |
| AU | A-63553/98 | | 10/1998 |
| AU | 743079 | | 11/1998 |
| AU | 738686 | | 3/1999 |
| AU | 199884162 | A1 | 3/1999 |
| AU | 736679 | | 5/1999 |
| AU | 707687 | | 7/1999 |
| AU | 714299 | | 8/1999 |
| AU | 709724 | | 9/1999 |
| AU | 768285 | | 9/1999 |
| AU | 199917318 | A1 | 9/1999 |
| AU | 711501 | | 10/1999 |
| AU | 746082 | | 10/1999 |
| AU | 756180 | | 10/1999 |
| AU | 753102 | | 11/1999 |
| AU | 765084 | | 11/1999 |
| AU | 760617 | | 1/2000 |
| AU | 716299 | | 2/2000 |
| AU | 721968 | | 7/2000 |
| AU | 722107 | | 7/2000 |
| AU | 728788 | | 1/2001 |
| AU | 744569 | | 3/2001 |
| AU | 771847 | | 3/2001 |
| AU | 2001 1000032 | B4 | 11/2001 |
| AU | 2001 1000033 | B4 | 11/2001 |
| AU | 748263 | | 5/2002 |
| AU | 749222 | | 6/2002 |
| AU | 754689 | | 11/2002 |
| AU | 758306 | | 3/2003 |
| AU | 199943453 | C | 4/2003 |
| BR | 9300123 | | 8/1994 |
| DE | 34 15 114 | | 10/1985 |
| DE | 3415114 | | 11/1985 |
| DE | 3917683 | | 12/1990 |
| DE | 4200254 | | 8/1993 |
| EP | 0 342 797 | | 11/1989 |
| EP | 0 444 932 | | 2/1991 |
| EP | 0 420 586 | | 4/1991 |
| EP | 0 433 420 | | 1/1995 |
| EP | 0 770 415 | | 2/1997 |
| EP | 0 798 676 | A1 | 10/1997 |
| EP | 0 874 337 | A1 | 10/1998 |
| EP | 0 952 563 | | 2/1999 |
| EP | 0 926 645 | A2 | 6/1999 |
| EP | 0 944 030 | A2 | 9/1999 |
| EP | 1 637 196 | B1 | 9/2004 |
| EP | 1 467 329 | A2 | 10/2004 |
| EP | 1 498 860 | A1 | 1/2005 |
| EP | 1 513 114 | A2 | 3/2005 |
| EP | 1 528 516 | A2 | 5/2005 |
| EP | 1 528 517 | A2 | 5/2005 |
| GB | 2 072 395 | | 9/1981 |
| GB | 2 083 936 | | 3/1982 |
| GB | 2 151 054 | | 10/1983 |
| GB | 2118445 | | 11/1983 |
| GB | 2 142 457 | | 6/1984 |
| GB | 2 137 392 | A | 10/1984 |
| GB | 2 139 390 | | 11/1984 |
| GB | 2 147 773 | | 5/1985 |
| GB | 2 148 135 | | 5/1985 |
| GB | 2 153 572 | A | 8/1985 |
| GB | 2 180 087 | | 3/1987 |
| GB | 2 191 030 | | 12/1987 |
| GB | 2 201 821 | | 9/1988 |
| GB | 2 211 975 | | 12/1989 |
| GB | 2 230 373 | | 10/1990 |
| GB | 2231189 | | 11/1990 |
| GB | 2 262 642 | | 6/1993 |
| GB | 2 282 690 | | 4/1995 |
| GB | 2 328 311 | | 2/1999 |
| GB | 2 387 703 | | 10/2003 |
| JP | 05-184709 | | 7/1993 |
| JP | 06-335560 | | 12/1994 |
| JP | 7148307 | | 6/1995 |
| JP | 09-192289 | | 7/1997 |
| JP | 09-248384 | | 9/1997 |
| JP | 10-033829 | | 2/1998 |
| WO | WO 80/02512 | | 11/1980 |
| WO | WO 94/12256 | | 6/1994 |
| WO | WO 95/22811 | | 8/1995 |
| WO | WO 95/30944 | | 11/1995 |
| WO | WO 96/12262 | | 4/1996 |
| WO | WO 96/24421 | | 8/1996 |
| WO | WO 97/12315 | | 4/1997 |
| WO | WO 97 12338 | | 4/1997 |
| WO | WO 97/27568 | | 7/1997 |
| WO | WO 98/07484 | | 2/1998 |
| WO | WO 98/18532 | | 5/1998 |
| WO | WO 98/35309 | | 8/1998 |
| WO | WO 98/47115 | | 10/1998 |
| WO | WO 98/51384 | | 11/1998 |
| WO | WO 99/03078 | | 1/1999 |
| WO | WO 99/10849 | | 3/1999 |
| WO | WO 99/60498 | | 11/1999 |
| WO | WO 00/03775 | | 1/2000 |
| WO | WO 00/12186 | | 3/2000 |
| WO | WO 00/32286 | | 6/2000 |
| WO | WO 01/10523 | | 2/2001 |
| WO | WO 01/15055 | | 3/2001 |
| WO | WO 01/15790 | A1 | 3/2001 |
| WO | WO 02/052515 | | 7/2002 |
| WO | PCT/US02/30858 | | 4/2003 |
| WO | WO 03/063019 | A1 | 7/2003 |
| WO | WO 03/075235 | | 9/2003 |
| WO | WO 2004/035161 | | 4/2004 |
| WO | WO 2004/066061 | A2 | 8/2004 |
| WO | WO 2005/027058 | | 3/2005 |
| WO | WO 2005 076193 | | 8/2005 |
| WO | WO 2005/081623 | A2 | 9/2005 |
| WO | WO 2005/083599 | A1 | 9/2005 |
| WO | WO 2005/099425 | A2 | 10/2005 |
| WO | WO 2005/099845 | A1 | 10/2005 |
| WO | WO 2005/106702 | | 11/2005 |
| WO | WO 2005 113093 | | 12/2005 |
| WO | WO 2006/014770 | | 2/2006 |
| WO | WO 2006/014833 | | 2/2006 |
| WO | WO 2006/014990 | | 2/2006 |
| WO | WO 2006 039366 | | 4/2006 |

WO WO 2006/130597 A2 5/2006

OTHER PUBLICATIONS

Statutory Declaration of John Boris Golja from Australian Patent Application 754689 in the name of Aristocrat Technologies Australia Pty Ltd. and Opposition thereto by Acres Gaming, Inc., dated May 21, 2004.
Statutory Declaration of Phillip Charles Dimond, from Australian Patent Application 754689 in the name of Aristocrat Technologies Australia Pty Ltd. and Opposition thereto by Acres Gaming, Inc., dated Mar. 2, 2005.
Statutory Declaration of Scott Olive, from In the matter of Aristocrat Technologies Australia Pty Ltd. Opposition to Patent Application 765084 Acres Gaming Inc., dated May 9, 2005.
Statement of Grounds and Particulars in Support of Opposition, from Australian Patent Application 754689 in the name of Aristocrat Technologies Australia Pty Ltd. and Opposition thereto by Acres Gaming, Inc., dated May 21, 2003.
Surprize Gaming Machine Advertisement, written by Aristocrat Leisure Industries, Australia, published prior to 2004.
Surprize Software Specification for MV2030—var 01, written by Aristocrat Leisure Industries, Australia, published prior to 2004.
U.S. Appl. No. 60/035,513 by Torango and Lannoy, filed Jan. 15, 1997 and referenced by U.S. Patent Nos. 6,435,968, 6,241,608 and 6,592,460.
U.S. Appl. No. 60/040,982 by Torango and Lannoy, filed Mar. 17, 1997 and referenced by U.S. Patent Nos. 6,435,968, 6,241,608 and 6,592,460.
U.S. Appl. No. 60/050,971 by Torango and Lannoy, filed Jun. 19, 1997 and referenced by U.S. Patent Nos. 6,435,968, 6,241,608 and 6,592,460.
Catalogue of Champions Advertisement, written by Aristocrat, published in 1990.
Fast Buck Systems Manual, written by International Game Technology, available to Mirage shift supervisors at least as early as May 30, 1990.
Integrated Real Time On-Line Slot System—SDI, written by GRIPS Electronic GmbH, printed from website reported as archived on Feb. 20, 1997 (available at http://web.archive.org/web/19970220165559/www.grips.com/sdi.htm).
Lemons, Cherries and Bell-Fruit-Gum, pp. 1 to 4 and 304 to 314, written by Bueschel, published in Royal Bell Books in Nov. 1995.
PEM—Precision Electronic Meter, written by GRIPS Electronic GmbH, printed from website reported as archived on Feb. 20, 1997 (available at http://web.archive.org/web/19970220165753/www.grips.com/pem.htm).
Player Tracking on Slots, written by GRIPS Electronic GmbH, printed from website reported as archived on Feb. 20, 1997 (available at http://web.archive.org/web/19970220165921/www.grips.com/playtrac.htm).
Mikohn Product Catalog, Chapters 1, 2, 6, 7 and 8, written by Mikohn, published in Jan. 1993.
ProLINK Progressive Controller User/Reference Manual, written by Casino Data Systems, published in Apr. 1997.
Mikohn Supper Controller Manual, Chapters 1 to 3 and 6 to 7, written by Mikohn, published in 1989.
Wide Area Progressive Link System, written by GRIPS Electronic GmbH, printed from website reported as archived on Feb. 20, 1997 (available at http://web.archive.org/web/19970220165457/www.grips.com/wap.htm).
Federal Court of Australia, *Neurizon Pty Ltd* v. *Jupiter's Ltd* [2004] FCA 1012 (including description of Activdata gaming system), dated Oct. 21, 2004.
Federal Court of Australia, *Jupiter's Ltd* v. *Neurizon Pty Ltd* [2005] FCAFC 90 (including description of Activadata gaming system), dated May 26, 2005.
Federal Court of Australia, *Neurizon Pty Ltd*. v. *LTH Consulting and Marketing Services Pty. Ltd*. [2002] FCA 1547 (including description of Mega Gold System), dated Dec. 13, 2002.
*Aristocrat Technologies Australia Pty. Ltd*. v. *IGT* (Australia) [2007] FCA 37, dated Feb. 7, 2007.
Office Action for U.S. Appl. No. 11/204,214 dated May 28, 2009.
Defendant ATA's Supplemental Response to Plaintiff's Interrogatory No. 1, dated Aug. 2, 2005.
Defendant ATA's Supplement Response to Plaintiff's Interrogatory No. 1, dated Dec. 14, 2004.
Defendant ATA's Response to Plaintiff's First Set of Interrogatories (Nos. 1-3), dated Oct. 27, 2004.
Atronic Systems Progressive Products at G2E, published by Atronic in 2004, printed from ForRelease.com
Aristocrat Money Train II Advertisement, written by Aristocrat, published in 2004.
Diamond Fives Buy-A-Pay Bonus Spin Advertisement, written by IGT, published in 1999.
M-Slot Series Primary Reel Product description from Lemons, Cherries and Bell-Fruit-Gum, written by Richard M. Bueschel, published in 1995, pp. 3, 4 and 304-314.
Action Jackpot's Advertisement, written by Atronic Casino Technology, published in Casino Journal, (Oct. 1996).
Acres Bonusing System User Manual, Version 4.3, 351 pp. (Feb. 15, 2000).
Action Jackpot's Brochure, written by Atronic Casino Technology, available prior to Aug. 2005.
Aristocrat Leisure Industries, written by Legato, published in Casino Journal, vol. 10, No. 1, pp. 87-89 (Jan. 1997).
Atronic Casino Technology, written by Legato, published in Casino Journal, vol. 10, No. 9, 3 pp. (Sep. 1997).
Australia/New Zealand Gaming Machine National Standards, Revision 1.0, 127 pp. (Dec. 1997).
Derby Day Advertisement, written by Atronic Casino Technology (1996).
Documents related to Down-loaded System Awards Regulations, available prior to Aug. 2005 and submitted in Information Disclosure Statements dated Apr. 16, 2007 for U.S. Appl. Nos. 11/365,007, 11/365,177 and 11/445,969.
Documents related to the ACES game, available prior to Aug. 2005 and submitted in Information Disclosure Statements dated Apr. 16, 2007 for U.S. Appl. Nos. 11/365,007, 11/365,177, and 11/445,969.
Documents related to the Best-and-Fairest game, available prior to Aug. 2005 and submitted in Information Disclosure Statements dated Apr. 16, 2007 for U.S. Appl. Nos. 11/365,007, 11/365,177 and 11/445,969.
Documents related to the Cricketer game, available prior to Aug. 2005 and submittted in Information Disclosure Statements dated Apr. 16, 2007 for U.S. Appl. Nos. 11/365,007, 11/365,177, and 11/445,969.
Documents related to the Fast Buck game, available prior to Aug. 2005 and submitted in Information Disclosure Statements dated Apr. 16, 2007 for U.S. Appl. Nos. 11/365,007, 11/365,177, and 11/445,969.
Documents related to the Surprize (MV2030) game, available prior to Aug. 2005 and submitted in Information Disclosure Statements dated Apr. 16, 2007 for U.S. Appl. Nos. 11/365,007, 11/365/177, and 11/445,969.
Documents related to the Surprize game, available prior to Aug. 2005 and submitted in Information Disclosure Statements dated Apr. 16, 2007 for U.S. Appl. Nos. 11/365,007, 11/365,177, and 11/445,969.
Documents related to the Thrillions game, available prior to Aug. 2005 and submitted in Information Disclousre Statements dated Apr. 16, 2007 for U.S. Appl. Nos. 11/365,007, 11/365,177, and 11/445,969.
Gaming Laboratories International, "GLI-11: Gaming Devices in Casinos, Version 1.4," 93 pp. (2006).
Gaming Laboratories International, "GLI-12: Progressive Gaming Devices in Casinos, Version 1.2," 35 pp. (2005).
Information Disclosure Statement and Form 1449 submitted by Aristocrat Leisure Industries Pty Ltd. on Apr. 16, 2007, in U.S. Appl. No. 11/365,007.
Information Disclosure Statement and Form 1449 submitted by Aristocrat Leisure Industries Pty Ltd. on Apr. 16, 2007, in U.S. Appl. No. 11/365,177.
Information Disclosure Statement and Form 1449 submitted by Aristocrat Leisure Industries Pty Ltd. on Apr. 16, 2007 in U.S. Appl. No. 11/445,969.

Lemons, Cherries and Bell-Fruit-Gum, 346 pp., written by Bueschel, published by Royal Bell Books, Nov. 1995.
Mikohn Press Release, "New York—New York Hotel & Casino Unveils New MoneyTime Slot Jackpot Spectacular From Mikohn," 2 pp. (Jul. 16, 1997).
New South Wales, "Approved Poker Machines—Policy, Game Characteristics, Statistical Characteristics," vol. 1, Sec. 1, 88 pp. (Mar. 1995).
New South Wales, "Linked Progressive Jackpot Systems—Guidelines," vol. 3, Sec. 1, 61 pp. (Mar. 1995).
Queensland Office of Gaming Regulation, "Jackpot Systems Minimum Technical Requirements, Version 1.3," 32 pp. (Sep. 6, 2001).
Queensland Treasury Office of Gaming Regulation, "Local Area Electronic Gaming Machine Communication Protocol, Version 1.2," 64 pp. (Mar. 26, 1997).
Queensland Treasury Office of Gaming Regulation, "Local Area Electronic Gaming Machine Communications Protocol, QCOM Version 1.5," 77 p. (Feb. 26, 1998).
Queensland Treasury Office of Gaming Regulation, "Local Area Electronic Gaming Machine Communications Protocol, QCOM Version 1.5.5," 99 pp. (Dec. 19, 2001).
Slot Machines: A Pictorial History of the First 100 Years, Fourth Edition, 261 pp. (1994), written by Fey.
Tasmanian Gaming Commission, "Internet Gaming Technical Requirements, Version 3.0," 62 pp. (Jun. 2001).
Technical Aspects of Wide Area Gaming and Jackpots, written by Nicoll, published in AIC Casinos and Gaming Conference, 7 pp. (Feb. 24-26, 1999).
The Ever-Evolving Slot Floor, written by Quinn, published in Gaming Products & Services, pp. 15-17 (Nov. 1996).
The Future of Slots, written by Faust, published in Gaming Products & Services, 8 pp. (Oct. 1995).
The Power of the Progressive, written by Rutherford, published in Casino Journal, 6 pp. (Apr. 1998).
U.S. Appl. No. 60/083,299, filed by Acres on Apr. 28, 1998.
Victorian Casino and Gaming Authority, "Review of VCGA SRD for Gaming Equipment (Version 4.0) with Regard to Gaming Machine National Standards (Revision 1.0)," 72 pp. (Dec. 1997).
Victorian Casino and Gaming Authority, "Technical Requirements for Gaming Machines and Electronic Monitoring Systems in the Melbourne Casino," Version 3.0, 84 pp. (Jul. 10, 1996).
World of Slots, written by Legato, published in Casino Journal, vol. 9, No. 10, pp. 70-98, 145-146 (Oct. 1996).
World of Slots, written by Legato, published in Casino Journal, vol. 10, No. 10, 36 pp. (Oct. 1997).
World of Slots, written by Legato, published in Casino Journal, vol. 11, No. 9, 7 pp. (Sep. 1998).
Auction Fever Advertisement, written by Sierre Design Group, available prior to 2004.
Bally Slot Machines Electro-Mechanicals 1964-1980 Book [In Part], Revised 3rd Edition wirtten by Marshall Fey.
Believe it or Not Article, written by Strictly Slots, published in 2001.
Bingo Advertisement and Jackpot Bingo Advertisements, written by Casino Data Systems, publshed in 1998 and 2001.
Bonus Times Article, written by Strictly Slots, published in Jul. 2000.
Boom Advertisement, written by WMS Gaming, Inc., published in 1998.
Cartoon Jackpots description, printed from www.ballygaming.com/home.asp, on Feb. 4, 2005.
Cash Box Advertisement, written by Anchor Games, published in 2000.
Cash Express Advertisements, written by Aristocrat, publshed in 2002.
Computa Game Equipment Manual written and compiled by Russell Campbell, Sep. 1990.
Computa Game, "The Software Manual", Revision 3 for Computa Game Software Version 2.41 written by Clive Davis et al., published by Computa Game Pty Ltd., Jul. 1992.
Defendant ATA's Supplemental Response to Plaintiffs Interrogatory, May 9, 2005.
Double Spin Five Times Pay Advertisement, written by IGT, published prior to 2000.
Full House Advertisement, written by Anchor Games, published in 2000.
Gold Fever Advertisement and Game Description written Casino Data System, published in 1997.
Jackpot Carnival Hyperlink Advertisement, written by Aristocrat, published prior to 2002.
Jewel in the Crown Advertisement, written by IGT, published in 2000.
Mega Multiplier®, printed from www.wmsgaming.com, on May 22, 2001.
Millioni$er articles, written by Strictly Slots, published in Sep. 2003 and Mar. 2004.
Money Time advertisement, written by Mikohn Gaming, published in 1999.
Penguin Pucks article, written by Note in Gaming Marketplace, published prior to 2004.
Plaintiff Torango's Supplemental Response to Defendant Aristocrat Technologies, Inc's First Set of Interrogatories, Jul. 8, 2004.
Progressive Jackpot System article, printed from casinomagazine.com.managearticle.asp@c_290&a=518, on Jun. 21, 2004.
Slot Line Progressive Advertisement, written by IGT, published in 1993.
Slot Line Progressive Advertisement, written by IGT, published in 1994.
Slot Line Progressive Advertisement, written by IGT, published in 1995.
Slot Line Progressive Mega Jackpots Advertisement, written by IGT, published in 1997.
Slot Line Temperature Rising Game Description, written by IGT, published in 1998.
Slot Machines A Pictorial History of the First 100 Years (pp. 216, 242 to 243), 5th edition, written by Marshall Fey, published in 1983-1997.
Super Cherry Advertisement, written by IGT, published in 2001.
Take Your Pick Article, written by Strictly Slots, published in Mar. 2001.
Vision Series Good Times Advertisement, written by IGT, published in 1999.
Zorro Advertisement, written by Aristocrat, published in 2004.
Aristrocrat Buyer's Guide with ACES Ad, 2pp. (Mar.-May 1989).
Aristocrat IDS dated Mar. 8, 2005, filed in U.S. Appl. No. 09/462,717, and referring to Surprise gaming machine.
Defendants Aristocrat Technologies Australia Pty, Ltd.'s Fourth Supplemental Response to Plantiff's Interrogatory No. 1 dated Jun. 30, 2006.
Excerpt from Local Area Electronic Gaming Machine Communications Protocol, QCOM Version 1.5, by Queensland Treasury Office of Gaming Regulation printed Feb. 26, 1998.
Surprize Gaming Machine Ad., available prior to Aug. 2004.
Surprize Software Specification for MV2030—var 01, available prior to Aug. 2004.

* cited by examiner

FIG. 7

| GAMING MACHINE | WAGERED MONETARY UNITS | ACTIVE | APPLICABLE ACCUMULATION WAGER POOL MONETARY UNITS | PROBABILITY OF BEING SELECTED |
|---|---|---|---|---|
| 14a | 110 | YES | 220 | 50% |
| 14b | 77 | YES | 220 | 35% |
| 14z | 33 | YES | 220 | 15% |

FIG. 8

| GAMING MACHINE | WAGERED MONETARY UNITS | ACTIVE | APPLICABLE ACCUMULATION WAGER POOL MONETARY UNITS | PROBABILITY OF BEING SELECTED |
|---|---|---|---|---|
| 14a | 110 | NO | 0 | 0% |
| 14b | 77 | YES | 110 | 70% |
| 14z | 33 | YES | 110 | 30% |

FIG. 9

| GAMING MACHINE | WAGERED MONETARY UNITS | ACTIVE | APPLICABLE ACCUMULATION WAGER POOL MONETARY UNITS | PROBABILITY OF BEING SELECTED |
|---|---|---|---|---|
| 14a | 110 | YES | 143 | 77% (rounded) |
| 14b | 77 | NO | 0 | 0% |
| 14z | 33 | YES | 143 | 23% (rounded) |

FIG. 10

| GAMING MACHINE | WAGERED MONETARY UNITS | ACTIVE | APPLICABLE ACCUMULATION WAGER POOL MONETARY UNITS | PROBABILITY OF BEING SELECTED |
|---|---|---|---|---|
| 14a | 110 | YES | 110 | 100% |
| 14b | 77 | NO | 0 | 0% |
| 14z | 33 | NO | 0 | 0% |

FIG.11

EXAMPLE OF PAYOUT CONTRIBUTIONS FOR PRIMARY BONUS VALUE

| Payout | Probability | Contribution |
|---|---|---|
| 1 | 0.008 | 0.008 |
| 2 | 0.008 | 0.015 |
| 3 | 0.015 | 0.045 |
| 4 | 0.015 | 0.061 |
| 5 | 0.015 | 0.076 |
| 6 | 0.023 | 0.136 |
| 7 | 0.038 | 0.265 |
| 8 | 0.045 | 0.364 |
| 9 | 0.053 | 0.477 |
| 10 | 0.061 | 0.606 |
| 12 | 0.061 | 0.727 |
| 15 | 0.068 | 1.023 |
| 20 | 0.076 | 1.515 |
| 25 | 0.083 | 2.083 |
| 30 | 0.091 | 2.727 |
| 35 | 0.076 | 2.652 |
| 40 | 0.061 | 2.424 |
| 50 | 0.053 | 2.652 |
| 60 | 0.045 | 2.727 |
| 70 | 0.038 | 2.652 |
| 80 | 0.030 | 2.424 |
| 90 | 0.023 | 2.045 |
| 100 | 0.015 | 1.515 |

Average Expected Value Pay or Component For Primary Bonus Award 29.2197

FIG.12

EXAMPLE OF PAYOUT CONTRIBUTIONS FOR SECONDARY BONUS VALUE

| Payout | Probability | Contribution |
|---|---|---|
| 1 | 0.207 | 0.207 |
| 2 | 0.241 | 0.483 |
| 3 | 0.172 | 0.517 |
| 4 | 0.103 | 0.414 |
| 5 | 0.069 | 0.345 |
| 6 | 0.069 | 0.414 |
| 7 | 0.034 | 0.241 |
| 8 | 0.034 | 0.276 |
| 9 | 0.034 | 0.310 |
| 10 | 0.034 | 0.345 |

Average Expected Value Pay or Component For Secondary Bonus Award 3.55172

FIG.13

| | |
|---|---|
| Number of Gaming Machines Enrolled in Gaming System | 60 |
| Number of Gaming Machines Per Additional Secondary Bonus Award in Bonus Event | 6 |
| Maximum Number of Secondary Bonus Awards Available | 10 |
| Average Total Bonus Coin Out For Maximum Machines Enrolled (i.e., with all players playing and being active) | 64.7369 |
| Percentage of Total Game Paytable Dedicated to This Bonus | 30.0% |
| Total Number of Credits Bet Per Bonus To Be Activated (Threshold) | 215.78966 |
| Target Average Pay of Primary Bonus Award | 300 Credits |
| Bonus RNG Sample Rate (how often central server checks to see if bonus event will occur) | 50 Credits |
| Total Number of Credits Wagered Per Average Bonus Event Occurs | 2215.5124 |
| Probability of Bonus Event Occurring Per Sample | 2.5% |
| Number of Games Per Bonus Event at 18 Credits Bet Per Game | 123.1 |

FIG.14

| Pooled Amount of Monetary Units | Determination If Bonus Event Occurs Based on 2.5% Probability |
|---|---|
| 216 | NO |
| 266 | NO |
| 316 | NO |
| 366 | NO |
| 416 | NO |
| 466 | NO |
| 516 | NO |
| 566 | NO |
| 616 | NO |
| 666 | NO |
| 716 | NO |
| 766 | NO |
| 816 | NO |
| 866 | NO |
| 916 | NO |
| 966 | NO |
| 1016 | NO |
| 1066 | NO |
| 1116 | NO |
| 1166 | NO |
| 1216 | NO |
| 1266 | NO |
| 1316 | NO |
| 1366 | NO |
| 1416 | NO |
| 1466 | NO |
| 1516 | NO |
| 1566 | NO |
| 1616 | NO |
| 1666 | NO |
| 1716 | NO |
| 1766 | NO |
| 1816 | NO |
| 1866 | NO |
| 1916 | NO |
| 1966 | NO |
| 2016 | NO |
| 2066 | NO |
| 2116 | NO |
| 2166 | NO |
| 2216 | NO |
| 2266 | NO |
| 2316 | NO |
| 2366 | NO |
| 2416 | YES |

FIG. 16A

| Determination of Active Gaming Machines | | | | | | |
|---|---|---|---|---|---|---|
| Gaming Machine | Player | Amount of Each Placed Wager (in Monetary Units) | Average Frequency of Each Placed Wager (seconds per each placed wager) | Amount Wagered during Bonus Event Accumulation Period (in Monetary Units wagered during last thirty seconds preceding determination to provide a bonus event) | Number of Wagers Placed during Bonus Event Accumulation Period (last thirty seconds preceding determination to provide a bonus event) | Active Status |
| 14a | A | 200 | 20 | 200 | 1 | YES |
| 14b | B | 100 | 15 | 200 | 2 | YES |
| 14c | C | 50 | 10 | 150 | 3 | NO |
| 14d | D | 10 | 6 | 50 | 5 | YES |

FIG. 16B

| Determination of Active Gaming Machines to Provide Primary Bonus Award | | | | |
|---|---|---|---|---|
| Gaming Machine | Player | Total Amount Wagered During Bonus Event Accumulation Period (in Monetary Units) | Applicable Amount Wagered during Accumulation Period (in Monetary Units) | Probability of being selected for primary bonus award |
| 14a | A | 3600 | 3600 | 55% (3600/6500) |
| 14b | B | 2400 | 2400 | 37% (2400/6500) |
| 14c | C | 1500 | 0 (Not Active) | 0% (Not Active) |
| 14d | D | 500 | 500 | 8% (500/6500) |
| | | Total: 8000 | Total: 6500 | |

FIG. 16C

| Determination of Which Active Gaming Machine to Provide Secondary Bonus Award After Determining to Provide Primary Bonus Award to Gaming Machine 14a | | |
|---|---|---|
| Gaming Machine | Player | Probability of being selected for secondary bonus award |
| 14a | A | 0% |
| 14b | B | 100% |
| 14c | C | 0% (Not Active) |
| 14d | D | 0% |

GAMING SYSTEM HAVING MULTIPLE GAMING MACHINES WHICH PROVIDE BONUS AWARDS

PRIORITY CLAIM

This application is a non-provisional application of, claims priority to and the benefit of U.S. Provisional Patent Application Ser. No. 60/603,144, filed on Aug. 19, 2004, the entire contents of which are incorporated herein.

CROSS-REFERENCE TO RELATED APPLICATIONS

This application relates to the following co-pending commonly owned patent applications: "GAMING SYSTEM HAVING MULTIPLE GAMING MACHINES WHICH PROVIDE BONUS AWARDS," Ser. No. 11/204,214; "GAMING SYSTEM HAVING MULTIPLE GAMING MACHINES WHICH PROVIDE BONUS AWARDS," Ser. No. 11/204,147; "GAMING SYSTEM HAVING MULTIPLE GAMING MACHINES WHICH PROVIDE BONUS AWARDS," Ser. No. 11/204,148; "GAMING SYSTEM HAVING MULTIPLE GAMING MACHINES WHICH PROVIDE BONUS AWARDS," Ser. No. 11/204,135; "GAMING SYSTEM HAVING MULTIPLE GAMING MACHINES WHICH PROVIDE BONUS AWARDS," Ser. No. 11/548,579; "GAMING SYSTEM HAVING MULTIPLE GAMING MACHINES WHICH PROVIDE BONUS AWARDS," Ser. No. 11/830,630; "GAMING SYSTEM HAVING MULTIPLE GAMING MACHINES WHICH PROVIDE BONUS AWARDS," Ser. No. 11/830,635; "GAMING SYSTEM HAVING MULTIPLE GAMING MACHINES WHICH PROVIDE BONUS AWARDS," Ser. No. 11/830,641; "GAMING SYSTEM HAVING MULTIPLE GAMING MACHINES WHICH PROVIDE BONUS AWARDS," Ser. No. 11/830,354; GAMING SYSTEM HAVING MULTIPLE GAMING MACHINES WHICH PROVIDE BONUS AWARDS," Ser. No. 11/830,273; "GAMING SYSTEM HAVING MULTIPLE GAMING MACHINES WHICH PROVIDE BONUS AWARDS," Ser. No. 11/830,289; "GAMING SYSTEM HAVING MULTIPLE GAMING MACHINES WHICH PROVIDE BONUS AWARDS," Ser. No. 11/830,337; GAMING SYSTEM HAVING MULTIPLE GAMING MACHINES WHICH PROVIDE BONUS AWARDS," Ser. No. 11/830,314; "GAMING SYSTEM HAVING MULTIPLE GAMING MACHINES WHICH PROVIDE BONUS AWARDS," Ser. No. 11/830,422; and "GAMING SYSTEM HAVING MULTIPLE GAMING MACHINES WHICH PROVIDE BONUS AWARDS," Ser. No. 11/830,075.

BACKGROUND OF THE INVENTION

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may allow the player to wager a minimum number of credits, such as one credit (e.g., one cent, nickel, dime, quarter or dollar) up to a maximum number of credits, such as five credits. This wager may be made by the player a single time or multiple times in a single play of the primary game. For instance, a slot game may have one or more paylines and the slot game may allow the player to make a wager on each payline in a single play of the primary game. Slot games with 1, 3, 5, 9, 15 and 25 lines are widely commercially available. Thus, it is known that a gaming machine, such as a slot game, may allow players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be). In other words, obtaining a bonus award is part of the enjoyment and excitement for players.

Certain secondary or bonus games are activated automatically and certain secondary or bonus games require player activation. Once activated, certain secondary or bonus games play to the end or final bonus award automatically and certain secondary or bonus games require at least some level of player interaction. The amount of player interaction may vary. In certain secondary or bonus games, the player may need to pick selections and in certain secondary or bonus games, the player may need to make one or more decisions, such as whether to risk one amount for a higher amount. From the triggering of these secondary or bonus games to the end of these secondary or bonus games, the player is generally provided indications, instructions and/or information about the play of these secondary or bonus games. These indications, instructions and/or provided information inform the player of how and why the player is obtaining or has obtained any award(s) in the secondary or bonus game. Gaming machines often include a display device, such as one or more reels, wheels, dice, video display screens, to display how and why the player is obtaining the secondary or bonus award.

Progressive awards associated with gaming machines are also known. A progressive award is an award amount which includes an initial amount funded by a casino and an additional amount funded through a portion of each wager made on the progressive gaming machine. For example, 1% of each wager placed on the primary game of the gaming machine may be allocated to the progressive award or progressive award fund. The progressive award grows in value as more players play the gaming machine and more portions of the players' wagers are allocated to the progressive award. When a player obtains a winning symbol or symbol combination which results in the progressive award, the accumulated progressive award is provided to the player. After the progressive award is provided to the player, the amount of the next progressive award is reset to the initial value and a portion of each subsequent wager is allocated to the next progressive award as described above.

A progressive award may be associated with a single gaming machine or multiple gaming machines which each contribute portions of the progressive award. The multiple gaming machines may be in the same bank of machines, in the same casino or gaming establishment (usually through a local area network ("LAN")) or in two or more different casinos or gaming establishments (usually through a wide area network ("WAN")). Such progressive awards are sometimes called local area progressives ("LAP") and wide area progressives ("WAP"), respectively.

Mystery bonus awards are also known. For instance, U.S. Pat. Nos. 5,655,961, 5,702,304, 5,741,183, 5,752,882, 5,820,459, 5,836,817, 5,876,284, 6,162,122, 6,257,981, 6,319,125, 6,364,768, 6,375,569, 6,375,567, RE37,885 and U.S. Pat. No. 6,565,434 describe mystery bonus awards and certain methods for providing such awards to players. These patents also describe certain methods for determining which gaming machines will provide the awards to players. These patents further describe methods for a central server to determine which gaming machines will provide the bonus awards and the amount of the bonus awards.

PCT Application No. PCT/AU98/00525, entitled "Slot Machine Game And System With Improved Jackpot Feature" discloses a jackpot awardable to a plurality of gaming machines connected to a network. Upon each play of each gaming machine, a jackpot controller increments the value of the jackpot. Prior to each primary game, the gaming machine selects a random number from a range of numbers and during each primary game, the gaming machine allocates the first n numbers in the range, where n is the number of credits bet by the player in that primary game. At the end of the primary game, the randomly selected number is compared with the numbers allocated to the player and if a match occurs, that particular gaming machine is switched into a feature game mode in which a jackpot game is played for all or part of the incremental jackpot.

More specifically, for every game that is played, a random trigger value is selected in the preprogrammed range as determined from an average number of credits wagered per jackpot. When the primary game is commenced, it is then reported to the controller, which allocates a contribution to the prize pool. Each game is also allotted numbers from the same number range from which the random number was selected, one number in the range being allotted for each credit bet such that the player's probability of being awarded the jackpot game is proportional to the bet. The previously selected random number is then used as a trigger value and compared with the values allotted to the player, if there is a match between the trigger value and the player values, the player is given an opportunity to play the jackpot game. Alternatively, a number is allocated which is equal to, or proportional to the number of credits bet in the respective primary game, the trigger value is compared with the single player value and a jackpot game awarded if the trigger value is less than or equal to the player value.

In one embodiment of the system disclosed in PCT Application No. PCT/AU98/00525, a prize is always awarded in the jackpot game. The jackpot game is used to determine the size of the prize to be awarded. The winning machine is then locked up and the controller awaits an indication that the prize has been paid before allowing the machine to be unlocked. The machine then returns to commence a new primary game. If the trigger value does not match, then there is no feature game awarded for that bought game and the machine returns to step and waits for the next game to commence.

PCT Application No. PCT/AU99/01059, entitled "Player Information Delivery" discloses a gaming console in which an animated character occasionally randomly appears and awards a player a variable random bonus prize. The occurrence of the animated character is weighted by the desired hit rate of the feature and is dependent upon the player's bet and may or may not be dependent upon the size and type of the player's bet. Additionally, the gaming console includes a bonus pool (funded by the player) and a random decision is made whether the contents of the bonus pool will be awarded in addition to any other win.

U.S. Pat. No. 6,241,608 B1 entitled "Progressive Wagering System" discloses a linked progressive wagering system that is capable of accepting wagers in different currencies and different denominations of the same currency. The system periodically computes each current prize value using the data acquired from each gaming device and displays the current prize value at each location where participating gaming devices are located (in the currency used at each particular location). This patent also discloses the system specifying a boundary criteria, such as a maximum value or an expiration date and time, for a progressive award prize. If a gaming device has not randomly generated a prize award event when the specified boundary criteria is met, a progressive award prize is forced by the system upon one or more randomly selected participating players.

There is a continuing need to provide new and different gaming machines and gaming systems as well as new and different ways to provide awards to players including bonus awards. There is also a continuing need to provide new and different linked or related gaming machines.

SUMMARY OF THE INVENTION

One embodiment of the present invention provides a gaming system including a central server or controller in communication with or linked to a plurality of gaming machines or gaming devices. Another embodiment of the present invention provides a gaming system having a plurality of linked gaming machines where one of the gaming machines functions as the central server or controller. The gaming system also includes a plurality of bonus awards adapted to be provided to one or more players of the gaming machines in the gaming system.

In operation, the controller or central server monitors wagers or wager activity on the primary games of the gaming machines. Based at least in part on the wagers or wager activity on the primary games of the gaming machines, the controller or central server determines when a bonus event will occur. If a bonus event is determined to occur, the controller or central server determines if one or more of the gaming machines will provide one or more bonus award(s) and which of the gaming machine(s) will be selected to provide the bonus award(s) in the bonus event. The terms central server and controller are used interchangeably herein.

In one embodiment, for each gaming machine selected by the controller or central server to provide a bonus award, the central server or controller and that selected gaming machine co-act to determine the amount of the bonus award to be provided to the player of that selected gaming machine. In this embodiment, both the central server and the gaming machine selected to provide a bonus award to a player each contribute or determine, at least in part, one or more different components of the bonus award ultimately provided to the player. In an alternative embodiment, the selected gaming machine determines which of a plurality of different awards that are maintained by the central server, such as a plurality of different progressive awards, to provide to the player of the selected gaming machine. This alternative embodiment may include a game having player interaction to determine the award.

As indicated above, the controller tracks the wager activity or amounts wagered on plays of the primary game of each gaming machine in the gaming system. In one embodiment, the controller includes: (a) a separate coin-in or wager meter for each individual gaming machine which tracks the total coin-in or wagers placed on the primary games for each of the gaming machines in the gaming system and (b) a total coin-in or wager meter which tracks the total coin-in wagers placed on all of the primary games for all of the gaming machines in the gaming system. This total wager meter can be a calculated amount based on the sum of the individual gaming machine coin-in meters. The controller tracks the total wagers for each individual gaming machine and the total wagers for all of the gaming machines in the gaming system in any suitable compatible or comparable manner such as credits wagered (i.e., if all of the system gaming machines are of the same denomination) or monetary units (e.g., total dollars or other currency) wagered. Alternatively, each of the gaming machines tracks the wagers placed on that gaming machine (via an individual gaming machine meter). This can be done for all wagers or for the wagers placed by individual players. In these embodiments, the gaming machines sends information to the central controller upon request from the central controller, at designated intervals or in any other suitable manner. Tracking in monetary units accounts for gaming machines having multi-denominations and/or for gaming machines of different denominations and/or gaming machines which accept different currencies.

In one embodiment, the controller maintains an accumulated wager pool for all of the gaming machines in the gaming system. The accumulated wager pool includes at least the total coin-in or amounts wagered on the plays of the primary games of the gaming machines in the gaming system during an accumulation period or a bonus event accumulation period as further discussed below. In certain embodiments of the present invention, after the first bonus event occurs, the accumulated wager pool may include a remainder from a previous bonus event to be utilized in one or more subsequent bonus events as further discussed below.

In one embodiment, each bonus event accumulation period starts at the occurrence of a first bonus event and ends at the occurrence of a second subsequent bonus event. For example, when a bonus event occurs, the accumulation of the monetary units for that bonus event simultaneously or substantially simultaneously ceases. In this example, any wagers made on the primary games of the gaming machines which subsequently occur are part of the next bonus event accumulation period and are accumulated for the next bonus event. It should be appreciated that in this embodiment, the next bonus event accumulation period starts or can start even before the central server selects the gaming machine(s) which will provide the bonus award(s).

In another embodiment, each bonus event accumulation period starts at the issuance of a first bonus event and ends at the issuance of a second subsequent bonus event. For example, after a bonus event is determined to occur, the selected gaming machine will subsequently provide the bonus award to a player of that selected gaming machine. Accumulation of the monetary units for that bonus event ceases at the time that bonus award is provided to or received by the player. In this example, any wagers made on the primary games of the gaming machines which subsequently occur after issuance of that bonus award are for the next bonus event accumulation period and are accumulated in the accumulated wager pool for the next bonus event.

As indicated above, in one embodiment of the present invention, the accumulated wager pool includes at least the total coin-in or amounts wagered by the players on the primary games of all of the gaming machines in the gaming system during the bonus event accumulation period. In an alternative embodiment, the accumulated wager pool also includes any unaccounted for portions of the amounts in one or more previous accumulated wager pools from one or more previous bonus event(s) as discussed in more detail below. This is referred to herein as the remainder.

The central server determines when a bonus event will occur based, at least in part, on the accumulated amount in the accumulated wager pool. For example, the central server determines if a bonus event will occur at preset intervals based on a suitable sampling rate. The sampling rate can be based on any suitable criteria, such as amounts wagered, time elapsed or one or more other factors. For example, where the sampling rate is based on the amount wagered, at each predetermined interval, the central server determines if the accumulated wager pool has reached at least a predefined minimum threshold level of monetary units required to provide a bonus event. The minimum threshold level may be any suitable number including zero, any number greater than zero or may be equal to the sampling rate interval.

If the accumulated wager pool has not reached the predefined minimal threshold level, the central server does not make a determination of whether to cause a bonus event to occur at one or more of the gaming machines in the system. In this case, the central server continues to track wagered monetary units and waits until the next interval (i.e., based on the suitable sampling rate) to determine if a bonus event will occur at one or more gaming machines in the gaming system.

If the accumulated wager pool has reached at least the minimum threshold level of monetary units required to provide a bonus event, the central server randomly determines, based on a predetermined probability, whether the bonus event will occur or not. In one embodiment, this random determination is based on a suitable probability, such as 1%, 2.5%, 5% or 10%. For example, if the accumulated wager pool has at least reached the minimum threshold level of monetary units, the central server randomly determines, based on 2.5% probability of the bonus event occurring, whether to provide a bonus event at one or more of the gaming machines in the system. In one embodiment, the probability from sample to sample can remain constant or in an alternative embodiment, the probability can be different for two or more of the samples. In one such embodiment, the probability can increase for each sample or after a designated number of samples. The present invention contemplates any suitable method for determining the probabilities.

If the central server determines not to provide the bonus event to the gaming machines, the central server continues to track wagered monetary units and waits until the next interval (i.e., based on the sampling rate) to determine if a bonus event will occur. It should be appreciated that in other embodiments, there is no minimum threshold level and the central server determines if such bonus event will occur at each preset interval based on a suitable sampling rate.

If the central server determines that a bonus event will occur, the central server also determines which system gaming machine(s) will be selected to provide bonus awards to the players of those gaming machine. Such determination is based in part on the individual status of each of the gaming machines in the gaming system. That is, the individual status of each gaming machine determines whether that gaming machine is eligible to be selected to provide a bonus award to the player of that gaming machine. In one embodiment, each gaming machine is determined to be in either active status or enrolled status. Active status means that the gaming machine is being actively played by a player during a bonus event qualification period as discussed below. The active status requirements can be based on any suitable number of satisfied criteria or defined in any suitable manner by the implementer of the gaming system of the present invention. For instance, a play of or wager on the primary game of the gaming machine within a predetermined period of time may be part of the determination of whether that gaming machine is in the active status. Other factors such as: (a) the amount of time between each play of or wager on the primary game of the gaming machine; (b) the amount being wagered on the primary game(s); and (c) the number of plays within a period of time, may also or alternatively be part of the determination of whether a gaming machine is in the active status. On the other hand, the enrolled status means that the gaming machine is one of the gaming machines in the gaming system, but is not in the active status (i.e., not being actively played by a player according to one or more of the predetermined criteria) during the bonus event qualification period.

As indicated above, if the central server determines that a bonus event will occur, the central server determines which active gaming machines to select to provide the bonus award(s) to the players of those active gaming machine. In one embodiment, the central server determines which active gaming machines to select to provide each of the bonus awards to based on the respective relative total amounts wagered on each of the active gaming machines during the bonus event accumulation period. In one embodiment, the central server determines the relative percentages of total amounts wagered for each of the active gaming machines by determining the amount wagered at each gaming machine in relation to the total amount wagered at all active gaming machines during the bonus event accumulation period. The central server uses these relative percentages determined for each active gaming machine to randomly determine which of the active gaming machines will be selected to provide the bonus award(s). Using this process, each active gaming machine has a chance of being selected to provide a bonus award. It should be appreciated that in this embodiment, the active gaming machine which had the most amount wagered during the bonus event accumulation period has the greatest relative percentage of total amounts wagered and thus has the highest chance of being selected to provide a bonus award. On the other hand, the active gaming machine which had the least amount wagered during the bonus event accumulation period has the lowest relative percentage of total amounts wagered and thus has the lowest chance of being selected to provide a bonus award.

As discussed above, a gaming machine in the gaming system may be enrolled but not active when a bonus event occurs. In one embodiment, each enrolled but not active gaming machine is not eligible to obtain a bonus award and the total wagered amount for each of these gaming machines is excluded or otherwise not used in determining the relative percentages of the active gaming machines. However, it should be appreciated that these amounts wagered by the enrolled, but not active, gaming machines are included in the accumulated wager pool. In one embodiment, the bonus event is funded on average by the accumulated wager pool as discussed below. More specifically, in one embodiment which includes a primary bonus award and one or more secondary bonus awards, as further discussed below, the average primary bonus awards and the secondary bonus awards are accounted for based on the amounts of monetary units which will be in the accumulated wager pool when a bonus event is triggered or determined to occur. It should thus be appreciated that the present invention allows for large bonus awards to occur at any time because after the minimum threshold of the accumulated wager pool is achieved, the bonus event can be determined to occur and a value component of the bonus award is not based on the actual amount of the accumulated wager pool at the time of the bonus event.

The number of bonus awards and the amount of the bonus awards of a bonus event can vary and be determined in a variety of different manners in accordance with the present invention. In one embodiment, one bonus award is selected to be provided by one of the active gaming machines in the gaming system. In another embodiment, one bonus award from a plurality of different bonus awards is selected to be provided by one of the active gaming machines in the gaming system. In one such embodiment, the plurality of bonus awards are progressive awards. In another embodiment, the number of bonus awards in a bonus event is determined based on the number of active gaming machines in the gaming system during the bonus event qualification period for that bonus event. In one such embodiment, one bonus award is provided for each designated number of active gaming machines (e.g., one bonus award for each two active gaming machines, one bonus award for each five active gaming machines or one bonus award for each ten active gaming machines). In another such embodiment, one primary bonus award is provided and additionally one secondary bonus award is provided for each designated number of active gaming machines. It should thus be appreciated that the number of bonus awards of bonus event can vary in accordance with the present invention.

In one embodiment, the bonus event includes a primary bonus award and zero, one or more secondary bonus awards which are distributed based on the number of active gaming machines. The primary and secondary bonus awards are each based in part on a first component, such as a value component, determined by the active gaming machine selected by the central server to provide an award and in part on a second component, such as a modifier component, (e.g., a multiplier component), determined by the central server and sent to each selected gaming machine. That is, the central server determines a modifier component for each of the bonus awards provided and each selected active gaming machine individually or independently determines a value component for the individual bonus award provided by that individual gaming machine.

In one embodiment, the value or first component of the bonus award is based on a random determination made by the selected gaming machine from a range of potential value components, wherein each potential value component is associated with a probability. The value components determined for each active gaming machine can vary for the different selected gaming machines in the gaming system in a single bonus event because each selected gaming machine individually or independently determines the value component for that selected gaming machine. It should be appreciated that because each selected active gaming machine independently determines the value component for that gaming machine, the value components will often be different for the different selected active gaming machines.

In one embodiment, a modifier or second component, such as the multiplier component, is based in part on the accumulated wager pool of the bonus event accumulation period for the bonus event. In one embodiment, the central server employs the accumulated wager pool to determine a single modifier or multiplier component for all of the selected active gaming machines. The modifier or multiplier component is partly based on the accumulated wager pool, a sum of the expected average value components for each of the selected gaming machines and a relative portion of the bonus percentage of the entire paytable. For example, if the accumulated wager pool is 100 monetary units and the relative portion of the bonus percentage of the overall average return to the player is 30%, then 30 monetary units of the accumulated wager pool can be used to determine the modifier or multiplier. Since it is generally desired to have integer multipliers in gaming machines to avoid fractional units or credits, not all of these monetary units may be accounted for in determining the multiplier. In this simple example, if the multiplier is 9× and accounts for 27 of the monetary units, then 3 monetary units are unaccounted for in determining the multiplier for the bonus event. These remaining 3 monetary units must be on average accounted for because this bonus event is funded on average by the accumulated wager pool. Therefore, in this simple example, the 3 monetary units divided by the percentage of the overall average return to be provided as bonus awards (3/0.3) or 10 monetary units are the remainder of unaccounted for monetary units which are placed back in or remain in the accumulated wager pool for the next or a subsequent bonus event. This will allow the minimum threshold to be reached sooner for the next sampling and possibly increase the value of the next modifier or multiplier component for the next bonus event.

In one embodiment which includes multiple bonus awards, such as a primary bonus award and a secondary bonus award, the modifier or multiplier component is determined based on the average expected value of the value components of the primary and secondary awards which are independently determined by the individual selected gaming machines. Because the average expected value and not the actual value components are used, the remainder is typically not an actual remainder but rather an average expected remainder.

In an alternative embodiment, the bonus awards are accounted for directly in the paytables of the gaming machines. In one such embodiment, the bonus awards include a plurality of progressive awards funded by the gaming machines in the system in a conventional manner. In this embodiment, the central server maintains the plurality of progressive awards. The progressive awards start or are reset at multiple different levels (e.g., $10, $100, $1000, $10,000). In one embodiment, the gaming machine selected by the central server to provide one of the progressive awards as the bonus award will determine or cause to be determined which progressive award that gaming machine will provide to the player. In one embodiment, the gaming machine can provide a suitable bonus game where the outcome of the bonus game determines which progressive award is obtained. The bonus game may include or not include player interaction.

The present invention further contemplates employing one or more displays in conjunction with the gaming machines which will provide the players of the gaming machines information about the bonus awards to increase player awareness of these awards and interaction between players of the gaming machines. The display(s) can provide any suitable information about the gaming system, gaming machines, bonus events and bonus award such as information regarding the bonus event or bonus award(s), which gaming machines are winning or have won the primary awards and secondary awards, the amount of the progressive awards, when the progressive award is about to be hit and which gaming machines are winning or have won the progressive award.

It is therefore an advantage of the present invention to provide a gaming system including a controller or central server linked to a plurality of gaming machines, wherein the central server determines when a bonus event will occur and which gaming machine(s) will be selected to provide the bonus award(s). In this gaming system, each selected gaming machine determines, at least in part, the amount of the bonus award to be provided by that selected gaming machine. This provides a more secure award determination at the machine level and allows for different bonuses on different machines.

A further advantage of the present invention is to provide a gaming system having an accumulated wager pool including at least wagers on the primary games of the system gaming machines during a bonus event accumulation period, wherein based at least in part on the accumulated wager pool, a controller determines when a selected gaming machine will provide one of the bonus awards independent of any event in or of any play of any of the primary games. In this gaming system, the determination of which gaming machine(s) will be selected to provide bonus awards is based, at least in part, on the wagers placed on the primary games of the gaming machines in the system. That is, each selected gaming machine determines, at least in part, the amount of the bonus award to be provided by that gaming machine.

A further advantage of the present invention is to provide a gaming system having an accumulated wager pool maintained by a controller based at least in part on the wagers by the players of primary games of gaming machines in the gaming system. The gaming system further includes a bonus award adapted to be provided to the player of a controller selected gaming machine, wherein the bonus award is determined based on a value component (which is determined by the selected gaming machine independent of the accumulated wager pool) and based on a modifier or multiplier component (which is determined by the controller based in part on the accumulated wager pool).

A further advantage of the present invention is to provide a gaming system having a central server operable to determine if a bonus event will occur at designated intervals, and if the bonus event is determined to occur, determine which of the gaming machines were in an active state during a bonus event qualification period for the bonus event, select at least one of the active gaming machines, and send a signal to the selected gaming machine to provide a bonus award to the player of that gaming machine. The central server at least in part determines the bonus award and the selected gaming machine at least in part determines the bonus award to provide to the player.

A further advantage of the present invention is to provide a gaming system having a central server operable for each gaming machine to maintain a total of the wagers placed on the primary games of the gaming machines during a bonus event accumulation period, maintain a total of the wagers placed on the primary games of all of gaming machines during the bonus event accumulation period and at designated intervals during the bonus event accumulation period determine if a bonus event will occur. If the bonus event is determined to occur, the central server determines which of the gaming machines were in an active state during a bonus event qualification period for the bonus event, select at least one of the active gaming machines based on a probability determined from the total wagers placed during the bonus event accumulation period for each active gaming machines relative to the total wagers placed for all active gaming machines during the bonus event accumulation period, and send a signal to the selected gaming machine to provide a bonus award to the player of the gaming machine. The selected gaming machine at least in part determines the bonus award to provide to the player.

A further advantage of the present invention is to provide a gaming system having a central server operable for each gaming machine to maintain a total of the wagers placed on the primary game of the gaming machine during a bonus event accumulation period between a first bonus event and a second bonus event, maintain an accumulated wager pool including a total of the wagers placed on the primary games of all of gaming machines during the bonus event accumulation period and a remainder of average unaccounted for wagers from a first bonus event accumulation period for the first bonus event, at designated intervals during the bonus event accumulation period, determine if the second bonus event will occur wherein the designated intervals are based on the accumulated wager pool. If the bonus event is determined to occur, the central server sends a signal to a selected gaming machine to provide a bonus award to the player of the gaming machine. The selected gaming machine at least in part determines the bonus award to provide to the player.

A further advantage of the present invention is to provide a gaming system having a gaming system including a plurality of gaming machines, each gaming machine including a primary game operable upon a wager by a player, a bonus event and an expected average value component for the bonus event. The gaming system also includes a first accumulated wager pool for a first occurrence of the bonus event, a second accumulated wager pool for a second occurrence of the bonus event and a controller in communication with the gaming machines. The controller is operable to cause the first occurrence of the bonus event, determine a first bonus award for the first occurrence of the bonus event, wherein the first bonus award is based at least in part on the first accumulated wager pool and at least in part on a value component for the first occurrence of the bonus event and determine a remainder including an unused portion of the first accumulated wager pool and the average expected value component for the bonus event. The controller is also operable to maintain the second accumulated wager pool, cause the second occurrence of the bonus event and use the second accumulated wager pool and the remainder to at least in part determine a second bonus award to provide to a player for the second occurrence of the bonus event.

A further advantage of the present invention is to provide a gaming system including a plurality of gaming machines, each gaming machine including a primary game operable upon a wager by a player, a first accumulated wager pool and a controller in communication with the gaming machines. The controller is operable to maintain the first accumulated wager pool based at least in part on the wagers placed on the primary games of all of the gaming machines and determine a first bonus portion of the accumulated wager pool, wherein the first bonus portion is at least in part based on a percentage less than 100% of the first accumulated wager pool. The controller is also operable to select at least one gaming machine to provide a first bonus award to a player, wherein the total expected value of all of the first bonus awards provided to all of the players is equal to or less than the first bonus portion and allocate a remainder to a second accumulated wager pool for a second bonus award to be provided to a player, wherein the remainder accounts for any difference between the first bonus portion and the total expected value of all of the first bonus awards provided to all of the players.

A further advantage of the present invention is to provide a gaming system including a plurality of gaming machines, each gaming machine including a primary game operable upon a wager by a player and a plurality of potential first bonus awards. The gaming system also includes a first accumulated wager pool, a second accumulated wager pool and a controller in communication with the gaming machines. The controller is operable to maintain the first accumulated wager pool based at least in part on the wagers placed on the primary games of all of the gaming machines and select at least one gaming machine to provide one of the first bonus awards to a player, wherein a total expected value of all of the first bonus awards provided to all of the players is equal to or less than a predetermined percentage of the first accumulated wager pool. The controller is also operable to allocate a remainder to the second accumulated wager pool for a second one of the bonus awards to be provided to a player, wherein the remainder accounts for any difference between the predetermined percentage of the first accumulated wager pool and the total expected value of all of the first bonus awards provided to all of the players.

A further advantage of the present invention is to provide a method of operating a gaming system including a controller and a plurality of gaming machines which each include a primary game operable upon a wager by a player. The method includes maintaining a first accumulated wager pool, maintaining an average expected value component for a bonus event and causing a first occurrence of the bonus event. The method also includes determining a first bonus award for the first occurrence of the bonus event, wherein the first bonus award is based at least in part on the first accumulated wager pool and at least in part on a value component for the occurrence of the bonus event, determining a remainder including an unused portion of the first accumulated wager pool and the average expected value component for the bonus event and maintaining a second accumulated wager pool. The method further includes causing a second occurrence of the bonus event and using the second accumulated wager pool and the remainder to at least in part determine a second bonus award to provide to a player for the second occurrence of the bonus event.

A further advantage of the present invention is to provide a gaming system having pool of wagered amounts on the gaming machines wherein the actual amount of the pool in part determines when a bonus award can be provided to a player, but the actual amount of the pool does not determine the amount of the bonus award given to the player and accounted for by pool.

Another advantage of the present invention is to provide a gaming system having a plurality of gaming machines wherein multiple different bonus awards can be provided simultaneously or substantially simultaneously.

A further advantage of the present invention is to provide a gaming system having bonus events for a plurality of gaming machines which employ multi-denominations or different denominations or different bet amount.

Another advantage of the present invention is to provide a gaming system having a plurality of gaming machines which employs a wager pool to fund the bonus event but provides a more random feel in providing the bonus awards.

Additional features and advantages of the present invention are described in, and will be apparent from, the following Detailed Description of the Invention and the figures.

BRIEF DESCRIPTION OF THE FIGURES

FIG. 7 is a chart of an example of the relative wagered amounts for three active gaming machines and the probability of being selected to provide the primary bonus award for each active gaming machine.

FIG. 8 is a chart of an example of the relative wagered amounts for two active gaming machines and the probability of being selected to provide the primary bonus award for each active gaming machine.

FIG. 9 is a chart of an example of the relative wagered amounts for two different active gaming machines and the probability of being selected to provide the primary bonus award for each active gaming machine.

FIG. 10 is a chart of an example of the wagered amount for one active gaming machine and the probability of being selected to provide the primary bonus award for that active gaming machine.

FIG. 11 is a chart illustrating a range of payouts or value components and probabilities associated with those payouts or value components for a primary bonus award of one embodiment of the present invention.

FIG. 12 is a chart illustrating a range of payouts or value components and probabilities associated with those payouts or value components for a secondary bonus award of one embodiment of the present invention.

FIG. 13 is a chart illustrating one example embodiment of the gaming system of the present invention.

FIG. 14 is a chart illustrating an example of the pooled amounts of monetary units and the determinations if the bonus event occurs in one embodiment of the gaming system of the present invention.

FIGS. 16*a*, 16*b* and 16*c* are charts illustrating an example of one embodiment of the present invention.

DETAILED DESCRIPTION OF THE INVENTION

Mystery Bonus Awards Embodiment

Figure 1:
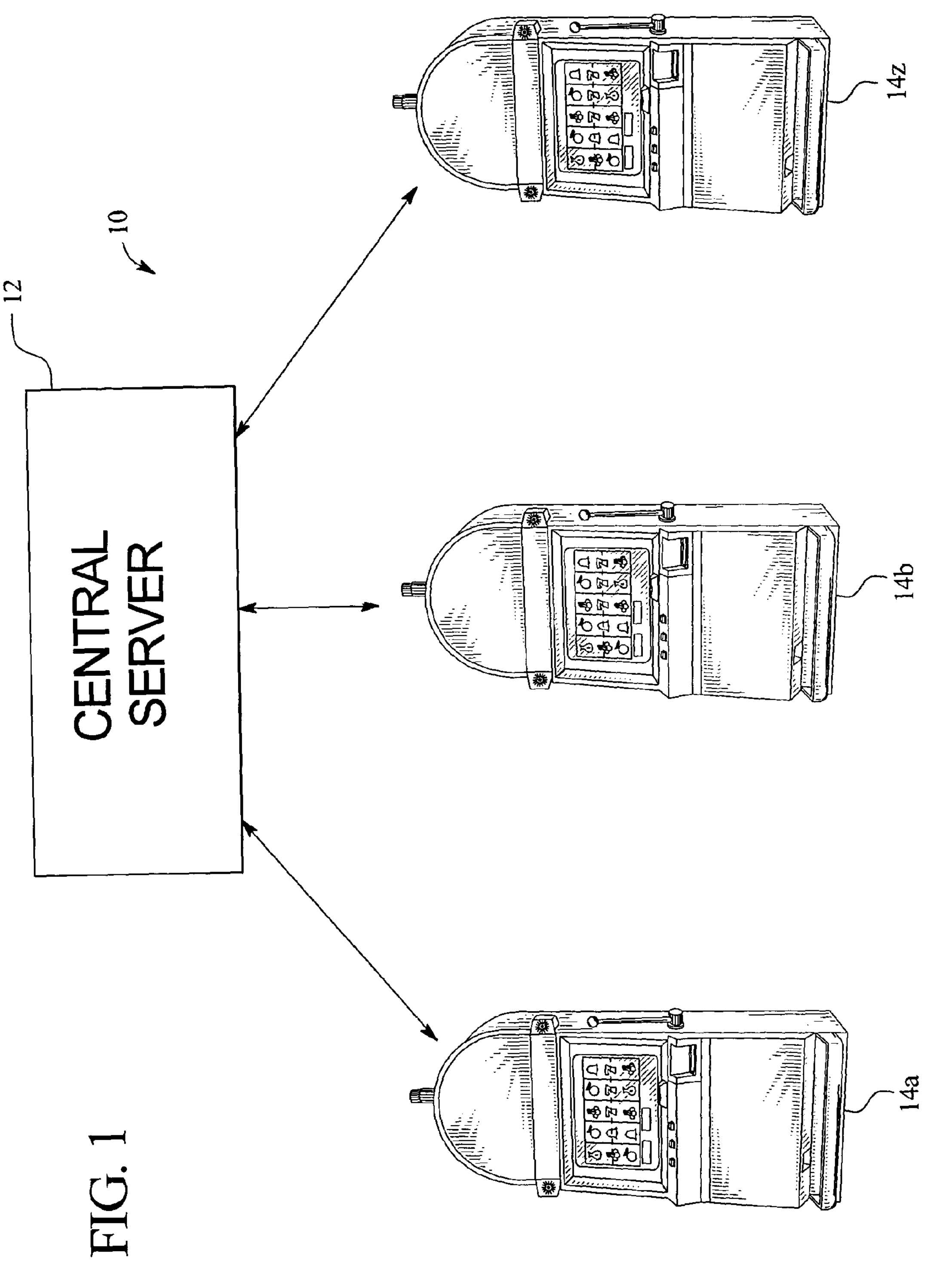
FIG. 1 is a schematic diagram of the central server in communication with a plurality of gaming machines in accordance with one embodiment of the present invention.

One embodiment of the present invention provides a gaming system including a plurality of linked gaming machines and a plurality of awards provided to players of the linked gaming machines in an apparently random fashion to the players of these gaming machines. These awards are referred to herein as bonus awards to distinguish them from the awards that the gaming machines provide to the players for winning outcomes in the plays of the primary wagering games, such as slot games, card games (e.g., poker, blackjack) or any other suitable game. The awards can be any suitable type of awards, such as monetary awards or progressive awards. The gaming machines can also include other secondary games or secondary awards, such as other progressive jackpot awards.

In one embodiment of the present invention, the gaming machines do not provide any apparent reasons to the players for obtaining such bonus awards. In this embodiment, the bonus awards are not triggered by an event in or based specifically on any of the plays of any primary game or on any of the plays of any secondary game of the gaming machines in the system. That is, the gaming machines may simply provide the bonus awards to the players without any explanation or alternatively with simple explanations such as “You Have Won a Mystery Bonus Award of $______.”

In one embodiment, the gaming machines of the gaming system are operable to provide multiple bonus awards to multiple players at the multiple linked gaming machines at the same time or substantially the same time. Alternatively, the gaming machines of the gaming system are operable to provide multiple bonus awards to multiple players at the multiple linked gaming machines in an overlapping or sequential manner. In one embodiment, upon the determination or trigger of a bonus event, the gaming system determines the number of bonus awards, such as one primary bonus award and zero, one or more secondary bonus awards that the gaming machine(s) will provide to the player(s) of the multiple linked gaming machines in the gaming system as described below. In one embodiment, one primary bonus award is always provided to one of the players of the gaming machines in the gaming system and the number of secondary bonus awards is determined based on the number of active gaming machines in the gaming system at the time the bonus event occurs.

In one embodiment of the present invention, the primary bonus awards and any secondary bonus awards of a bonus event are based, at least in part, on monetary units which are accumulated in an accumulated wager pool. The accumulated wager pool includes the amounts wagered on primary games of the multiple linked gaming machines during a bonus event qualification period for that bonus event and any theoretical remainder from one or more prior bonus events. More specifically, the primary bonus awards and the secondary bonus awards of a bonus event are derived in part from a ratio of the expected awards to be paid from the bonuses versus the amount in the accumulated wager pool for that bonus event. Since this ratio is employed instead of basing the awards on the actual amount of pooled monetary units, the amounts of the bonus awards can have a greater volatility because they are not limited by the amount of monetary units actually in the accumulated wager pool for that bonus event. The actual bonus awards provided to the players of the gaming machines can thus be greater than the accumulated wager pool monetary units.

It should thus be appreciated that the gaming system of this embodiment will sometimes over hold and will sometimes under hold the expected monetary units to be awarded relative to the actual amount of wagered monetary units actually in the accumulated wager pool for that bonus event. This will give a more random feel to the gaming system and provide more excitement for the players. It should also be appreciated that in certain embodiments, the actual amount of pooled monetary units at least partially determines when the bonus event will occur as discussed below.

In one embodiment, the central server or controller tracks wagering activity or game play, maintains a combined theoretical and actual bonus wager accumulation pool which includes the actual amounts wagered and a theoretical remainder from a previous bonus event, wherein the theoretical remainder is based on the ratio of the expected awards to be paid versus a the amount in the accumulated wager pool for the previous bonus event. The total expected value of actual bonus awards roughly equals bonus pool accounting.

Central Server Generally

Referring now to FIG. 1, one embodiment of the gaming system 10 of the present invention includes a central server or controller 12 and a plurality of gaming machines or gaming devices 14*a*, 14*b* . . . 14*z* in communication with or linked to the central server or processor 12. The number of gaming machines in the gaming system can vary as desired by the implementer of the gaming system. These gaming machines are referred to herein alternatively as the group of gaming machines, the linked gaming machines or the system gaming machines. The linked gaming machines may be of the same type or of different types of gaming machines. The linked gaming machines may have the same primary game or two or more different primary games. For example, one gaming machine may be adapted to play a slot game while another gaming machine may be adapted to play a poker game. The linked gaming machines may have no secondary games, one or more secondary games, the same secondary games or two or more different secondary games. The linked gaming machines may have no progressive award, one or more progressive awards, the same progressive awards or may have two or more different progressive awards. The play of each of the gaming machines 14*a*, 14*b* . . . 14*z* in the group is monitored by the central server 12. The central server or controller may be any suitable server or computing device which includes a processor and a memory or storage device. In alternative embodiments, the central server is a progressive controller or another gaming machine in the gaming system.

The central server or controller maintains or keeps track of the play and/or other activity on or relating to the gaming machines in the gaming system. In one embodiment, the central server keeps track of the play on each gaming machine 14*a*, 14*b* . . . 14*z* including at least: (1) the amount wagered by the player(s) for each play of the primary game for each gaming machine and (2) the time the wagers are placed or the amount of time between each play of the primary game for each gaming machine. It should be appreciated that the player of a gaming machine may change during this tracking and that this tracking can be independent of the specific player playing the gaming machine. In one embodiment, the central server determines the status of each of the gaming machines in the group based on this information. It should be appreciated that other information may be employed by the central server or controller to determine the status of each of the gaming machines in the group. For instance, the number of games played or the amount of each wager placed on each play may be used in the determination of the status of each gaming machine.

It should be appreciated that the central server also keeps track or maintains additional information regarding play of the gaming machines in the group, such as one or more conventional progressive awards associated with the gaming machines which are provided to the players in a conventional manner. Moreover, the central server may track other information, such as when (or if) a bonus event is played by a gaming machine which has been selected to provide the bonus event.

Figure 2:
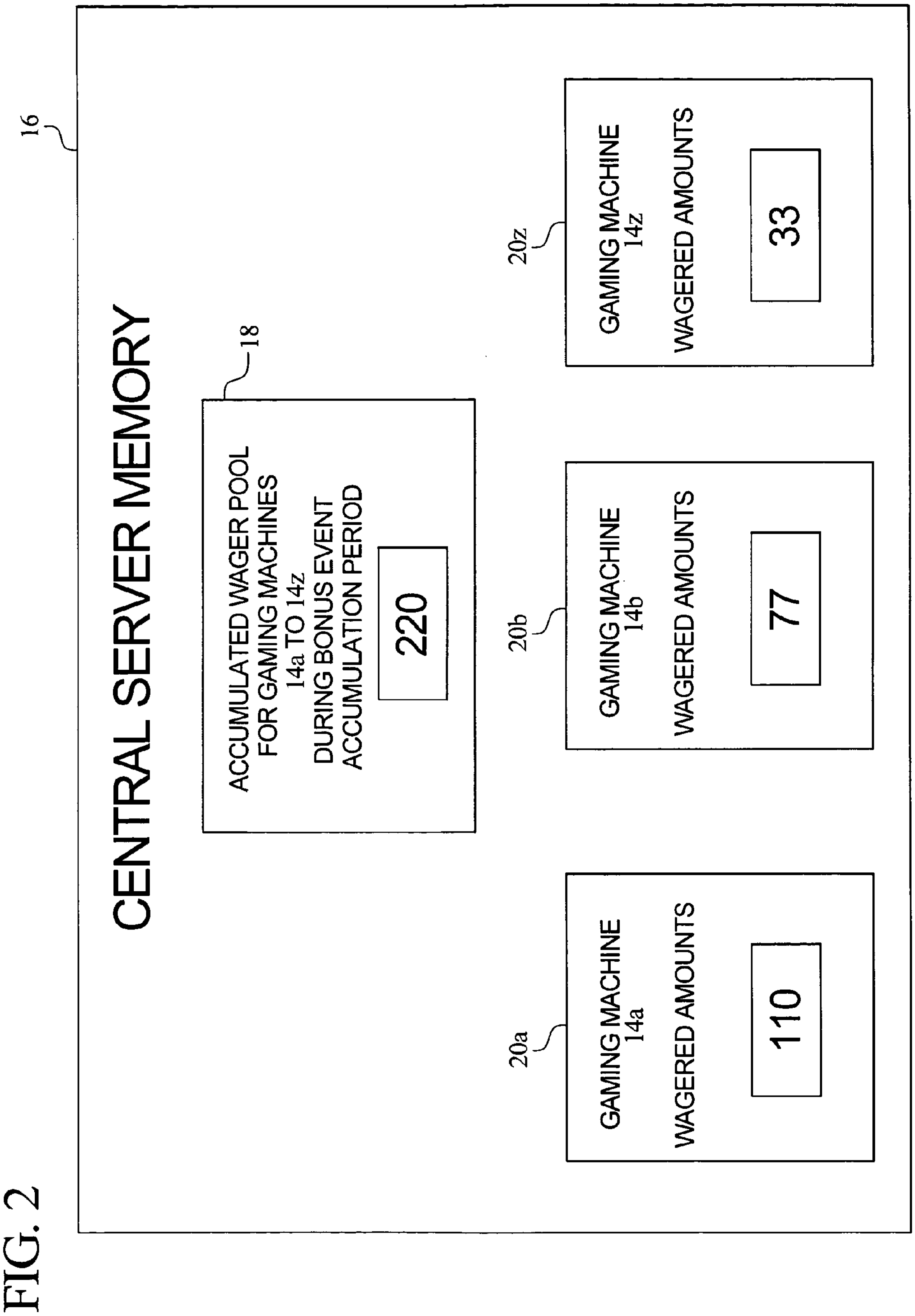
FIG. 2 is a schematic diagram of the memory of the central server of the embodiment of FIG. 1, and which generally illustrates one example of the accumulated wager pool.

As generally illustrated in FIG. 2, the memory 16 of the central server also maintains an accumulated wager pool 18 and the wagered amounts 20*a*, 20*b* . . . 20*z* for each gaming machine 14*a*, 14*b* . . . 14*z* in the group, respectively. The accumulated wager pool 18 includes at least the total amounts wagered by the players of the primary games for each of the gaming machines during the bonus event accumulation period. In FIG. 2, the wagered amounts on gaming machine 14*a* during the bonus event accumulation period is 110 monetary units, the wagered amounts on gaming machine 14*b* during the bonus event accumulation period is 77 monetary units and the wagered amounts on gaming machine 14*z* during the bonus event accumulation period is 33 monetary units. Therefore, the accumulated wager pool 18 includes 220 monetary units as illustrated in FIG. 2.

Figure 3:
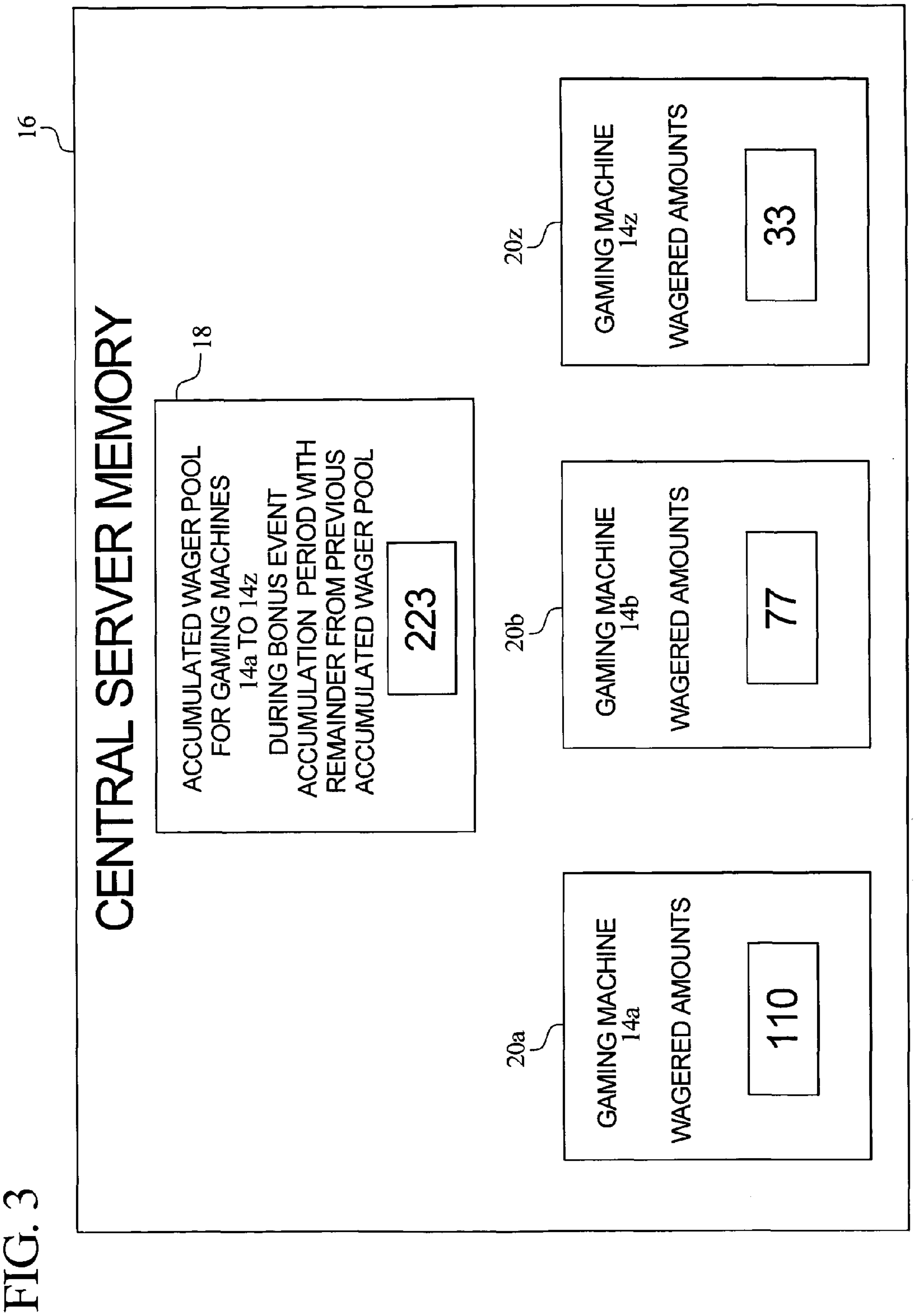
FIG. 3 is a schematic diagram of the memory of the central server of the embodiment of FIG. 1, and which generally illustrates an example of the accumulated wager pool with a remainder for a previous accumulated wager pool.

The example shown in FIG. 2 illustrates the gaming system prior to the occurrence of a first bonus event or after a bonus event in which there is no remainder. After the first bonus event, as described in more detail below, the accumulated wager pool may include a remainder. The remainder accounts for the unaccounted portion of the accumulated wager pool from a previous bonus event. Using this example and referring now to FIG. 3, if a remainder of 3 monetary units exists from a previous accumulated wager pool and the amounts wagered during the present bonus event accumulation period are the same as in FIG. 2, the accumulated wager pool will include 223 monetary units.

The present invention includes defined points which trigger different functions for the central server to perform based on: (a) monetary units wagered on the group of gaming machines; (b) sampling intervals; (c) designated levels of wagers, such as maximum wagers; (d) time passed. Monetary units wagered on gaming machines are sometimes referred to as "coin-in" in the gaming industry and herein.

Generally, in one embodiment, the central server determines when a bonus event will occur based on a sampling rate of the accumulated wager pool and a random determination. The central server also determines which gaming machines to select to provide the bonus award(s) and sends signals or messages containing such information to the gaming machines to indicate such a bonus event.

Bonus Event Accumulation Period and Tracking of Wagered Amounts and Remainders from Previous Bonus Events Referring back to FIGS. 2 and 3, the central server 12 tracks the play of the gaming machines 14*a*, 14*b* . . . 14*z* during a bonus event accumulation period. The central server 12 includes coin-in or wager meters or counters 20*a*, 20*b* . . . 20*z* which respectively individually track the wagers placed on the primary games for each of the gaming machines 14*a*, 14*b* . . . 14*z* in the group. The central server 12 includes an accumulated wager pool 18 which at least tracks the total coin-in or wagers placed on all of the primary games for the gaming machines 14*a*, 14*b* . . . 14*z* in the group. The individual gaming machine wager meters 20*a*, 20*b* . . . 20*z* and the accumulated wager pool 18 may track the wagers made on the gaming machines in any suitable manner, such as in monetary units. Tracking in monetary units allows for two or more of the gaming machines in the group to be of different denominations and also allows for the individual gaming machines to have multiple denominations. In such embodiments, the monetary unit can be in the lowest common denomination. In one embodiment, every gaming machine of the system will also have a separate coin-in or wager meter for the bonus event accumulation period. This may or may not be displayed by the gaming machines to the players.

In an alternative embodiment of the present invention, the central server tracks the play of the gaming machines by having a theoretical coin-in or wager meter or counter for each of the gaming machines in the group. This theoretical wager meter individually tracks the expected average wagers placed on the primary games of each of the gaming machines in the system. This is tracked based on the range of possible wagers on each of the machines and an expected average wager for each wager made. The central server includes a theoretical accumulated wager pool which at least tracks the total theoretical coin-in or wagers placed on all of the primary games for all of the gaming machines in the group.

As described above, in one embodiment of the present invention, the central server maintains or keeps track of the accumulated wager pool. The accumulated wager pool includes the total coin-in or amounts wagered by the players on the primary games of the gaming machines during the bonus event accumulation period. The accumulated wager pool also includes a theoretical remainder, as discussed in more detail below, to account for portions of previous accumulated wager pools which are unaccounted for in previous bonus event(s).

The central server tracks these amounts wagered during each bonus event accumulation period. In one embodiment, each bonus event accumulation period starts at the occurrence of a bonus event and ends at the occurrence of a next or subsequent bonus event. For example, when a bonus event occurs, the accumulation of the monetary units for that bonus event immediately ceases, the values in the meters are stored or set, the accumulated wager pool and meters are reset and all further coin-in or wagers on the linked gaming machines which subsequently occur are accumulated for the next bonus event. This starts even before the gaming machines are selected to provide the bonus awards of that initiated bonus event to the player. It should be appreciated that the exact period of time of the bonus event accumulation period will vary based on many factors, such as the rate of coin-in or wagered monetary units, probability of triggering a bonus event and when the bonus events are triggered. It should also be appreciated that the bonus event accumulation session of the triggering for the first bonus event for the gaming machines in the group can begin upon the initiation or enrollment of the gaming machines in the group. In one embodiment, at the start of each bonus event accumulation period, the wager meter in the central server for each gaming machine will be set to zero.

In an alternative embodiment, the accumulated wager pool and one or more of the gaming machine wager tracking meters do not need to be reset to zero. In one such embodiment, a percentage of the accumulated wager pool is employed for the bonus event (as discussed below) and a percentage of the accumulated wager pool is not employed for the bonus event but is saved for a subsequent bonus event. The same percentages are used for the individual gaming machine wager meters. For example, if the percentage employed is 90% and if:

(a) the accumulated wager pool is at 1000 monetary units, (b) the wager meter of active gaming machine 14*a* is at 500 credits, (c) the wager meter of active gaming machine 14*b* is at 300 credits, and (d) the wager meter of active gaming machine 14*z* is at 200 credits, then a. the employed amount of the accumulated wager pool is 900 monetary units, b. the employed amount of the wager meter of active gaming machine 14*a* is 450 credits, c. the employed amount of the wager meter of active gaming machine 14*b* is 270 credits, and d. the employed amount of the wager meter of active gaming machine 14*z* is at 180 credits, and i. the unemployed amount of the accumulated wager pool is 100 monetary units, ii. the unemployed amount of the wager meter of active gaming machine 14*a* is 50 credits, iii. the unemployed amount of the wager meter of active gaming machine 14*b* is 30 credits, and iv. the unemployed amount of the wager meter of active gaming machine 14*z* is at 20 credits.

This embodiment leaves the relative ratio's of the meters intact, which allows such ratios to be used for a subsequent bonus event which is immediately triggered.

It should also be appreciated that the relative amount of the wager meters for the gaming machines could vary based on other factors such as the desire to reward a player who has a higher gaming status than other players. For instance, if a player has a higher level player tracking card, the player may be provided more monetary units in the meter of the gaming machine which the player plays to provide that player a greater advantage in being selected to receive a bonus award as discussed below. Thus, in one embodiment, a meter for a gaming machine may be set or reset to a seed amount or to include a seed amount based on the status of the player or one or more other factors. Alternatively, credits or monetary units may be added to the players total wagered amounts to give a player an advantage.

Figure 5:
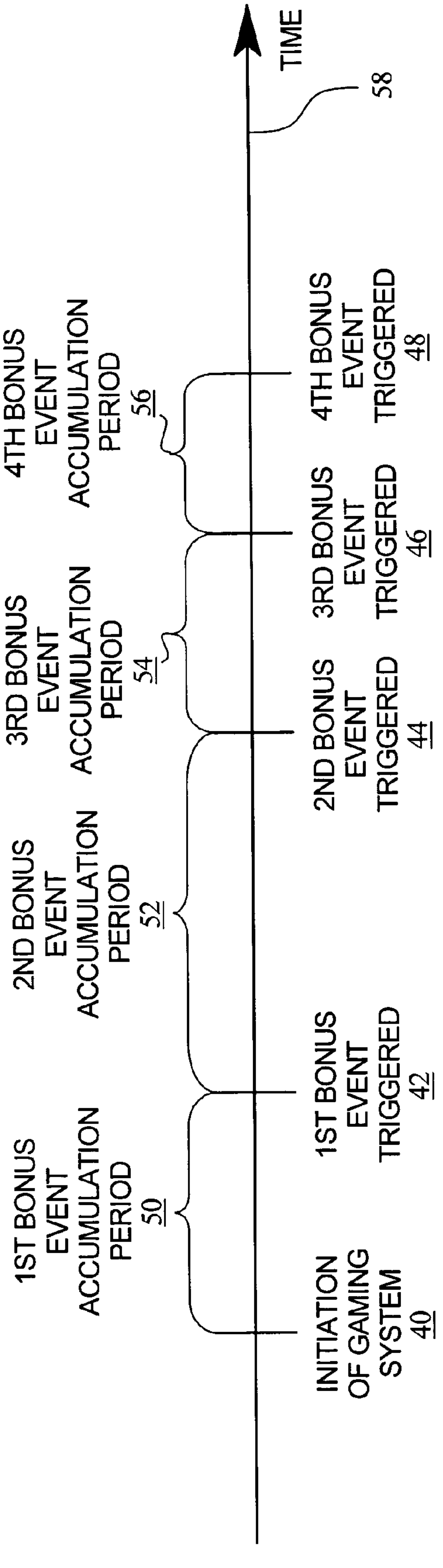
FIG. 5 is a timeline illustrating the bonus event accumulation periods relative to the bonus triggers.

Turning now to FIG. 5, initiation of the gaming system 40, a first bonus triggering event 42, a second bonus triggering event 44, a third bonus triggering event 46, a fourth bonus triggering event 48, a first bonus event accumulation period 50, a second bonus event accumulation period 52, a third bonus event accumulation period 54, and a fourth bonus event accumulation period 56 occur along timeline 58. This illustrates that the first bonus event accumulation period begins upon initiation of the gaming machine in the system and ends upon triggering of the first bonus event 42. This also illustrates that the second, third and fourth bonus event accumulation periods 52, 54 and 56 occur between the first, second, third and fourth bonus event triggers 42, 44, 46 and 48 respectively. FIG. 5 further illustrates that the bonus event accumulation periods can vary in time because the bonus event triggers will occur at different times as the gaming machines in the system are played.

In one embodiment, the bonus event accumulation period and the bonus event qualification period will be different time periods. In another embodiment, the bonus event accumulation period and the bonus event qualification period will be the same or substantially similar time periods. In one embodiment, the bonus event accumulation period is the period of time from the occurrence of one bonus event to the occurrence of the next bonus event. In one embodiment, the bonus event qualification period is the period of time when a primary game of a gaming machine must be actively played prior to a bonus event in order to qualify that gaming machine for that bonus event.

For example, based on the amount wagered on the gaming machines in the group, the bonus event accumulation period may start at 8:30 p.m. and end at 8:32 p.m. In this example, the bonus event accumulation period is one-hundred-twenty seconds from a previous bonus event to a current bonus event and a gaming machine may be eligible to win a bonus award in that current bonus event if a wager has been made on the primary game of that gaming machine in the last fifteen seconds (i.e., the bonus qualification period) of that one-hundred-twenty second period.

Figure 6:
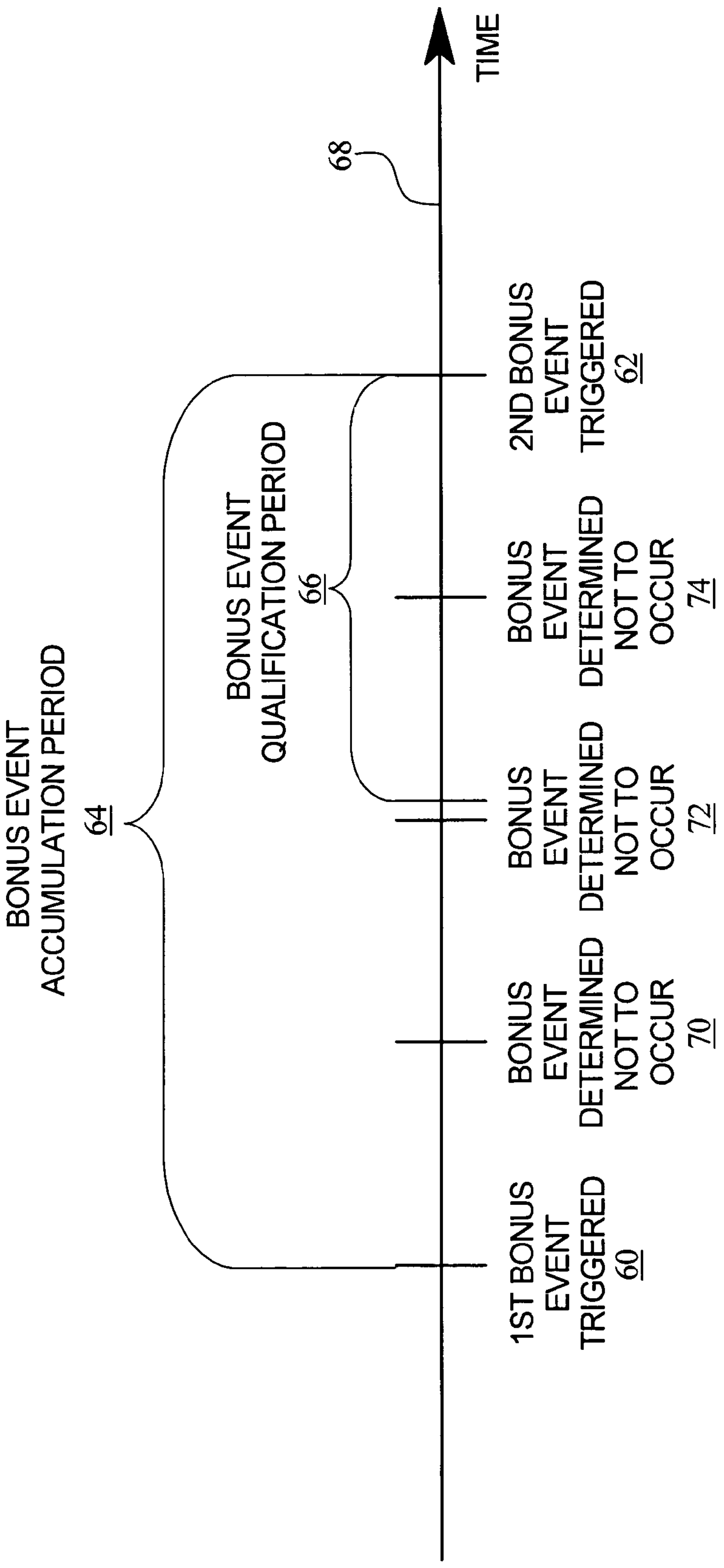
FIG. 6 is a timeline illustrating a bonus event accumulation period relative to the bonus event triggers and a bonus event qualification period.

This is generally illustrated in FIG. 6, where a first triggered bonus event 60, a second triggered bonus event 62, a bonus event accumulation period 64 and a bonus event qualification period 66 occur along time line 68. This illustrates that the bonus event accumulation period can be longer than the bonus event qualification period. FIG. 6 also illustrates three bonus event determinations 70, 72 and 74 that each do not trigger a bonus event. In this example, the central server or controller makes a random determination of whether a bonus event will occur at each interval based on the sampling rate. At determinations 70, 72 and 74, the controller randomly determined that the bonus event will not occur. Thus, the range of the bonus event qualification period will vary based on when the central server or controller determines that the bonus event will occur.

It should be appreciated that in an alternative embodiment of the present invention, the points or wagers are accumulated based on individual players instead of gaming machines. Thus, the system can be alternatively configured to track each player's total wagers and base the bonus events on an accumulated wager pool of the combination of such player's wagers. In one such embodiment, if a player leaves the gaming machine of the gaming system, that player's wagers are removed from the accumulated wager pool. In another such embodiment, if a player leaves the gaming machine of the gaming system, that player's wagered amounts are saved for the player for later use in a pool at another gaming machine. In one embodiment, each player's wagers are tracked via a player tracking system (implemented through the use of a playing tracking card or any other suitable manner). In one embodiment, if the player leaves a gaming machine of the gaming system, the player's points or wagers are retained through the playing tracking system until a designated time or event, such as until the accumulated wager pool is reset. In another embodiment, if the player leaves a gaming machine of the gaming system without transferring their accumulated points using the player tracking system (e.g., the player is not registered in the player tracking system or the player does not have a playing tracking card), the gaming system sets certain criteria which must be fulfilled to reset the accumulated wager pool for that individual gaming machine. For example, if no additional wagers are made at that gaming machine within a designated period of time, the gaming machine determines that the player has left without transferring any accumulated points to the player tracking system and thus the accumulated wager pool is reset without that player's wagered amount. Other suitable uses of that player's wagers can be made by the gaming system of the present invention. Such wagers can be taken in account or not taken in account for future bonus events.

Status of Gaming Machines

In one embodiment of the present invention, the status of each gaming machine in the gaming system as either enrolled status or active status determines whether that gaming machine is eligible to be selected to provide a primary or secondary bonus award in a bonus event. In one embodiment, the status of each gaming machine in the gaming system when the bonus event occurs also determines the number of secondary bonus awards provided in the bonus event.

The enrolled status means that the gaming machine is one of the linked gaming machines in the system, but is not being actively played by a player during a bonus event qualification period. A gaming machine may be classified as enrolled status for several reasons. For example, no player may be playing the gaming machine. In another example, a player could be playing the gaming machine (i.e., by having credits on the gaming machine), but be playing too slowly or be interrupted during play. In this case, the player could have credits on the credit meter of the gaming machine, but the player has not made a wager on a primary game or otherwise qualified for a bonus event during the bonus event qualification period.

The active status means that the gaming machine is being actively played by a player during a bonus event qualification period. In one embodiment, actively playing during a bonus event qualification period means that the player is playing the primary game of the gaming machine (i.e., placing wagers on plays of the primary game) at least at a predefined minimum rate during a predefined time period. For example, the gaming machine may be in active status when a player has made at least one play of the primary game in a fifteen second period prior to the triggering of the bonus event. In this example, the bonus event qualification period is that fifteen second period prior to the triggering of the bonus event.

In another embodiment, the bonus event qualification period may begin with the determination that a bonus event will occur. In this embodiment, any additional accumulation of the monetary units for the current bonus event will cease immediately upon the conclusion of the bonus event qualification period. That is, the bonus event accumulation period ends at the same time as the bonus event qualification period ends. For example, the bonus event qualification period is that fifteen second period after the determination to trigger a bonus event. In another embodiment, the active status may alternatively or additionally be based on the amount wagered on the plays of the primary game during a bonus event qualification period. In a further alternative embodiment, the determination of the active status may be based on a designated minimum number of plays of the primary game or number of wagers on the primary game in a designated time period. The determination of active status may take into account other factors such as interruptions or displays in play of the primary game such as caused by the triggering of other bonuses or the operation of other secondary games of the gaming machines. In another embodiment, a gaming machine can only be determined to be an active gaming machine if an additional wager, such as a side-bet or side-wager, is made by a player at a gaming machine of the gaming system for one player of a game, a plurality of plays of a game or all plays of a game in a designated period of time. It should be appreciated that a gaming machine may be classified as active based on any one or more suitable parameters or criteria as determined by the implementer or operator of the gaming system.

Figure 4:
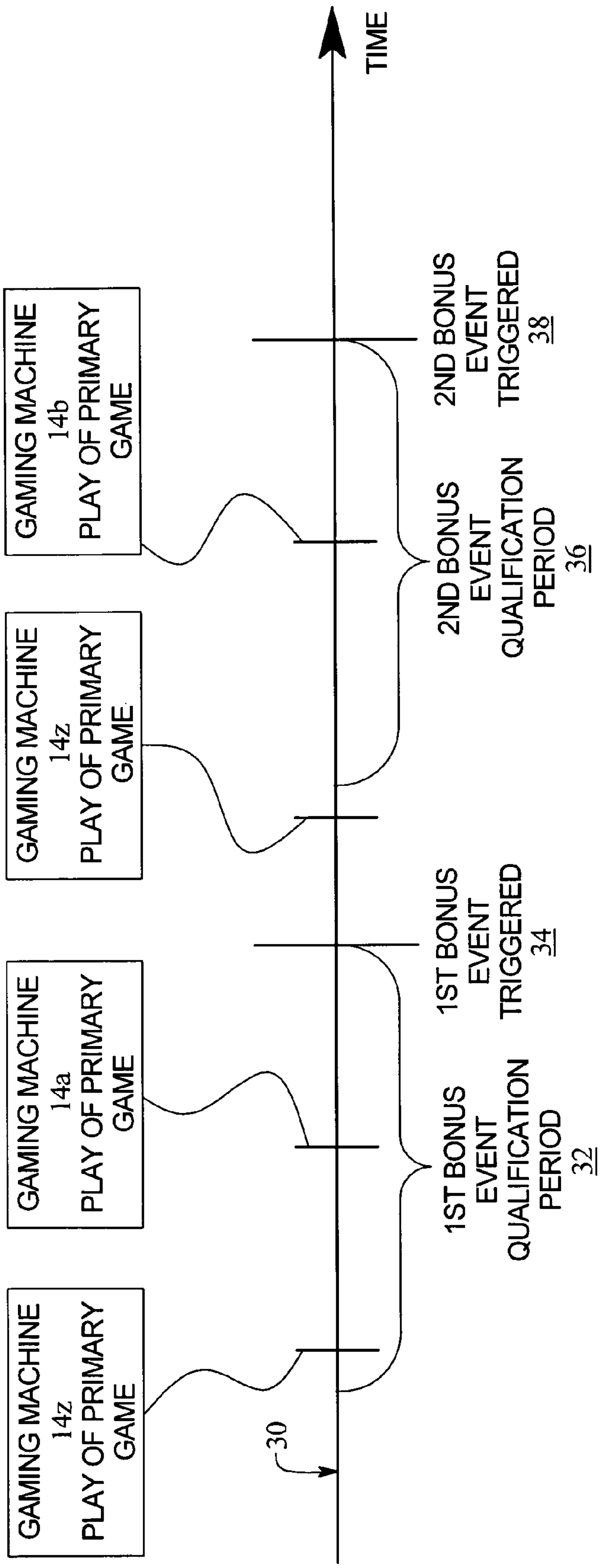
FIG. 4 is a timeline illustrating the bonus event qualification periods relative to the bonus event triggers.

FIG. 4 illustrates a timeline 30 of a first bonus event qualification period 32, a first bonus triggering event 34, a second bonus event qualification period 36 and a second bonus triggering event 38. This illustrates that the bonus event qualification periods 32 and 36 are periods of time prior to the triggering of the respective bonus events 34 and 38. This also illustrates that gaming machine 14*z* and gaming machine 14*a* both played the primary game during the first bonus event qualification period 32 and therefore were in active status for the first bonus event 34. This further illustrates that gaming machine 14*b* played the primary game during the second bonus event qualification period 36 and therefore was in active status for the second bonus event 38. However, since gaming machine 14*z* played the primary game after the first bonus event, but not within the second bonus event qualification period 36, gaming machine 14*z* is in enrolled status but not in active status to be eligible for the second bonus event 38. It should be appreciated that the bonus event qualification periods preferably remain constant or consistent.

After a bonus event is determined to occur, the central server or controller will determine for each gaming machine if that gaming machine is in an active status and thus eligible to be selected by the controller to provide a bonus award. It should appreciated that a gaming machine in the system needs to be in active status during the bonus event qualification period to be eligible to provide either of the primary bonus or any secondary bonuses in the bonus event. It should also be appreciated that the bonus event qualification period could alternatively be based on the amount of the wagers in addition to or instead of the time of the wagers. In one such embodiment, if the player makes a designated number of wagers at a designated level, such as maximum wager on the primary game of a gaming machine, that gaming machine can qualify for the next triggered bonus event.

In an alternative embodiment, one or more other or additional awards, such as one or more progressive awards, are associated with the linked gaming machines. In one embodiment, the gaming machine must also be in active status to provide one of these additional award(s) to a player.

Additionally, it should be appreciated that the present invention contemplates other or additional methods for determining that a gaming machine is active. For instance, the player may be enabled to make a side wager or additional wager to be active for one or more subsequent bonus events. The side wager feature could also be time based where the additional wager causes the gaming machine to be active for a subsequent time period, such as one minute.

It should also be appreciated that one or more additional statuses may be employed in accordance with the present invention. In one embodiment, a participating status is provided for a gaming machine based on a determination of whether the gaming machine will be part of the bonus event or be eligible to be selected to provide a bonus award to the player of that gaming machine. For instance, a gaming machine will be in a participating status if an individual player playing the gaming machine is a premier player. This could be determined at least in part based on the status of that player determined via a player tracking card used by that player in the gaming machine. It should be appreciated that other criteria can be used to determine if a player is in the participating status. It should be further appreciated that when a gaming machine is in the participating status, the gaming system automatically treats the gaming machine as an active gaming machine for purposes of the other determinations including bonus event eligibility by the gaming system.

Central Server Determination of Occurrence of Bonus Event

One embodiment of the gaming system of the present invention includes a minimum accumulated wagered amount or threshold prior to a determination of whether a bonus event will occur. As generally illustrated in FIG. 14, the amount in this example is 216 monetary units. If the accumulated wager pool is below this predefined minimum threshold amount, the central server does not determine whether a bonus event will occur. In one embodiment, the central server determines at regular intervals whether to provide a bonus event to the active status gaming machines. The sample rate can be any suitable rate, such as based on a number of monetary units wagered as tracked by the accumulated wager pool. For example, as seen in FIG. 14, a determination is made every fifty monetary units wagered. At each predetermined interval, the central server determines if the accumulated wager pool has reached the predefined minimum level of wagered monetary units for all of the gaming machines in the system including the active status and enrolled status gaming machines.

In another embodiment, the central controller determines whether to provide a bonus event at regular intervals based on any other suitable sample rate, such as once every two minutes. In one embodiment, each time interval is associated with a probability of the bonus event occurring, wherein the probability of a bonus event occurring increases over time until the probability of the bonus event occurring is one-hundred percent (which may additionally coincide with a cap or limit of which the accumulated wager pool may grow to). For example, if the probability associated with a bonus event occurring after two minutes is 2.0%, the probability associated with a bonus event occurring after ten minutes may be 10.0%. In another such embodiment, even if a bonus event is determined to occur (i.e., based on the probability associated with the elapsed time interval), the bonus event will only occur if the accumulated wager pool is at or above the predefined minimum threshold amount. In another such embodiment, if the accumulated wager pool is at or above the predefined minimum threshold amount, the central controller will begin to determine at regular or predetermined intervals (such as every fifteen seconds) whether to provide a bonus event.

In another embodiment, each time interval is associated with a probability of the bonus event occurring, wherein the probability of a bonus event occurring is based on the number of gaming machines in the active state. In this embodiment, the greater the number of active gaming machines in the gaming system, the greater the probability of the bonus event occurring at each designated time interval. For example, if one gaming machine is in the active state, the probability of the bonus event occurring at each designated time interval may be 0.1%, if two gaming machines are in the active state, the probability of the bonus event occurring at each designated time interval may be 0.2% and if three gaming machines are in the active state, the probability of the bonus event occurring at each designated time interval may be 0.3%. In another embodiment, each time interval is associated with a probability of the bonus event occurring, wherein the probability of a bonus event occurring is based on the number of credits played or wagers placed during the previous bonus event accumulation period or bonus event qualification period.

If the accumulated wager pool has reached the predefined minimal level, the central server determines whether to provide the bonus event to one of the gaming machines. In one embodiment, this is a random determination based on a suitable probability, such as two percent, five percent or ten percent. It should be appreciated that other suitable methods can be employed for determining whether to provide the bonus event to the player.

If the central server determines to provide the bonus event to the player, the central server immediately stores the accumulated wager pool for determining the modifier component of the bonus award and resets the accumulated wager pool for the subsequent bonus event. This accumulated wager pool for the subsequent bonus event will include any remainder as discussed below.

If the accumulated wager pool has not reached the predefined minimal level, the central server does not determine whether to provide a bonus event to one the gaming machines in the system. If the central server does not determine whether to provide a bonus event to one of the gaming machines in the system or the central server determines not to provide the bonus event to the players, the central server waits until the next interval based on the sampling rate. In this case, the server continues to track monetary units in each of the meters because a new bonus event has not occurred.

It should also be appreciated that these determinations could be combined as one function instead of two functions. More specifically, as the accumulated wager pool reaches each of a plurality of predefined levels, the central server will make the random determination of whether to provide a bonus event. This eliminates the need to sample the accumulated wager pool at regular intervals. In a further embodiment, sampling is done only after the accumulated wager pool reaches the predefined threshold level.

In an alternative embodiment, the gaming system can allow the gaming machines to trigger the occurrence of the bonus event for a group of gaming machines instead of determining if the bonus event will occur based on a sampling rate. After a bonus event is determined to occur by one of the gaming machines, the bonus awards are determined as described herein.

Central Server Determination of Active Gaming Machine to Provide Bonus Award After Determination to Provide Bonus Event If the central server determines to provide the bonus event, the central server determines which active gaming machines to select to provide the bonus awards. In one embodiment, the central server determines which active gaming machine to select to provide the primary bonus award based on the relative amounts of total wagers placed by the active gaming machines during the bonus event accumulation period. In one embodiment, the central server selects the gaming machine (to provide the primary bonus award) which had the largest total wagers during the bonus event accumulation period.

In another embodiment, the central server determines the relative percentage of amounts wagered at the active gaming machines to the total accumulated amounts wagered by those active gaming machines during the bonus event accumulation period. In other words, the sum of the active gaming machines total wagers placed during the bonus event accumulation period will be used to determine a probability or percentage for each active gaming machine of being selected to provide the primary bonus award. The relative probabilities or percentages will almost always be different because as stated above, players play at different rates, players wager different amounts or players may play at different denominations and players also often vary their own wager rates and amounts.

It should be appreciated that if there are not active gaming machines or no gaming machines are being played when a bonus event is determined, in one embodiment, no gaming machines are selected to provide the bonus award and the amount of monetary units in the accumulated wager pool can be rolled into the next accumulated wager pool for the next or a subsequent bonus event. In this embodiment, the controller can detect if no gaming machines are active in the manner described above and can detect if no machines are being played in any suitable manner, such as based on cash outs, the existence of credits on the machines within certain time periods and/or the presence of player tracking cards.

The central server uses the relative probabilities or percentages of wagered amounts during the bonus event accumulation period for each active gaming machine to randomly determine which active gaming machine will be selected to provide the primary bonus award. Using this process, each active gaming machine has a chance of being selected to provide the primary bonus award. In this embodiment, the active gaming machine with the most amount wagered during the bonus event accumulation period has the best chance of providing the primary bonus award. On the other hand, the active gaming machine with the least amount wagered during the bonus event accumulation period has the worst chance of providing the primary bonus award.

Referring back to FIG. 2 and also to FIG. 7, in this example, if gaming machines 14*a*, 14*b*, and 14*z* are active, the wager meter 20*a* or amount for gaming machine 14*a* is 110 monetary units, the wager meter 20*b* or amount for gaming machine 14*b* is 77 monetary units and the wager meter 20*z* or amount for gaming machine 14*z* is 33 monetary units. In this example, as each of the gaming machines 14*a*, 14*b*, 14*z* are active, the applicable accumulation wager pool is 220 and the probabilities for being selected to provide the primary bonus award for gaming machine 14*a* is 110/220 or 50%, for gaming machine 14*b* is 77/220 or 35% and for gaming machine 14*z* is 33/220 or 15%. The central server will determine the gaming machine which will provide the primary bonus award based on these probabilities using a random number generator or random number generating algorithm.

As illustrated in FIG. 8, in this example, if gaming machines 14*b* and 14*z* are active and gaming machine 14*a* is enrolled but not active, the wager meter or amount for gaming machine 14*a* is 110 monetary units, the wager meter or amount for gaming machine 14*b* is 77 monetary units and the wager meter or amount for gaming machine 14*z* is 33 monetary units. In this example, as gaming machines 14*b* and 14*z* are active, the applicable portion of the accumulation wager pool is 110 and the probabilities for being selected to provide the primary bonus award for gaming machine 14*a* is 0/110 or 0%, for gaming machine 14*b* is 77/110 or 70% and for gaming machine 14*z* is 33/110 or 30%.

As illustrated in FIG. 9, in this example, if gaming machines 14*a* and 14*z* are active, and gaming machine 14*b* is enrolled but not active, the wager meter or amount for gaming machine 14*a* is 110 monetary units, the wager meter or amount for gaming machine 14*b* is 77 monetary units and the wager meter or amount for gaming machine 14*c* is 33 monetary units. In this example, as gaming machines 14*a* and 14*z* are active the applicable accumulation wager pool is 143 and the probabilities for being selected to provide the primary bonus award for gaming machine 14*a* is approximately 110/143 or 77%, for gaming machine 14*b* is 0/143 or 0% and for gaming machine 14*z* is 33/143 or 23%.

As illustrated in FIG. 10, in this example, if gaming machine 14*a* is active and gaming machines 14*b* and 14*z* are enrolled but not active, the wager meter or amount for gaming machine 14*a* is 110 monetary units, the wager meter or amount for gaming machine 14*b* is 77 monetary units, and the wager meter or amount for gaming machine 14*z* is 33 monetary units. In this example, as only gaming machine 14*a* is active, the application accumulation wager pool is 110 and the probabilities for being selected to provide the primary bonus award for gaming machine 14*a* is 110/110 or 100%, for gaming machine 14*b* is 0/110 or 0% and for gaming machine 14*z* is 0/110 or 0%.

As discussed above, a gaming machine in the group may be enrolled but not active when a bonus event occurs. For instance, a gaming machine may be active for a period of time during the bonus event accumulation period, but then a player may be interrupted and allow the gaming machine to become inactive. In one embodiment, this enrolled but not active gaming machine is not eligible to obtain a primary or secondary bonus award. In this example, the inactive gaming machine's accumulated monetary units are excluded or not used in determining the relative percentages of wagered amounts of the active gaming machines as specifically illustrated in FIGS. 7 to 10, but are used in determining the part of the bonus award including the modifier or multiplier component as discussed below.

In one embodiment of the present invention, if a gaming machine is selected to provide an award and no player is playing that selected gaming machine during a timeout period (such as a 1 hour period), the amount of the award or amount of the accumulated wager pool which accounts for that award can be reallocated or rolled back into an accumulated wager pool for a subsequent bonus award. Alternatively, said award could be saved for a subsequent bonus event provided to another selected gaming machine.

As indicated above and illustrated in FIGS. 7 to 10, the central server determines which active gaming machines will be selected to provide the bonus awards based on a true weighted average of the wagered amounts for each active gaming machine relative to the total wagered amounts for all active gaming machines. In an alternative embodiment, the weighting is not truly proportional. In one such embodiment, the gaming machine with the largest portioned wagered amounts could achieve a higher weighting. Employing this embodiment, in the example of FIG. 7, the weighting could be 55% for gaming machine 14*a*, 35% for gaming machine 14*b*, and 10% for gaming machine 14*z*. Employing this embodiment in the example in FIG. 8, the weighting could be 80% for gaming machine 14*b* and 20% for gaming machine 14*z*. This embodiment further rewards greater wagers during the bonus event accumulation period.

The present invention contemplates a further alternative embodiment where a fixed percentage grid, matrix, or table is employed to determine the relative percentages. In one such embodiment, the rank of the wager meters of the active gaming machines determines the relative percentages regardless of how much is accumulated in each wager meter. For example, the higher rank could always have a 75% probability, the intermediate rank could always have a 20% probability and the lowest rank could always have a 5% probability. In the example where:

(a) gaming machine 14*a* has 110 monetary units,
(b) gaming machine 14*b* has 77 monetary units, and
(c) gaming machine 14*z* has 33 monetary units,
then
(1) gaming machine 14*a* would have a 75% chance of being selected because it has the highest rank,
(2) gaming machine 14*b* would have a 20% chance of being selected because it has an intermediate rank, and
(3) gaming machine 14*z* would have a 5% chance of being selected because it has the lowest rank.

These percentages are fixed regardless of the actual ratios. It should also be appreciated that in this embodiment, each different number of active gaming machine can have a different table, grid or matrix associated with it. For example, the following grids, tables or matrixes could be provided for a gaming system with six gaming machines:

| | |
|---|---|
| **1 Active Gaming Machine** | |
| $1^{st}$ | 100% |
| **2 Active Gaming Machines** | |
| $1^{st}$ | 75% |
| $2^{nd}$ | 25% |
| **3 Active Gaming Machines** | |
| $1^{st}$ | 75% |
| $2^{nd}$ | 20% |
| $3^{rd}$ | 5% |
| **4 Active Gaming Machines** | |
| $1^{st}$ | 50% |
| $2^{nd}$ | 30% |
| $3^{rd}$ | 15% |
| $4^{th}$ | 5% |
| **5 Active Gaming Machines** | |
| $1^{st}$ | 45% |
| $2^{nd}$ | 30% |
| $3^{rd}$ | 10% |
| $4^{th}$ | 10% |
| $5^{th}$ | 5% |
| **6 Active Gaming Machines** | |
| $1^{st}$ | 45% |
| $2^{nd}$ | 29% |
| $3^{rd}$ | 11% |
| $4^{th}$ | 9% |
| $5^{th}$ | 5% |
| $6^{th}$ | 1% |

In another alternative embodiment, each gaming machine can be placed in a category or range. If two or more gaming machines are placed in the same category or range, than the percentage for that category or range is divided between those gaming machines.

Central Server Determination of Number of Secondary Bonus Awards Upon Occurrence of Bonus Event When a bonus event is determined to occur, a primary bonus award will be provided to the player of one of the active gaming machines as discussed above. Additionally, in one embodiment, zero, one or more secondary bonus awards are also provided to the players of zero, one or more of the active gaming machines. In one embodiment, the number of secondary awards is based on the number of active gaming machines at the time of the occurrence of the bonus event and the maximum number of secondary bonus awards is limited by the number of enrolled gaming machines. In this embodiment, for each group of "x" gaming machines which are active, one secondary bonus award is provided to one of the active gaming machines. In one example illustrated in FIG. 13, sixty gaming machines are enrolled in the gaming system (i.e., zero to sixty gaming machines may be active) and each group of six gaming machines activated during the bonus event qualification period causes an additional secondary bonus to be awarded in the bonus event. Since groups of six machines per secondary bonus are defined and sixty machines are enrolled, there can be up to ten secondary bonus awards. In this example, to ensure enough money has been wagered on average to pay for or account for the bonus event, the first chance for the bonus event will occur after two hundred-sixteen monetary units are on the total wager meter as discussed below.

In the first scenario of this example, one gaming machine is active when the bonus event occurs. In this scenario, a primary bonus award and zero secondary bonus awards are provided by the gaming machines in the system. In a second scenario of this example, two to six gaming machines are active when the bonus event occurs. In this scenario, one secondary bonus award will be provided by one of the active gaming machines in the system which does not provide the primary bonus award. In one embodiment, the active gaming machine which provides the primary bonus award is excluded from this determination. In one embodiment, the secondary bonus award will be provided by the active gaming machine with the highest wager meter that did not provide the primary bonus award. In this embodiment, the active gaming machine with the greatest amount wagered during the bonus event accumulation period will be selected to provide the secondary bonus award. It should be appreciated that this embodiment compensates the player who wagered the most during the bonus event accumulation period. This method creates a small advantage to the players that play the most monetary units during the bonus event accumulation period. In the unlikely event of a tie, in one embodiment, the central server randomly selects the active gaming machine selected to provide the secondary bonus award. In one embodiment, each active gaming machine has an equal probability of being selected to obtain a secondary bonus award. Other suitable methods can be employed in accordance with the present invention to determine which gaming machine which will obtain any secondary bonus award.

In a third scenario of this example, more than six gaming machines are active when the bonus event occurs. In this scenario, the bonus event will include multiple secondary bonus awards provided by the active gaming machines in the system. The number of secondary bonus awards will be based on the group size, in this example six. The number of active gaming machines will be divided by the group size and then rounded up. For example, if seven to twelve machines are active, the bonus event will include two secondary bonuses awards, if thirteen to eighteen machines are active, the bonus event will include three secondary bonus awards, etc. This could continue for more bonus awards depending on the active number of gaming machines. In one embodiment, similar to the second scenario, these secondary bonus awards will be provided by the active gaming machines with the highest wager meters during the bonus event accumulation period. Alternatively, any suitable method, such as the methods described above with respect to the primary award, could be used to determine which gaming machines will be selected to provide the secondary bonus awards.

It should thus be appreciated that in one embodiment, the central server determines each active gaming machine which will provide the secondary award. In alternative embodiments, a greater number of gaming machines or all of the active gaming machines could each be selected to provide a secondary award to the respective players. In such embodiments, the value component of the award determined by each gaming machine (as further discussed below) would be from a smaller range or have a smaller expected value. In one such embodiment, the ranges would have descending average expected values based on the order of the wager totals for such gaming machines. The value component would be combined with the modifier component, such as a multiplier component sent by the central server to each gaming machine to determine the secondary bonus award provided by each gaming machine. In a further alternative embodiment, the gaming machine could provide a fixed or designated award or a progressive award.

Determination of the Primary Bonus Award and Secondary Bonus Award(s)

In one embodiment of the present invention, the primary bonus award is determined based on a value or value component determined for the primary bonus award and a modifier or modifier component determined for the primary bonus award. The value component modified by the modifier component results in the primary bonus award which is provided to or received by the player. In one embodiment, the gaming machine selected to provide the primary bonus award determines the value component of the primary bonus award and the central server determines the modifier component. In this embodiment, the central server determines and sends the modifier component to the selected gaming machine.

In one embodiment of the present invention, each secondary bonus award is determined based on a value or value component determined for that secondary bonus award and a modifier or modifier component determined for that secondary bonus award. The value component modified by the modifier component forms the secondary bonus award for that gaming machine. In one embodiment, the gaming machine selected to provide the secondary bonus award independently determines the value component of the secondary bonus award for that gaming machine and the central server determines the modifier component. In this embodiment, the central server sends the modifier component to that gaming machine. It should be appreciated that since the value components for the secondary bonus awards are each determined by the respective gaming machine selected to provide the secondary bonus awards, the secondary bonus awards for each selected gaming machine may be different.

In one embodiment of the present invention, the modifier or modifier component determined for each primary bonus award and each secondary bonus award is the same. In this embodiment, the central server determines the modifier component for the bonus awards and sends the modifier component to each of the selected gaming machines.

Gaming Machine Determination of Value Components of the Primary Bonus Award and Secondary Bonus Award(s)

As discussed above, in one embodiment of the present invention, the number of active gaming machines in the system at the time of the occurrence of the bonus event determines the number of bonus awards provided in the gaming system. In one embodiment, a primary bonus award activating minimum level of gaming machines must be active for a bonus event to occur. If the minimum level of activated gaming machine is satisfied and the bonus event occurs, the central server will select one of the active gaming machines to provide the primary bonus award. If there is a primary and secondary bonus award activating minimum level of active gaming machines and such minimum level of active gaming machines is satisfied when the bonus event occurs, the central server will select the gaming machines to provide the primary bonus award and secondary bonus award(s). In one embodiment, as discussed above, the number of secondary awards will depend on the number of active gaming machines when the bonus event is triggered.

The determination of the value components of the primary and secondary bonus awards is determined based on the gaming machine system implementer's established probabilities for achieving each of the value components. The example payout tables in FIGS. 11 and 12 illustrate the probabilities for the determinations of the value components of the primary and secondary bonus awards for one example of the gaming system of the present invention. It should be appreciated that, in one embodiment, the value component may be determined through one or more bonus events. It should be further appreciated that other suitable payout tables may be employed in accordance with the present invention.

Example Primary and Secondary Game Payouts

FIG. 13 illustrates one example which implements the primary and secondary game payouts of FIGS. 11 and 12. In this example, certain numbers are rounded for simplicity. As illustrated in FIG. 13, sixty gaming machines are enrolled in the gaming system. For each bonus event, one additional secondary bonus award is provided for each six active gaming machines and therefore a total maximum number of ten secondary bonus awards can be provided to the players of the gaming machines.

The average expected value or value component of the primary bonus award is 29.2197 as illustrated in FIG. 11. More specifically, FIG. 11 illustrates the different payout values, the probability of obtaining each different payout value and the contribution to the average expected value for each payout value (which is the payout value multiplied by the probability of obtaining that payout value). The average expected value or value component for each secondary bonus award is 3.55172 as illustrated in FIG. 12. More specifically, FIG. 12 illustrates the different payout values, the probability of obtaining each different payout value, and the contribution to the average expected value for each payout value (which is the payout value multiplied by the probability of obtaining that payout value).

In this example, there is one primary bonus award and there are ten possible secondary bonus awards (where all sixty gaming machines are being played and are active when the bonus event occurs). Accordingly, the expected average total bonus value or value component paid out for the maximum number of active gaming machines is (29.2197 for one primary bonus award)+(3.55172×ten secondary awards)=64.7369.

In this example, the bonus event awards (i.e., the primary bonus award and the secondary bonus awards) accounts for 30% or 0.30 of the overall average return for the gaming machines in the system. The 30% is a bonus percentage desired by the game designer which represents the allotment of the total return or average expected payout for the gaming machines in the system which is accounted for as primary bonus awards and secondary bonus awards. This excludes awards or payouts for the primary game and any other secondary games. This percentage can be any suitable amount to fit with the gaming machines of the present invention.

Example of Funding of the Bonus Event and Determination of how Often Bonus Event can Occur As described above, in one embodiment of the present invention, the accumulated wager pool must be sufficiently funded or funded to a designated level to make the first or initial random determination as to whether the bonus event should occur. In one embodiment, the designated level is determined based on the average total bonus pay out for the maximum amount of active gaming machines (which is 64.7369 in this example) divided by the dedicated bonus event percentage of the overall average player return (which is 0.30 in this example). Thus, (64.7369)/(0.30)=215.78966 is the minimum total number of monetary units which must actually be in the accumulated wager pool to allow the bonus event to occur in the example as illustrated in FIG. 13.

In this example, the target average pay of the primary bonus award is 300 monetary units. In other words, on average, this is the amount that the game implementer desires the player who receives the primary bonus award to obtain or receive. It should be appreciated that this amount can vary from this example and that game implementers desire different target amounts for different bonuses.

As 300 is the target average pay of the primary bonus award and 29.2197 is the average pay value or value component per primary bonus award in this example, then (300)/(29.2197) or 10.2670 is the average multiplier which must be employed on average to reach the targeted average primary bonus award of 300.

In this example, since 215.78966 is the total minimum number of monetary units which must be pooled (in the accumulated wager pool) to allow the determination of whether the bonus event will occur and 10.2670 is the average multiplier which must be employed to reach the target average pay of the primary bonus award, then (215.78966)×(10.2670) or 2215.5124 which is rounded to 2216 monetary units is the target average of the accumulated wager pool per bonus award triggered. It should also be appreciated that as described above, the amounts wagered by all of the enrolled gaming machines during the bonus event accumulation period are used as part of the accumulated wager pool in determining the modifier or multiplier even though certain of the enrolled gaming machines may not be active and thus may not be eligible to provide a bonus award.

In this example, the sample rate which is how often the central server will check to see if a bonus event will occur is every 50 monetary units. It should be appreciated that the sample rate could vary. It should also be appreciated that the sample rate could alternately be based on an amount of time. In this example, the probability of the bonus event occurring per sample is determined in the following manner. As the bonus pool must be greater than 215.78966 or 216 monetary units (rounded) to allow a bonus event determination to occur, the total number of monetary units which must be pooled on average to allow the bonus event to occur is the target average of the accumulated wager pool per bonus award triggered (2215.5124 rounded to 2216 in this example) less the minimum total number of monetary units which must actually be pooled to allow the bonus event determination (215.78966 rounded to 216 in this example). Thus, in this example, (2216−216) or 2000 is the average number of the accumulated wager pool which must be used. As 2000 is the average number of the accumulated wager pool which must be used, the probability is determined by dividing the desired sample rate by this average ((50)/(2000)=2.5%) to determine the probability of the bonus event occurring per sample. This probability is used to determine whether the bonus event occurs at each sampling after the minimum level of the accumulated wager pool is reached. It should be appreciated that any suitable method can be used to determine this probability.

Central Server Determination of Modifier for the Primary Bonus Award and the Secondary Bonus Award The central server determines the modifier component, such as the multiplier component, of the primary bonus award and the secondary bonus award for each bonus event based on the accumulated wager pool for that bonus event. The central server will send this modifier or multiplier component to each gaming machine selected to provide the primary bonus award or selected to provide a secondary bonus award. Each selected gaming machine will use the received modifier or multiplier component and respective value component (determined by that gaming machine) to determine or calculate the primary bonus award or the secondary bonus award, respectively.

In one such embodiment, the modifier or multiplier is determined based on a ratio of the expected award to be paid versus the amount in the accumulated wager pool. The continuing example demonstrates this ratio.

As indicated above and in FIGS. 11 and 12, after the bonus event is determined to occur or is triggered, the average expected value or value component of the primary bonus award is 29.2197 monetary units and the average expected value or value component for each secondary bonus award is 3.5517 monetary units. While each selected gaming machine will determine an actual amount for the value component of the award it will provide to the player, these averages are used by the central server to calculate the modifier or multiplier and the remainder.

An expected average bonus payout value is calculated by summing the average expected primary bonus value (29.2197) with the product of the average expected secondary bonus value times the number of secondary bonuses which will be awarded (i.e., 3.55172×(# active gaming machines)/6 (rounded up)). Thus, for (a) only 1 active gaming machine, the bonus payout value will be 29.2197;

(b) 2 to 6 active gaming machines, the bonus payout value will be 32.7714;

(c) 7 to 12 active gaming machines, the bonus payout value will be 36.3231;

(d) 13 to 18 active gaming machines, the bonus payout value will be 39.8749;

(e) 19 to 24 active gaming machines, the bonus payout value will be 43.4266;

(f) 25 to 30 active gaming machines, the bonus payout value will be 46.9783;

(g) 31 to 36 active gaming machines, the bonus payout value will be 50.5300;

(h) 37 to 42 active gaming machines, the bonus payout value will be 54.0817;

(i) 43 to 48 active gaming machines, the bonus payout value will be 57.6335;

(j) 49 to 54 active gaming machines, the bonus payout value will be 61.1852; and (k) 55 to 60 active gaming machines, the bonus payout value will be 64.7369.

The central server determines the multiplier by: (1) dividing the accumulated wager pool by the average expected bonus payout values or value components for the primary and secondary awards of the bonus event; (2) taking into account that the bonus event is 30% of the overall average payout and (3) making the multiplier a whole number or integer. The central server sends each of the selected gaming machines the multiplier component.

Using case (c) above as an example, there is one primary bonus award and two secondary bonus awards (because twelve gaming machines are active). Accordingly, the expected average bonus payout value with one primary bonus award and two secondary bonus awards is 29.2197+(3.55172×2) or 36.3231. This, of course, is less than the maximum expected average bonus payout value of 64.7367 in this example which occurs with one primary bonus award and ten secondary bonus awards as described above.

In this example, as illustrated in FIG. 14, the bonus event occurs when the accumulated wager pool is at 2416 monetary units. In other words, the bonus event occurred, at the fourth determination after the total number of credits wagered per average bonus event of 2216 was reached. This is illustrated in FIG. 14 which has a sample rate or sampling every 50 monetary units after the first 216 monetary units are pooled. It should be appreciated that as explained above the sampling to determine if the bonus event will occur will not start until a minimum level of monetary units is accumulated in the accumulated wager pool. It should also be appreciated that the determination may not and most likely will not occur at each specific pooled amount of monetary or sampling level because different wager amounts are being made at different time intervals on the different gaming machines in the gaming system.

The central server takes into account that only part (i.e., 30% or 0.30) of the overall average payout or return to the player of the gaming machine is accounted for by the bonus event and the rest of the overall average payout or return to the player is accounted for by the primary game as well as other possible payouts or awards, such as a progressive jackpot award, or other secondary or bonus games. Therefore, on average, the coin-in must account for the payout of the bonus event. In this example, the accumulated wager pool is at 2416 monetary units when the central server determines that the bonus event is triggered and the bonus percentage is 0.3, thus the amount of the accumulated wager pool which can account for the bonus event is (2416)×(0.3) or 724.8 monetary units.

The central server determines the multiplier based on this allocated amount of the accumulated wager pool of 724.8 monetary units and the expected average bonus payout for the number of gaming machines selected for this bonus event which is 36.3231 monetary units (as indicated above). In this example, the allocated amount of the accumulated wager pool divided by the expected average bonus payout is (724.8)/(36.3231) or 19.9542. In this example, this amount is rounded down (i.e., truncated) to 19 to determine the multiplier. The multiplier is preferably rounded to avoid a non-integer multiplier which complicates the game for the player and can also lead to fractional credits. Thus, the amount of the allocated portion of the accumulated wager pool and the expected average bonus payout value (i.e., a theoretical amount) is used to determine the multiplier. The central server sends the multiplier of 19 to the gaming machine selected to provide the primary bonus award and each gaming machine selected to provide one of the secondary bonus awards.

The central server also uses the determined multiplier to determine the remainder of monetary units in the accumulated wager pool which are not accounted for in determining the multiplier and thus the awards in the bonus event. In this example, the expected average bonus payout value for the number of gaming machines selected times the multiplier is (36.3231)×(19) or 690.1389 which is the average expected payout for this example bonus event (including the primary bonus awards and secondary bonus awards). This amount is subtracted from the bonus portion of the accumulated wager pool to determine the bonus portion of the remainder which is (724.8)–(690.1389) or 34.6611 monetary units. This amount is then divided by the bonus percentage of the overall payout which is accounted for as bonus awards in the bonus event to determine the remainder of (34.6611)/(0.30) or 115.537 which is rounded to 116 monetary units in this example. This remainder represents the accumulated wager pool level which is necessary to subsequently provide the unallocated portion of the current accumulated wager pool while still maintaining the desired average return (30% here). In this example, a subsequent bonus event will include the 116 monetary units in the accumulated wager pool, 30% of which is 34.8, so the unused portion of a previous accumulated wager pool will be accounted for and dispersed in a subsequent bonus event, thereby preserving the desired average return. The 116 monetary units will remain in the accumulated wager pool for one or more subsequent bonus events. It is important to track the decimal values because this is based on the actual monetary units wagered by the players.

It should be appreciated that this remainder is an average expected remainder because the expected average bonus payout value is used to calculate this remainder. This is necessary to hold the percentage since it is theoretical and allows for volatility and the random feel of the bonus events instead of the pooled payouts.

It should be appreciated that, in one embodiment, the central server determines when to provide the bonus event to the gaming machines based in part on the actual accumulated wager pool. In this embodiment, the selected gaming machines determine the value components of the primary bonus awards and secondary bonus awards and the central server uses the expected average value component and the accumulated wager pool to determine the multiplier. The central server determines the remainder based on the accumulated wager pool and the modifier or multiplier. It should be appreciated that the remainder is based on the expected average value component and not the actual value components used to determine the bonus awards. Accordingly, the remainder added back to the accumulated bonus pool will not be an actual remainder. The accumulated wager pool after the first bonus event will be based on the remainder and the actual number of subsequently wagered monetary units. It should be further appreciated that, in one embodiment, after an initial bonus event, the accumulated wager pool for each subsequent bonus event is based in part on the actual number of monetary unit wagers placed and in part on the theoretical average expected remainder which is carried over from a previous bonus event.

In this example, because the number of active gaming machines is relatively low, the multiplier is relatively high. As the number of active gaming machines increases, the multiplier will decrease. This is in part because the equation accounts for the maximum number of active gaming machines and thus the maximum number of secondary awards.

In certain instances, a gaming machine will provide a negative return and in some instance, a gaming machine will overhold, but in the long run it should balance out. As described above, as the expected average bonus payout amount is employed instead of the actual payout amount, the provided bonus awards can have a great volatility over the short term while providing the player with the average expected values over the long term. That is, as the multiplier component is based, at least in part, on an expected average bonus payout value for the bonus event and not on the actual selected bonus payout values for the bonus event, the determined modifier or multiplier component may at times cause an over hold or an under hold of the actual accumulated wager pool.

An over hold of the actual accumulated wager pool occurs when the selected gaming machine(s) provide less primary and secondary bonus awards than the gaming system should theoretically provide as primary and secondary bonus awards based on the percentage of the overall paytable allocated to be paid out as primary and secondary bonus awards. For example, using the calculations described above and illustrated in FIG. 13, if sixty gaming machines are active and the central server determines that a bonus event will occur when the accumulated wager pool has reached 2250 monetary units, then the central server will determine a multiplier component of 10 (rounded from 10.4268) or (2250×0.3)/64.7369. If the gaming machines selected to provide the primary bonus award and the ten secondary bonus awards each select a payout of 1, then the primary bonus award will be 10 monetary units and each secondary bonus award will be 10 monetary units. In this example, the total bonus awards provided in the bonus event will be 110 monetary units which is significantly less than the 675 (i.e., 2250×0.3) monetary units which should theoretically be provided as the primary and secondary bonus awards. Accordingly, this example causes an over hold for the selected gaming machine of 565 monetary units. In other words, a low value component coupled with a low multiplier may cause an over hold of the actual accumulated wager pool to occur. These credits are not returned to the pool because the following scenario can occur.

On the other hand, an under hold of the actual accumulated wager pool occurs when the selected gaming machine(s) provide more primary and secondary bonus awards than the gaming system should theoretically provide as primary and secondary bonus awards based on the percentage of the overall average payout to be paid out as primary and secondary bonus awards. For example, using the calculations described above and illustrated in FIG. 13, if only one gaming machine is active and the central server determines that a bonus event will occur when the accumulated wager pool has reached 2600 monetary units, then the central server will determine a multiplier component of 26 (rounded from the 26.6943) or (2600×0.3)/29.2197. If the gaming machine selected to provide the primary bonus award selects a payout of 100, then the primary bonus award will be 2600 monetary units. In this example, the total bonus award provided in the bonus event of 2600 monetary units is significantly more than the 780 (i.e., 2600×0.3) monetary units which should theoretically be provided as the primary and secondary bonus awards. Accordingly, this example causes an under hold by the gaming machine of 1820 monetary units. In other words, a high value component coupled with a high multiplier may cause an under hold of the actual accumulated wager pool to occur. It should be appreciated that while these instances of over holding and under holding may occur and increase volatility of the payouts of the gaming system, over the long term play of the gaming system, the payouts will theoretically equate with the average expected payouts illustrated above and desired by the game implementer.

In one embodiment, any unaccepted awards become part of the remainder that is returned to or remains in the accumulated wager pool for a subsequent bonus event. For example, if a gaming machine is selected to provide a primary award, but the player of that gaming machine, not knowing that the gaming machine has been selected and they will achieve a bonus event on the next play, leaves the selected gaming machine prior to that play, the primary award is unaccepted and returned to the accumulated wager pool as part of the remainder. In another embodiment, no secondary awards may be provided to any players of gaming machines of the gaming system until the primary award is provided to a player of a gaming machine of the gaming system. For example, if one gaming machine is selected to provide a primary award, at least another gaming machine is selected to provide a secondary award and the player of the gaming machine selected to provide the primary award cashes out and leaves the selected gaming machine, then the primary award is unaccepted and thus no secondary awards may be provided to any players either. In another embodiment, if a primary award is unaccepted, then a gaming machine selected to provide a secondary award is selected to provide the unaccepted primary award. For example, if one gaming machine is selected to provide a primary award, one gaming machine is selected to provide a secondary award and the player of the gaming machine selected to provide the primary award cashes out and leaves the selected gaming machine, then the primary award is unaccepted and the player of the gaming machine selected to provide a secondary award is provided the unaccepted primary award. In such an embodiment, the secondary award may or may not also be provided to the player of the gaming machine selected to provide a secondary award.

FIGS. 15, 16*a*, 16*b*, 16*c* and 17 illustrate an example of the present invention wherein four players are playing four gaming machines enrolled in the gaming system. In this example, upon the first player(s) initiating game play on system gaming machine(s), a first bonus event accumulation period begins as indicated by block 302 in FIG. 15. In this example, as seen in FIG. 16*a*, Player A is playing at a $2 denomination gaming machine 14*a* at an average rate of one play of the primary game every twenty seconds and Player B is playing at a $1 denomination machine gaming machine 14*b* at an average rate of one play of the primary game every fifteen seconds. The amounts wagered at the enrolled gaming machines in the system are tracked by the central server and accumulated in an accumulated wager pool as indicated by block 304 of FIG. 15. It should be appreciated that even though Player A and Player B are playing different denomination gaming machines, the system equates and tracks each player's wagers in terms of monetary units. In this example, each penny or $0.01 wagered at a gaming machine in the system is equivalent to one monetary unit. Thus, in this example, the system equates and tracks one play of gaming machine 14*a* by Player A as two-hundred monetary units and one play of gaming machine 14*b* by Player B is equated to and tracked as one-hundred monetary units.

Figure 15:
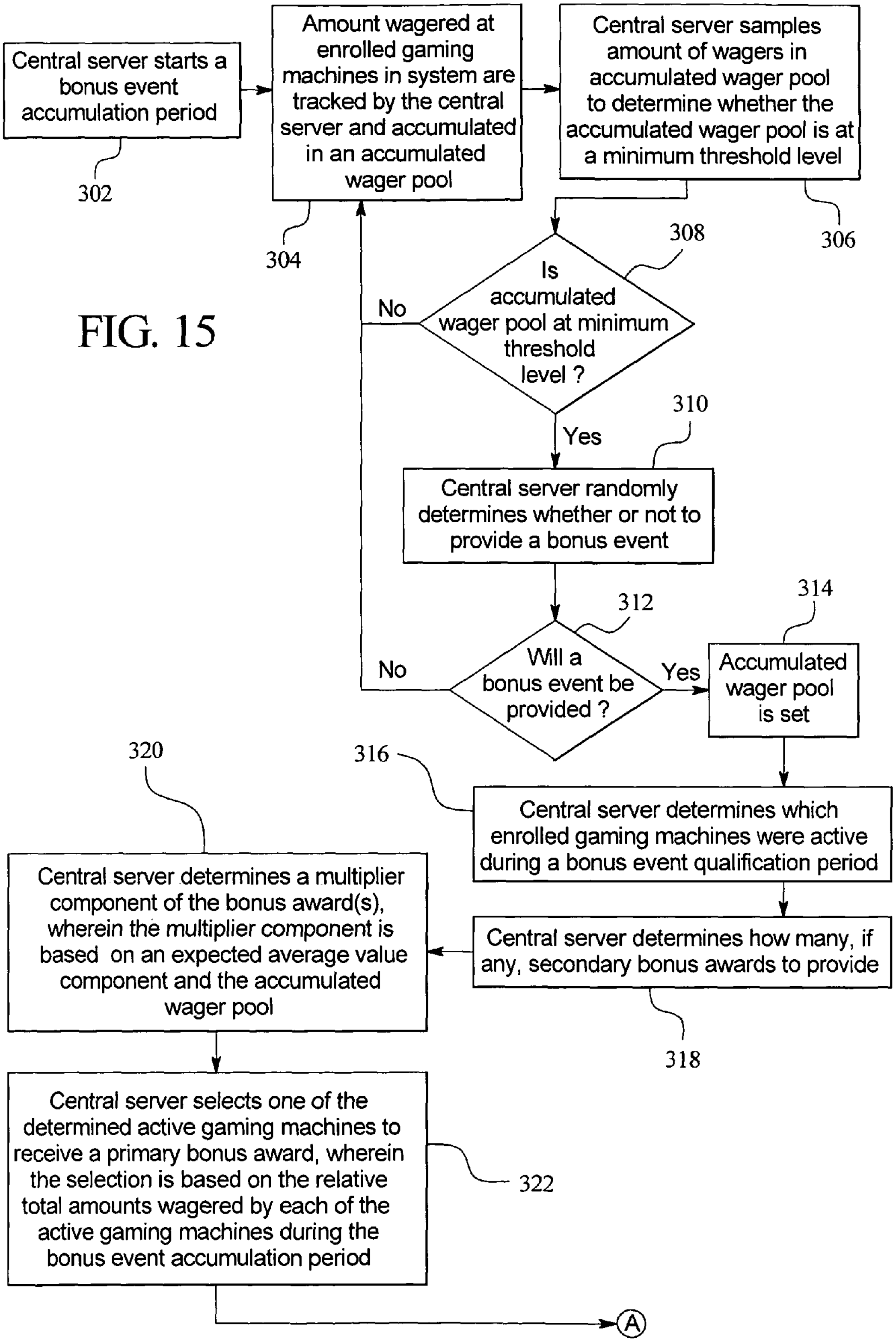
FIG. 15 is a flowchart of a one embodiment of the present invention illustrating the beginning of a bonus event accumulation period to the providing of one or more bonus awards.
Figure 15:
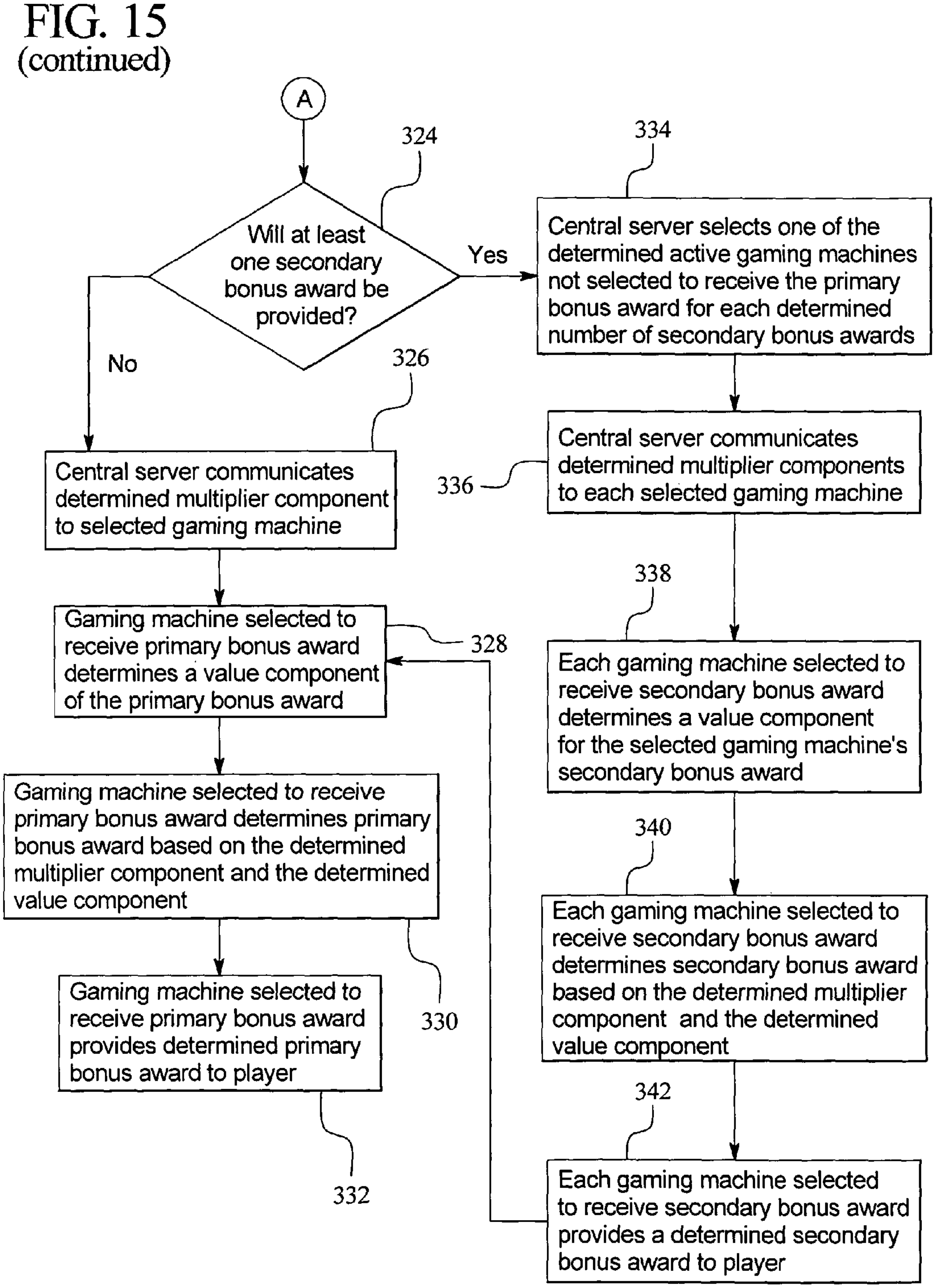
Figure 17:
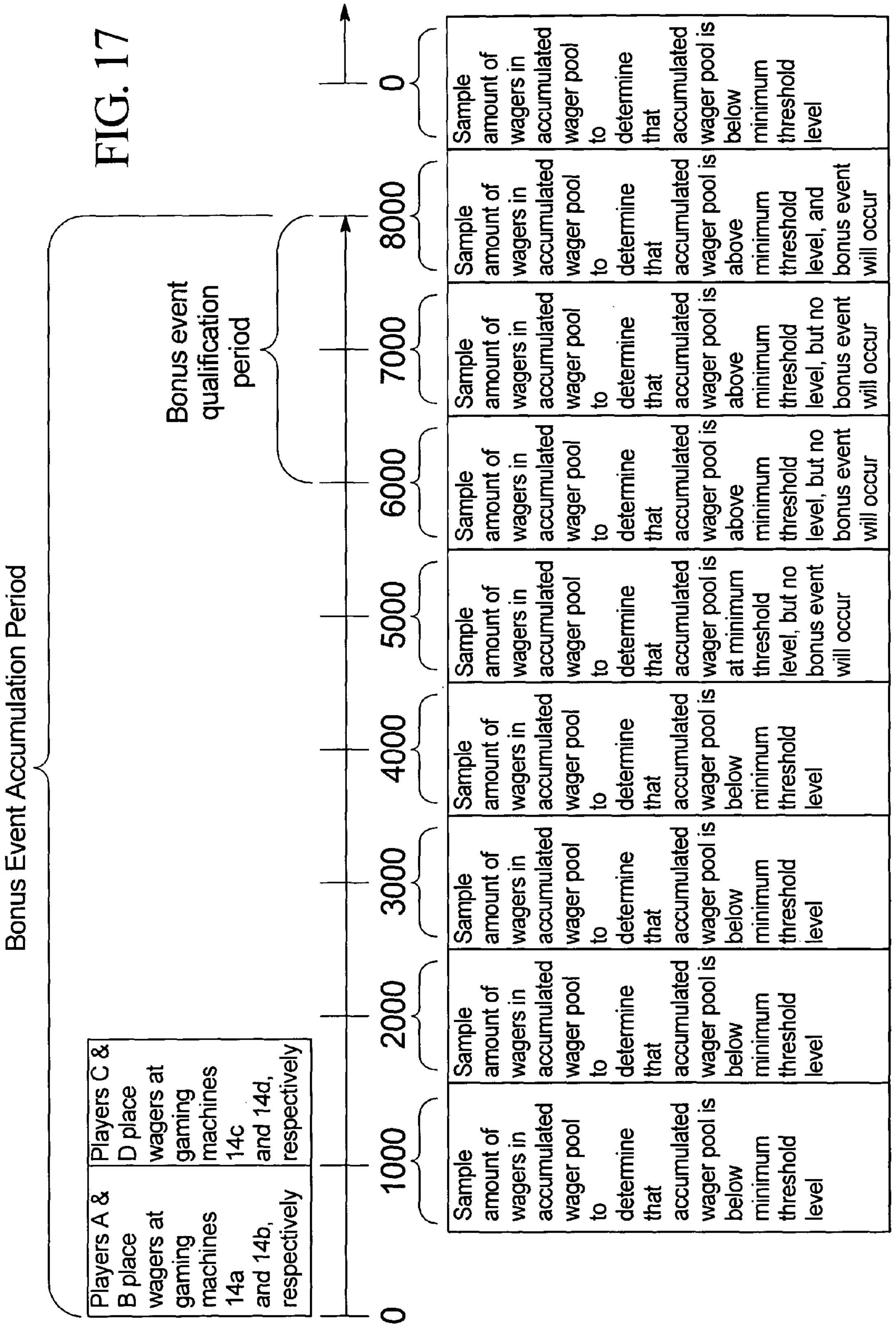
FIG. 17 is a timeline illustrating the example of FIGS. 16*a*, 16*b* and 16*c* of one embodiment of the present invention.

At regular intervals, the central server samples the amount of monetary units wagered in the accumulated wager pool to determine whether the accumulated wager pool is at or above a minimum threshold level as indicated by block 306 and diamond 308 of FIG. 15. In this example, the sampling rate is every one-thousand monetary units wagered and the minimum threshold level is five-thousand monetary units wagered. As illustrated in the timeline of FIG. 17, after Player A has wagered six-hundred monetary units and Player B has wagered four-hundred monetary units, a total of one-thousand monetary units has been wagered or placed into the accumulated wager pool. As the accumulated wager pool is not at or above the predefined minimum threshold level, the central server determines that a bonus event will not occur and the bonus event accumulation period continues as indicated in block 304 of FIG. 15.

As illustrated in FIGS. 16*a* and 17, when the current accumulated wager pool is at one-thousand wagered units, Player C begins playing at a $0.50 denomination gaming machine 14*c* at an average rate of one play of the primary game every ten seconds and Player D begins playing at a $0.10 denomination gaming machine 14*d* at an average rate of one play of the primary game every six seconds. As described above, even though the four gaming machines each enable play at different denominations, the central server equates and tracks each player's wagers in terms of wagered units or monetary units (i.e., wherein each $0.01 wagered equals one monetary unit) and thus one play of gaming machine 14*c* by Player C is tracked as fifty monetary units and one play of gaming machine 14*d* by Player D is tracked as ten monetary units.

In this example, after another thousand monetary units are wagered (i.e., the accumulated wager pool grows to two-thousand accumulated monetary units), the central server again samples the accumulated wager pool to determine if the accumulated wager pool is at or above the predefined threshold level of five-thousand monetary units. As the accumulated wager pool is not at or above the predefined threshold level, the central server determines that a bonus event will not occur and the bonus event accumulation period continues.

As seen in FIG. 17, this process of sampling the accumulated wager pool every thousand wagered monetary units continues as described above until the central server determines that the accumulated wager pool has reached at least the predefined threshold level of five-thousand wagered units. At this point, the central server randomly determines whether or not to provide a bonus event as indicated in block 310 and diamond 312 of FIG. 15. As described above, after the minimum level of the accumulated wager pool is reached, the central server utilizes a determined probability of the bonus event occurring per sample to determine whether or not to provide a bonus event. In this example, after five-thousand wagered units are accumulated in the accumulated wager pool (i.e., the predefined threshold level is reached), the central server determines that a bonus event will not occur based on the probability determination and the bonus event accumulation period continues as indicated in block 304 of FIG. 15.

After another one-thousand monetary units are wagered (i.e., the accumulated wager pool grows to six-thousand accumulated monetary units), the central server again samples the accumulated wager pool to determine if the accumulated wager pool is at or above the predefined threshold level of five-thousand units. As the accumulated wager pool is at six-thousand units which is above the predefined threshold level, the central server randomly determines whether or not to provide a bonus event based on the probability determination. In this example, the central sever determines not to provide a bonus event and thus the bonus event accumulation period continues with the amounts wagered at the four gaming machines funding the accumulated wager pool.

As illustrated in FIG. 17, after another one-thousand monetary units are wagered (i.e., the accumulated wager pool grows to seven-thousand accumulated monetary units), the central server again samples the accumulated wager pool to determine if the accumulated wager pool is at or above the predefined threshold level of five-thousand units. As the accumulated wager pool is at seven-thousand units which is above the predefined threshold level, the central server randomly determines whether or not to provide a bonus event based on the probability determination. In this example, the central sever determines not to provide a bonus event and the bonus event accumulation period continues.

After another one-thousand monetary units are wagered (i.e., the accumulated wager pool grows to eight-thousand accumulated monetary units), the central server again samples the accumulated wager pool to determine if the accumulated wager pool is at or above the predefined threshold level of five-thousand units. As the accumulated wager pool is at eight-thousand units which is above the predefined threshold level, the central server randomly determines whether or not to provide a bonus event. In this example, the central sever determines to provide a bonus event and thus the accumulated wager pool is set or closed as indicated by block 314 of FIG. 15. Once the accumulated wager pool is set or closed, any subsequent wagers by the enrolled gaming machines will be applied toward a subsequent accumulated wager pool and not the set or closed accumulated wager pool. As seen in FIG. 17, after the accumulated wager pool is set or closed, a subsequent accumulated wager pool begins or opens with an initial accumulated amount of zero wagers. The central sever will sample this accumulated wager pool at regular intervals to determine whether the accumulated wager pool is at or above a minimum threshold level as described above.

After the accumulated wager pool is set or closed, the central server determines which of the four enrolled gaming machines were active during a bonus event qualification period as indicated by block 316 of FIG. 15. In this example, the bonus event qualification period is the thirty seconds prior to the determination that a bonus event will occur. In this example, a gaming machine is considered in active status when, during the bonus event qualification period, a player has made at least four plays of the primary game regardless of the amount wagered or the player has wagered a minimum of two-hundred units in the primary game. In this embodiment, a gaming machine is being actively played if one of two separate criteria (i.e., the minimum amount wagered requirement or the minimum frequency of wagers placed requirement) are satisfied. However, it should be appreciated that, as described above, any number of different criteria alone or in combination may be employed in accordance with the present invention. For example, a gaming machine may be considered in active status when a player has played at least one primary game in the ten or fifteen seconds preceding the determination to provide a bonus event.

In this example, as illustrated in FIG. 16*a*, since one wager for two-hundred monetary units (i.e., one $2 wager) was placed at gaming machine 14*a* during the thirty seconds prior to the determination that a bonus event will occur, the central server determines that gaming machine 14*a* was in active status (i.e., satisfied the minimum amount wagered requirement) during the bonus event qualification period. Since two wagers for one-hundred monetary units each (i.e., two $1 wagers) were placed at gaming machine 14*b* during the thirty seconds prior to the determination that a bonus event will occur, the central server determines that gaming machine 14*b* was in active status (i.e., satisfied the minimum amount wagered requirement) during the bonus event qualification period. Since three wagers for fifty monetary units each (i.e., three $0.50 wagers) were placed at gaming machine 14*c* during the thirty seconds prior to the determination that a bonus event will occur, the central server determines that gaming machine 14*c* was not in active status (i.e., did not satisfy the minimum amount wagered requirement or the minimum frequency of wagers placed requirement) during the bonus event qualification period. Since five wagers for ten monetary units each (i.e., five $0.10 wagers) were placed at gaming machine 14*d* during the thirty seconds prior to the determination that a bonus event will occur, the central server determines that gaming machine 14*d* was in active status (i.e., satisfied the frequency of wagers placed requirement) during the bonus event qualification period.

After determining which of the enrolled gaming machines were in active status during the bonus event qualification period, the central server next determines how many, if any, secondary bonus awards will be provided for this bonus event as indicated by block 318 of FIG. 15. In this example, as described above, since there are between two and six active gaming machines, one secondary bonus award will be provided for this bonus event.

After determining how many bonus awards to provide for this bonus event, the central server determines a modifier or multiplier component for the bonus awards to be provided as indicated by block 320 of FIG. 15. As described above, the central server determines the multiplier component based on the expected average value component (which is itself based on the number of bonus awards to be provided) and the accumulated wager pool. In this example, the central server determined a multiplier component of 15×.

After determining a modifier or multiplier component, the central server selects one the determined active gaming machines to receive a primary bonus award as indicated by block 322 of FIG. 15. The central server's selection of one of the active gamine machines is based on the relative total amounts of monetary units wagered by each of the active gaming machines during the bonus event accumulation period. For example, as illustrated in FIG. 16*b*, as gaming machines 14*a*, 14*b*, and 14*d* are active, the player(s) on gaming machine 14*a* wagered three-thousand-six-hundred monetary units during the bonus event accumulation period, the player(s) on gaming machine 14*b* wagered two-thousand-four-hundred monetary units during the bonus event accumulation period and the player(s) on gaming machine 14*d* wagered five-hundred monetary units during the bonus event accumulation period, the applicable accumulation wager pool is six-thousand-five-hundred monetary units. It should be appreciated that, as described above, unless each enrolled gaming machine was active during the bonus event qualification period, the total amount wagered during the bonus event accumulation period will not correspond with the applicable amount wagered during the bonus event accumulation period (which only includes the amounts wagered at active gaming machines).

In this example, based on the relative total amounts of monetary units wagered by each of the active gaming machines during the bonus event accumulation period, the probabilities for being awarded the primary bonus award for gaming machine 14*a* is 55% (i.e., 3600/6500), for gaming machine 14*b* is 37% (i.e., 2400/6500) and for gaming machine 14*d* is 8% (i.e., 500/6500). With these determined probabilities and one or more random number generators or random number generating algorithms, the central server will select one of the active gaming machines to provide the primary bonus award. In this example, based on these determined probabilities, the central server selected gaming machine 14*a* to provide the primary bonus award. It should be appreciated that in this example, as more monetary units were wagered at gaming machine 14*a* during the bonus event accumulation period, gaming machine 14*a* has the greatest odds or probability of being selected to provide the primary bonus award. That is, even though significantly more primary games were played at gaming machine 14*d* during the bonus event accumulation period, the central server accounts for the wager in monetary units of each play as well as the number of primary games played in determining the odds of which gaming machine will be selected to provide the primary bonus award.

If at least one secondary bonus award will not be provided to the player for this bonus event, the central server communicates the determined modifier or multiplier component to the selected gaming machine as indicated by diamond 324 and block 326 of FIG. 15. The gaming machine selected to provide the primary bonus award then determines a value component of the primary bonus award as indicated by block 328 of FIG. 15. As described above, each gaming machine determines each value component based on the probabilities associated with each of the possible value components. That is, each of the possible value components or payout values is associated with a probability and the gaming machine selects one of the possible value components or payout values based on these probabilities. As indicated by block 330 of FIG. 15, the gaming machine selected to receive the primary bonus award next determines the primary bonus award based on the determined modifier or multiplier component and the determined value component. The primary bonus award is then provided to the player of the selected gaming machine as indicated by block 332 of FIG. 15 and this bonus event is complete.

For illustration purposes, if at least one secondary bonus award will not be provided to the player for this bonus event (i.e., only one gaming machine is active), the central server would communicate the multiplier component of 15× to selected gaming machine 14*a*. Gaming machine 14*a* would then select a value component of ten and determine a primary bonus award of one-hundred-fifty based on multiplying the determined value component of ten by the determined multiplier of 15×. This determined primary bonus award of one-hundred-fifty would be provided to the player of gaming machine 14*a* and this bonus event would be complete.

On the other hand, if the central server previously determined that at least one secondary bonus award will be provided to the player for this bonus event, the central server selects one of the determined active gaming machines (not previously selected to receive the primary bonus award) for each secondary bonus award to be provided, as indicated by diamond 324 and block 334 of FIG. 15. In this example, the central server will automatically select the gaming machine with the highest applicable amount of monetary units wagered during the accumulation period which was not selected to receive the primary bonus award. As seen in FIGS. 16*b* and 16*c*, in this example, with a wager equated to two-thousand-four-hundred monetary units, gaming machine 14*b* wagered the highest applicable amount of monetary units during the accumulation period without being selected to provide the primary bonus award and thus gaming machine 14*b* is associated with a 100% probability of being selected for the secondary bonus award. Accordingly, based on associated probability, gaming machine 14*b* is selected to provide the one determined secondary bonus award.

The central server then communicates the determined multiplier component to the selected gaming machine as indicated by block 336 of FIG. 15. In this example, the central server would communicate the determined multiplier of 15× to each of the selected gaming machines 14*a* and 14*b*. It should be appreciated that if at least one secondary bonus award will be provided, the central server communicates the determined multiplier to each gaming machine selected to provide a secondary bonus award as well as the gaming machine selected to provide the primary bonus award.

Each of the gaming machines selected to provide a secondary bonus award individually determines a value component for the secondary bonus award they will provide as indicated by block 338 of FIG. 15. As described above, each gaming machine determines each value component based on the probabilities associated with each of the possible secondary bonus award value components. In this example, gaming machine 14*b* selects the value component of five based on the probabilities associated with each of the possible secondary bonus award value components.

As indicated by block 340 of FIG. 15, each gaming machine selected to provide a secondary bonus award next determines the secondary bonus award they will provide based on the determined modifier or multiplier component and the value component that the gaming device determined. In this example, for the one secondary bonus award provided, gaming machine 14*b* would determine a secondary bonus award of seventy-five based on multiplying the determined value component of five by the determined multiplier of 15×. Each gaming machine selected to provide a secondary bonus award then provides the player of that selected gaming machine the determined secondary bonus award as indicated by block 342 of FIG. 15.

It should be appreciated that as each gaming device selected to provide a secondary bonus award individually determines the value component which will be modified by the central server determined modifier, there may be significant differences in value between any two or more secondary bonus awards. For example, if a first gaming machine selects the secondary bonus award value component of one and a second gaming machine selects the secondary bonus award value component of ten, then using the central server determined multiplier component of 15×, the first gaming machine will be provided a secondary bonus award of fifteen while the second gaming machine will be provided a secondary bonus award of one-hundred-fifty.

Along with each secondary bonus award provided to the player, the gaming machine selected to provide the primary bonus award to a player also determines and provides a primary bonus award to a player as indicated by block 328 of FIG. 15. While the determination of a primary bonus award is illustrated as occurring after the determination of each of the secondary bonus awards, it should be appreciated that the determination of the primary bonus award may occur prior to, simultaneous with or after the determination of each secondary bonus award.

In the above embodiment, a single modifier or multiplier is determined and sent by the controller to each gaming machine which is selected to provide a bonus award (i.e., a primary bonus award or a secondary bonus award) to the player of that selected gaming machine. In the alternative embodiment where all of the active gaming machines are selected to provide a bonus award, the modifier or multiplier for each active gaming machine can equal the ratio or relative percentage of wager amounts for that gaming machine. The single modifier or multiplier can be divided into a plurality of individual gaming machine modifiers or multipliers. This division can be based on the relative percentages of the wagers of such gaming machines during the bonus event accumulation period. These are the same ratios used to determine which gaming machine will be selected to provide the primary bonus award as described above.

In one example of this embodiment, the multiplier is determined to be 20× and there are three active gaming machines in the system. The relative percentages of wagered amounts and the split of the multiplier component is illustrated below:

| Gaming Machine | Percentage of Wagers | Multiplier |
|---|---|---|
| 14a | 50% | 10X |
| 14b | 30% | 6X |
| 14z | 20% | 4X |

In this embodiment, one table instead of two can be employed to determine the value components for the primary and secondary awards determined by each of the active gaming machines because the individual modifiers or multipliers account for the different award levels.

Cap for Modifier Component

In one embodiment, the gaming system includes a cap for the bonus modifier or multiplier. In the above example, the cap is 200. This prevents the gaming machines from overflowing the bonus displays or awarding a jackpot larger than desired. In the example, if the total wagered meter results in a bonus multiplier of 210, only the maximum multiplier of 200 will be sent to the gaming machine which wins the primary bonus award and the extra 10 times the bonus award value will be part of the remainder that is returned to the accumulated wager pool for a subsequent bonus event. In one embodiment, the controller can guarantee that a bonus event will occur after enough monetary units are accumulated in the accumulated wager pool such that the maximum multiplier will be determined by the controller.

Accumulated Wager Pool Resetting After Bonus Event

As mentioned above, in one embodiment, after each bonus event, the accumulated wager pool is reset to a remainder value based on any unaccounted for monetary units in determining the modifier component of the bonus award. In one embodiment, the enrolled gaming machines wager meters are also zeroed out regardless of whether such machines were active or not at the occurrence of the bonus event. In another embodiment, the wager meters are not zeroed out and/or respectively include a percentage of the previous wager meters.

It should also be appreciated that the present invention contemplates other methods for increasing the individual gaming machine meters or changing the percentage the gaming machine has in being selected to provide a bonus award. For instance, the gaming system can allow the players to place one or more side wagers or additional wagers to have a greater relative percentage of obtaining the primary bonus award or the secondary bonus award.

Wager Levels

In one alternative embodiment of the present invention, a minimum wager level is required for a gaming machine to qualify to be selected to obtain the primary award or be considered in the determination of which gaming machine is active and thus may be selected to obtain the primary award. In one embodiment, this minimum wager level is the maximum wager level for the primary game in the gaming machine. This requirement is in addition to the requirement that the gaming machine be active to qualify for the determination of which gaming machine will be selected to obtain the primary award.

In another alternative embodiment of the present invention, a minimum wager level is required for a gaming machine to qualify to be selected to obtain one of the secondary bonus awards or be considered in the determination of which gaming machines are active and thus may be selected to obtain the secondary bonus awards. In one embodiment, this minimum wager level is the maximum wager level for the primary game in the gaming machine. This requirement is in addition to the requirement that the gaming machine be active to qualify for the determination of which gaming machine will be selected to obtain the primary award.

Another method for determining if the gaming machine is active is whether or not the player has wagered a minimum level of monetary units since the occurrence of the last bonus event.

Awards can be Provided in Conjunction with a Primary or Secondary Game

In the above described embodiments of the present invention, the gaming machines do not provide any apparent reasons to the players for obtaining the primary or secondary bonus awards. In alternative embodiments, the bonus awards can be triggered by an event in or based specifically on a play of a primary game or a play of a secondary game of the gaming machines selected to provide the primary or secondary bonus award.

In one alternative embodiment, the bonus awards are accounted for as part of the average payouts instead of being accounted for based on the accumulated wager pool. In this embodiment, the accumulated wager pool is still employed to determine when the bonus event is triggered and which gaming machines will be selected to provide the bonus award(s). However, the accumulated wager pool is not employed to determine the amount of the bonus award and particularly not the amount of a bonus modifier or multiplier component. In this embodiment, there is no need for a minimum threshold level for determining if the bonus event determination can be made. In other words, the central server can immediately start checking at the interval of the sampling rate whether to provide a bonus event. In this alternative embodiment, the gaming system does not have to employ a minimum threshold to trigger the bonus event because the bonus award is accounted for directly in the paytables of the gaming machines of the gaming system instead of by the accumulated wager pool. It should also be appreciated that the bonus awards could be fixed or predetermined amounts.

In another embodiment, a bonus award may be based, at least in part, on the occurrence of one or more events at one gaming machine and also, at least in part, on a determination by a central controller based on a plurality of gaming machines in a gaming system. In certain such embodiments, upon a secondary or bonus game triggering event, a secondary or bonus game is triggered. In this embodiment, the secondary or bonus game proceeds and a secondary game award or bonus game award is determined based on the play of the secondary or bonus game. Additionally, the play of the secondary or bonus game determines which of any of a plurality of bonus awards may be provided to the player, wherein, as described above, the plurality of bonus awards are determined, at least in part, by the amounts wagered at a plurality of gaming machines in the gaming system. Accordingly, the total award provided to the player is based on: (i) any determined secondary game award or bonus game award determined during the play of the secondary or bonus game; and (ii) one of a plurality of bonus awards which is selected based on the play of the secondary or bonus game, wherein the amounts of the plurality of bonus awards are determined, at least in part, by a central controller.

For example, if the secondary or bonus game is a free game or free activation game, the player may be provided a designated number of free games, such as free spins. During each free game, the gaming device determines any free game awards associated with any generated winning symbol combinations and the gaming device may or may not accumulate any designated symbols. After each of the designated number of free games are provided to the player, the gaming machine determines, based on the accumulated number of designated symbols, which of any of a plurality of bonus awards, such as which of any of a plurality of progressive awards, to provide to the player. That is, designated symbols (or points associated with designated symbols) accumulate during the free games and a progressive award level is determined based on the number of accumulated designated symbols (or accumulated points). The determined bonus award and any determined free game awards are combined to be provided to the player as one overall award. It should be appreciated that as the plurality of bonus awards are determined by the central controller, which of those bonus awards the player may be provided is determined, at least in part, based on one or more events at one of the gaming machines in the gaming system and any determined free game awards are determined based on one or more events at one of the gaming machines in the gaming system, in this embodiment, the overall award is determined, at least partially based on a determination at a central controller (i.e., the progressive award) and at least partially based on a determination during a free game sequence at a gaming machine (i.e., the free game sequence award).

In another embodiment wherein the symbols generated by the gaming device function in determining both the free game awards and which of a plurality of progressive awards to provide to the player, one, more or each of the reels include locking symbols. In this embodiment, when a locking symbol is generated on a reel, the reel which generated the locking symbols is locked for the remainder of the free game. When each of the provided free games have been played, in addition to any determined free game awards, one of a plurality of bonus awards (i.e., one of a plurality of progressive awards) is provided to the player based on the number of locked reels. In another embodiment with locking symbols, each of the reels is associated with a different bonus award/progressive award. In this embodiment, when a locking symbol is generated on a reel, in addition to any determined free game awards, the bonus award/progressive award associated with the reel which generated the locking symbol is provided to the player. It should be appreciated that any suitable manner of determining an award may be implemented, wherein part of the award is determined by a central controller and part of the award is determined by an individual gaming device.

Progressive Award Embodiment

In one embodiment, the bonus event includes a progressive award. In one embodiment, the bonus awards include a plurality of progressive awards. The progressive awards are associated with the system gaming machines which each contribute portions of the progressive awards. The multiple gaming machines may be in the same bank of machines, in the same casino or gaming establishment such as through LAN or in two or more different casinos or gaming establishments such as through a WAN. It should thus be appreciated that in one or more embodiments, the controller may also function as a progressive controller.

In one embodiment, the progressive awards start at different levels such as \$10, \$100, \$1000 and \$10,000. This is directly funded in a conventional manner. The progressive awards accumulate based on a small percentage (such as 0.1%) of coin-in or wagered amounts in a conventional manner. In one embodiment, the percentage that goes to each progressive award is equal (such as 0.1% to each of four progressive awards). In other embodiments, two or more of the progressive awards may be funded by different percentages.

In one embodiment, when the bonus event occurs, the central server determines one of the active gaming machines to provide one of the progressive awards in the same manner as described above. The central server determines which active gaming machine to give the progressive award to based on the weighted average of the wagers placed for the active gaming machines as in the above embodiment. Alternatively, the gaming system could employ a suitable alternative method for selecting which gaming machine will provide the progressive award. In one embodiment, the gaming system includes a symbol driven progressive jackpot award for the gaming machines. In another embodiment, one of the progressive awards is provided to one of the gaming machines in the system as part of a bonus game triggered in a subsequent play of the primary game. In other words, after the central server determines that a bonus event will occur, the bonus event is provided to the selected active gaming machine as a bonus event or as part of a bonus event triggered from a subsequently played primary game.

Figure 18:
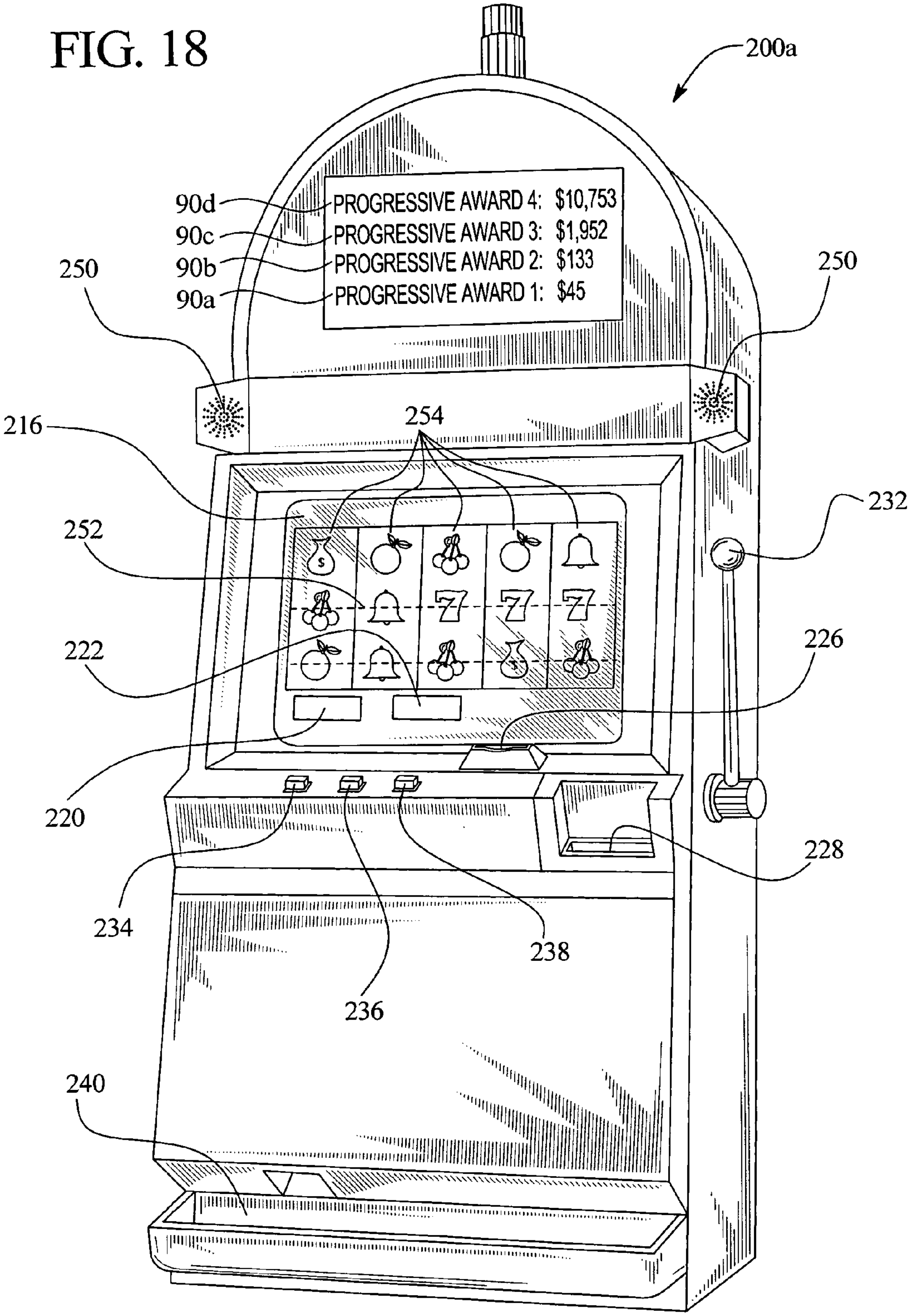
FIG. 18 is a perspective view of a gaming machine having a display which displays a plurality of progressive awards of one embodiment of the present invention.

As generally illustrated in FIG. 18, in one embodiment of the present invention which includes progressive awards, the bonus outcome or how well a player does in the bonus game will determine which progressive award is provided to the player from the plurality of progressive awards 90*a*, 90*b*, 90*c* and 90*d*. In one embodiment, if the bonus outcome is at a first level, the first progressive award 90*a* is provided to the player, if the bonus outcome is at a second level, the second progressive award 90*b* is provided to the player, if the bonus outcome is at a third level, the third progressive award 90*c* is provided to the player and if the bonus outcome is at a fourth level, the fourth progressive award 90*d* is provided to the player. In one embodiment, each level from level 1 to level 4 is harder for the player to obtain or is less likely to occur. The progressive award at each respective level is larger or at least initially funded in at a greater denomination. It should be appreciated that any suitable bonus game including free games, such as free spins, may be implemented to determine which level and accordingly, which progressive award is provided to the player.

In one embodiment, the central server continues to increase the progressive levels until the progressive award is actually won by a player. It should be appreciated that in one embodiment, the progressive meters continue to increment because the central server does not determine which award to provide to the selected gaming machine but as described above, which progressive award is provided to the selected gaming machine is determined based on the play of a subsequent bonus game. In this embodiment, because the progressive awards continue to increase until they are actually won by the player, a player may wait to allow the progressive awards to increase after the player triggers the bonus game. To encourage a player to finish or complete the bonus game and obtain one of the progressive awards, a suitable encouragement mechanism may be employed in accordance with the present invention. One way to encourage the player to play the bonus game quickly after it is triggered (and obtain one of the progressive awards) is to provide that another gaming machine in the system can be awarded another or subsequent bonus event by the central server and win one of the progressive awards. Therefore, the second player can win one of the higher progressive awards. After the second player wins one of the progressive awards, that progressive award would be reset to the minimum amount for that progressive award level. Therefore, the first player would have a lower average expected award because one of the progressive awards has been reset to the starting value for that level.

For example, if based on the probability of being selected for a bonus award as described above in relation to FIGS. 16*a* and 16*b*, gaming machine 14*b* is selected to obtain one of the progressive awards, then a suitable bonus event will be triggered during a subsequently played primary game at gaming machine 14*b*. After the triggering of the bonus event, gaming machine 14*b* enables the player to play a bonus or secondary game wherein one of a plurality of different outcomes will be provided to the player in the secondary game. The secondary game includes a plurality of different outcomes wherein each different outcome is associated with a probability of being provided to the player. For example, secondary game outcome A is associated with a 40% probability of being provided to the player, secondary game outcome B is associated with a 30% probability of being provided to the player, secondary game outcome C is associated with a 20% probability of being provided to the player and secondary game outcome D is associated with a 10% probability of being provided to the player. In the secondary game, each different outcome corresponds or is associated with one of a plurality of progressive awards. For example, secondary game outcome A is associated with progressive award 1, secondary game outcome B is associated with progressive award 2, secondary game outcome C is associated with progressive award 3 and secondary game outcome D is associated with progressive award 4. As each progressive award corresponds with a secondary game outcome which is associated with a probability, each progressive award is associated with a probability of being provided to the player. It should be appreciated that in this example, the secondary game outcome with the highest probability of being selected is associated with the lowest progressive award, while the secondary game outcome with the lowest probability of being selected is associated with the highest progressive award.

In operation, the player plays the provided bonus or secondary game and based on the associated probabilities, one of the plurality of outcomes is provided to the player. The progressive award corresponding with the provided outcome is provided to the player and the secondary game ends. In this example, the player of gaming machine 14*b* obtained secondary game outcome B in the secondary game and thus the player was provided progressive award 2 which, as illustrated in FIG. 18, was at an amount of $133. It should be appreciated that after the progressive award is provided to the player, the central server resets the provided progressive award to a determined initially funded amount.

In one embodiment, the gaming system must payout at least the base or reset value of the progressive award when a bonus event is hit because at least this base progressive value is built into the paytable of the gaming system. A potential problem arises if a gaming machine is selected to provide the bonus award and the player of that gaming machine does not know that the gaming machine has been selected. For instance, the player may cash out because the player does not know the player will achieve a bonus event on the next play and thus may not play the next primary game where the player would trigger a bonus game in which the bonus amount would be determined. In such a case, the central server picks another gaming machine to provide the bonus event. This can be done randomly or in any other suitable manner. In one embodiment, the player with the highest accumulated number of monetary units during the bonus event accumulation period can receive the bonus event. In another embodiment, this determination can be suitably weighted. In an alternative embodiment, the first player to play one of the gaming machines in the system is awarded the bonus event. In one embodiment, the central server informs the player of the selected gaming device that the player will receive one of the progressive awards.

For example, if based on the example described above, the gaming system determines that gaming machine 14*b* will be provided one of the plurality of progressive awards during a subsequent play of the primary game. The player of gaming machine 14*b* has however cashed out of gaming machine 14*b* prior to any subsequent play of the primary game (with no other player initiating game play at gaming machine 14*b*). In this case, as the gaming system must payout at least one of the plurality of progressive awards (as required by the paytable of the gaming system), the gaming system must select another one of the gaming machines in the gaming system to provide one of the plurality of progressive awards. In this example, based on the probability of being selected for a bonus award as described above in FIGS. 16*a* and 16*b*, the central server selects gaming device 14*a* to be provided one of the plurality of progressive awards. Accordingly, on a subsequent play of a primary game at gaming machine 14*a*, the central server causes a secondary game triggering event to occur. The secondary game is played and based on the secondary game outcome obtained in the secondary game, one of the plurality of progressive awards is provided to the player as described above.

In one embodiment, a bonus event may be pending if no gaming machines in the system are active or being played. Thus, a new player of one of the gaming machines in the system can achieve the pending bonus award on that player's first play of the primary game on one of the gaming machines in the system.

In one alternative embodiment, the gaming machines require an additional wager to fund the bonus awards or progressives awards. For example, the accumulated wager pool is funded, at least partially, via a side-bet or side-wager which the player may make (and which is tracked, in one embodiment, via a side-bet meter). In one embodiment, the accumulated wager pool is funded with only side-bets or side-wagers placed. In another embodiment, the accumulated wager pool is funded based on player's wagers as described above as well as any side-bets or side-wagers placed. In another embodiment, a gaming machine can only be active if such additional wager is made by the player. In this embodiment, a side-bet or side-wager must be placed (and tracked via a side-bet meter) at a gaming machine of the gaming system for that gaming machine to be classified as in the active state.

It should be appreciated that this embodiment eliminates the need for the modifier or multiplier component because fixed starting values for the progressive award are built into the paytables and the minimum amounts are guaranteed to be paid out. Therefore, monetary units do not have to be rolled back into the accumulated wager pool to increase a subsequent modifier or multiplier and no remainder needs to be calculated and added to the accumulated wager pool.

It should also be appreciated that this alternative embodiment does not need to include any secondary bonus awards. However, one or more secondary bonus awards may be employed in this embodiment in accordance with the present invention.

It should further be appreciated that the gaming system of the present invention could determine to provide one or more of the progressive bonus awards simultaneously to multiple different gaming machines in the system. This could create a competitive gaming environment where players are competing to obtain the different progressive bonus awards.

In a further embodiment, one or more additional progressive awards may be provided by the system based on certain inputs by the players or other factors. In one such embodiment, if the player which receives the bonus event has made a designated minimum wager amount, such as the maximum wager, the gaming system can provide the player a chance to receive a further progressive award, such as a fifth progressive award in the above example. This could be provided automatically or upon the occurrence of a designated event or condition. This allows for even higher awards, such as higher progressive awards of over $1,000,000.

Additional Progressive Jackpot Award

The central server tracks the progressive increment and sends the value to a gaming machine when the central server determines that a progressive award has been won on a gaming machine. In another alternative embodiment, an additional progressive award such as a jackpot award (e.g., progressive award starting at $1,000,000 or more) may be employed in the gaming system of the present invention. In one such embodiment, this level is only available if a designated wager level was made, such as the maximum wager. In one embodiment, this additional progressive award is employed as a fifth progressive award level in the multiple progressive award level described above. It can be won through the random bonus or other suitable methods.

Information Provided to Player

As indicated above, the bonus awards can be completely mystery bonus awards provided to the players of the gaming machines with or without explanation or information provided to the player, or alternatively can be displayed to the player, such as the progressive awards in FIG. 18. In one embodiment, such as the embodiment with the progressive awards, suitable information about the bonus awards can be provided to the players through one or more displays on the gaming machines or additional information displays positioned near the gaming machines, such as above a bank of system gaming machines.

This information can be used to entertain the player or inform the player that a bonus event has occurred or will occur. Examples of such information are:

(1) that a bonus event has occurred;

(2) that a bonus event will shortly occur (i.e., foreshadowing the bonus event);

(3) that one or more bonus awards have been provided to one or more players of the system gaming machines;

(4) that one or more bonus awards will be shortly provided to one or more players of the system gaming machines;

(5) which gaming machines have won the bonus awards such as the primary award, secondary awards or progressive awards;

(6) the amount of the bonus awards won;

(7) the amount of the bonus awards that can be won such as the progressive awards; and (8) the level that an active bonus is at.

It should be appreciated that such information can be provided to the players through any suitable audio, audio-visual or visual devices.

Multiple Bonus Award Pools with Thresholds

In an alternative embodiment, rather than utilizing a multiplier component and a value component to determine a primary bonus award, the gaming system utilizes a plurality of different predefined bonus award pools to determine a primary bonus award. Each bonus award pool includes a plurality of different bonus awards which are each associated with a probability of being selected. In this embodiment, each bonus award pool is associated with a different threshold or range of wagers accumulated in the accumulated wager pool. In one embodiment, the greater the accumulated amount in the accumulated wager pool, the greater the average expected primary bonus award of the bonus pool utilized to determine the primary bonus award. The following is an example of a pool structure in accordance with one such embodiment:

| Accumulated Wager Pool | Bonus Award Pool Used |
|---|---|
| 0-300 | A |
| 301-600 | B |
| 601-900 | C |
| 1200+ | D |

| Prize | Probability | Contribution |
|---|---|---|
| Pool A Average Expected Primary Bonus Award: 100 | | |
| 50 | 0.33333 | 16.666667 |
| 100 | 0.33333 | 33.333333 |
| 150 | 0.33333 | 50 |
| Pool B Average Expected Primary Bonus Award: 200 | | |
| 50 | 0.33333 | 16.666667 |
| 200 | 0.33333 | 66.666667 |
| 350 | 0.33333 | 116.66667 |
| Pool C Average Expected Primary Bonus Award: 300 | | |
| 100 | 0.33333 | 33.333333 |
| 300 | 0.33333 | 100 |
| 500 | 0.33333 | 166.66667 |
| Pool D Average Expected Primary Bonus Award: 400 | | |
| 200 | 0.33333 | 66.666667 |
| 400 | 0.33333 | 133.33333 |
| 600 | 0.33333 | 200 |

In operation of this embodiment, when a bonus event is determined to occur, the central server selects one of the bonus award pools. The selected bonus award pool is based on the amount of accumulated wagers in the accumulated wager pool. For example, as illustrated above, if the accumulated wager pool is at 630, the central server selects Pool C.

In one embodiment, the central server communicates data regarding the determined bonus award pool to a selected gaming device. In this embodiment, the selected gaming device then selects one of the primary bonus awards based on the probabilities associated with each primary bonus award in the communicated bonus award pool and provides the selected primary bonus award to the player. For example, the central server communicates data regarding Pool C and the selected gaming device selects, based on the probabilities of the primary bonus awards in Pool C, a primary bonus award of 500 to provide to the player of the selected gaming device. In another embodiment, the central server selects one of the primary bonus awards from the determined bonus award pool and communicates the selected primary bonus award to the selected gaming device to provide to the player of the selected gaming device. In these embodiment, while the primary bonus award is based on awards selected from predefined bonus award pools, the determination of which predefined bonus award pool to utilize is based on the accumulated wager pool and thus the primary bonus award is determined, at least in part, on the wagers accumulated in the accumulated wager pool.

General

Gaming Machines and Electronics of Gaming System

Figure 19A:
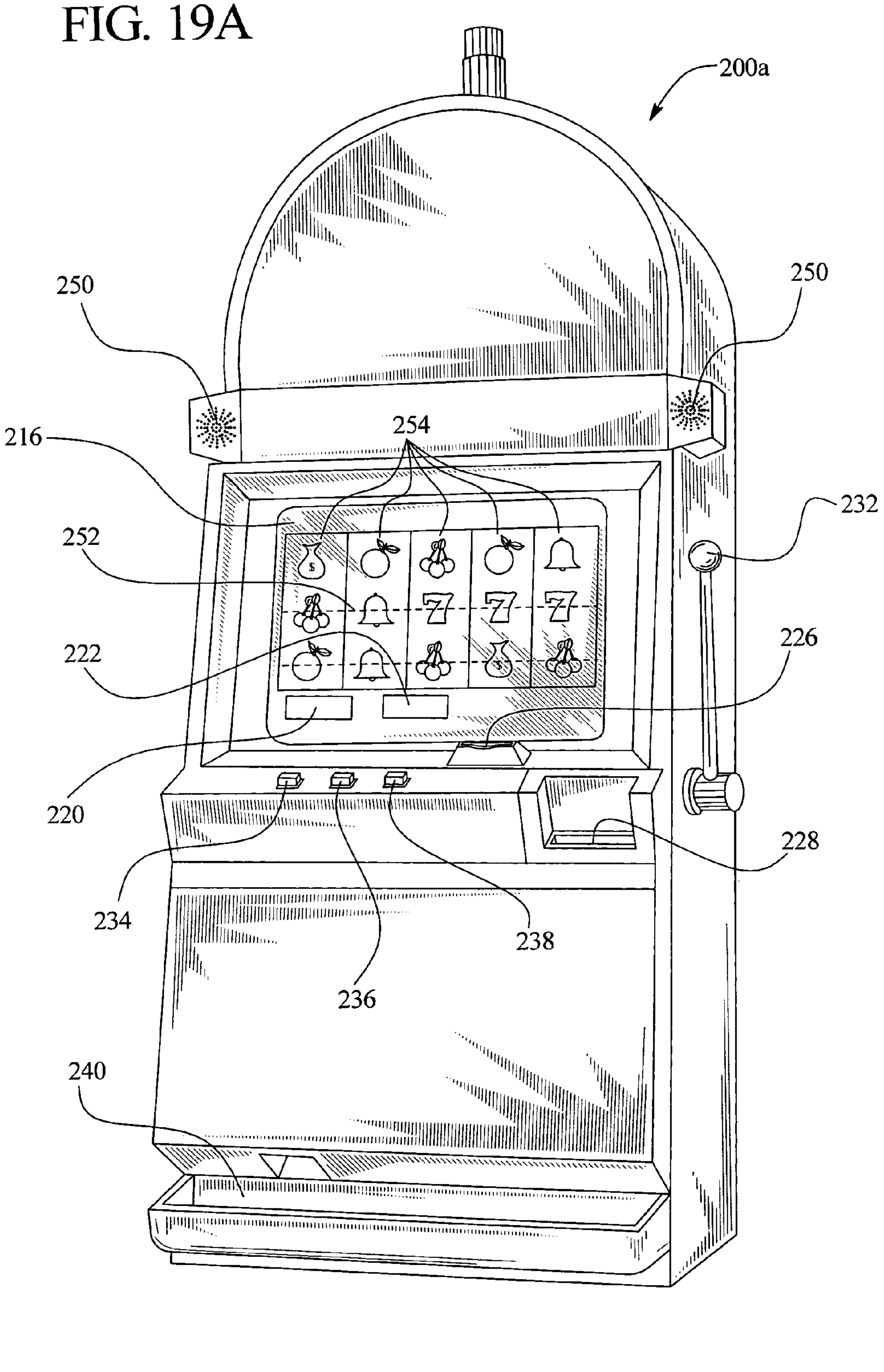
FIGS. 19A and 19B are front perspective views of alternative embodiments of gaming machines of one embodiment of the present invention.
Figure 19B:
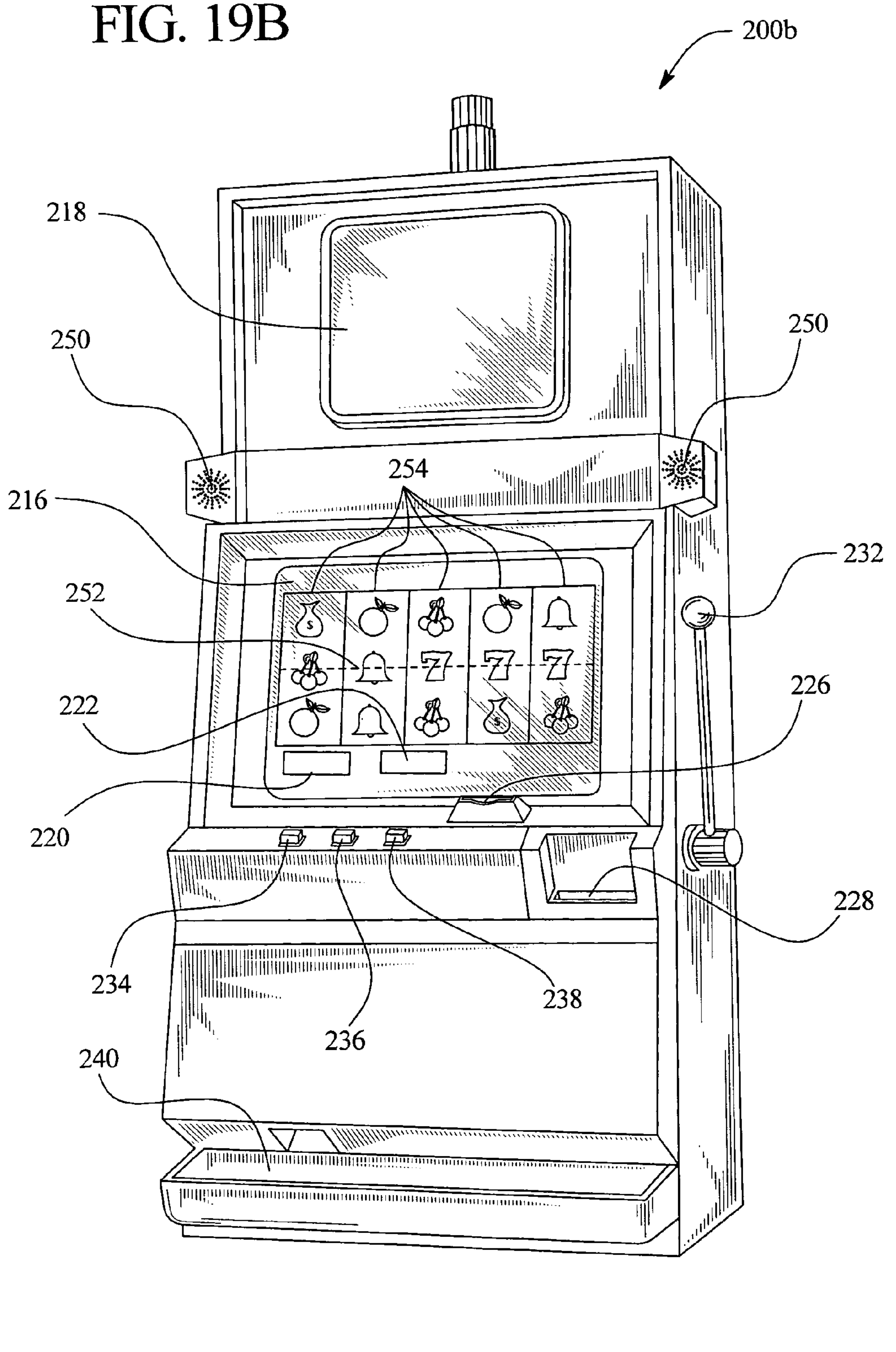

Two alternative embodiments of the gaming machines of the present invention are generally illustrated in FIGS. 19A and 19B as gaming machine 200*a* and gaming machine 200*b*, respectively. Gaming machine 200*a* and/or gaming machine 200*b* are generally referred to herein as gaming machine 200.

In one embodiment, as illustrated in FIGS. 19A and 19B, each gaming machine 200 has a support structure, housing or cabinet which provides support for a plurality of displays, inputs, controls and other features of a conventional gaming machine. It is configured so that a player can operate it while standing or sitting. The gaming machine may be positioned on a base or stand or can be configured as a pub-style table-top game (not shown) which a player can operate preferably while sitting. As illustrated by the different configurations shown in FIGS. 19A and 19B, the gaming machine can be constructed with varying cabinet and display configurations.

Figure 20:
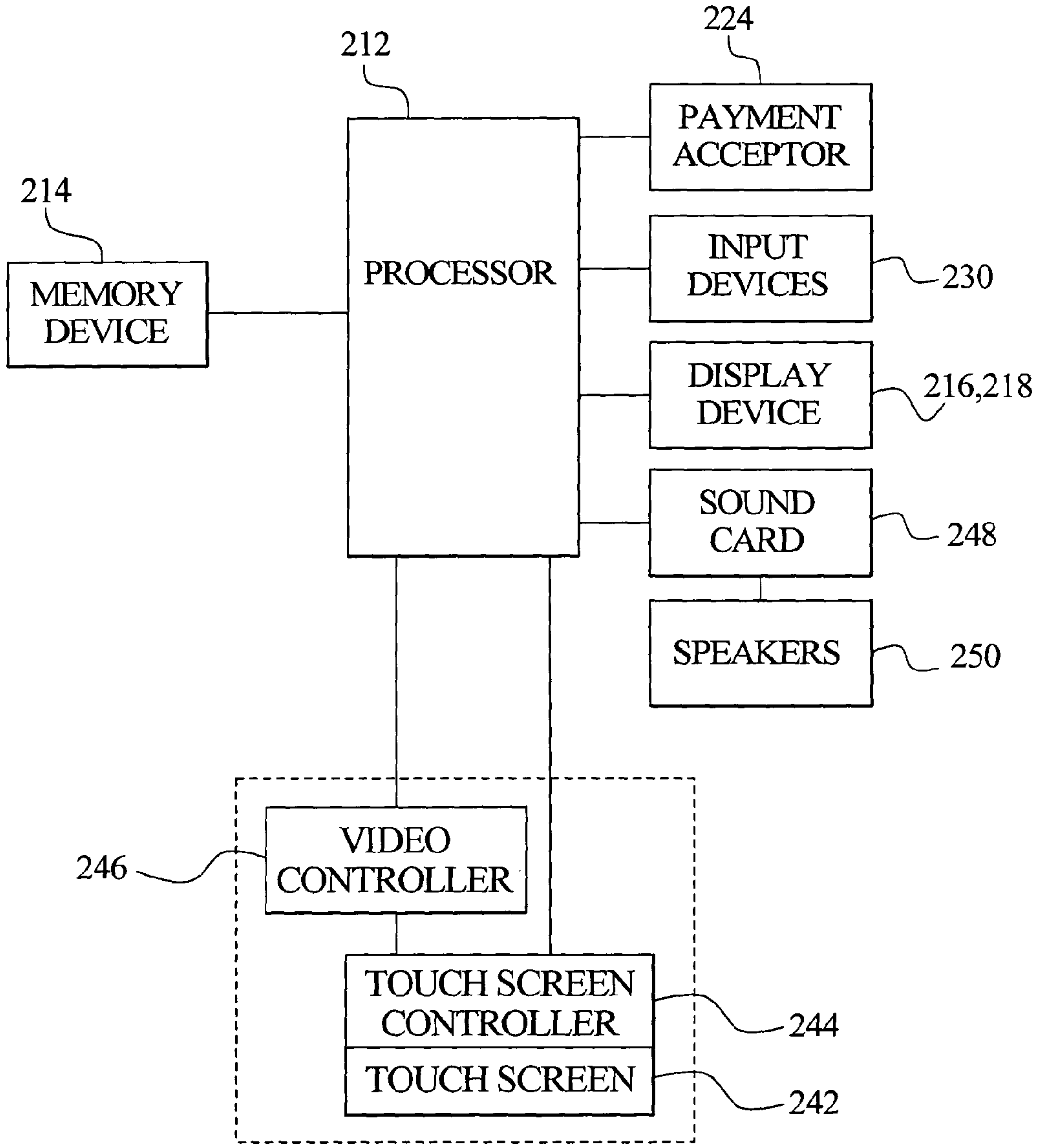
FIG. 20 is a schematic block diagram of the electronic configuration of one embodiment of a gaming machine of the present invention.

In one embodiment, as illustrated in FIG. 20, each gaming machine preferably includes at least one processor 212, such as a microprocessor, a microcontroller-based platform, a suitable integrated circuit or one or more application-specific integrated circuits (ASIC's). The processor is in communication with or operable to access or to exchange signals with at least one data storage or memory device 214. In one embodiment, the processor and the memory device reside within the cabinet of the gaming machine. The memory device stores program code and instructions, executable by the processor, to control the gaming machine. The memory device also stores other data such as image data, event data, player input data, random or pseudo-random number generators, paytable data or information and applicable game rules that relate to the play of the gaming machine. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming machine of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer."

In one embodiment, as discussed in more detail below, the gaming machine randomly generates awards and/or other game outcomes for the primary game based on probability data. That is, each award or other game outcome for the primary game is associated with a probability and the gaming machine generates the award or other game outcome to be provided to the player based on the associated probabilities. In this embodiment, since the gaming machine generates outcomes randomly or based upon a probability calculation, there is no certainty that the gaming machine will ever provide the player with any specific award or other game outcome for the primary game.

In another embodiment, as discussed in more detail below, the gaming machine employs a predetermined or finite set or pool of awards or other game outcomes. In this embodiment, as each award or other game outcome is provided to the player, the gaming machine removes the provided award or other game outcome from the predetermined set or pool. Once removed from the set or pool, the specific provided award or other game outcome cannot be provided to the player again. This type of gaming machine provides players with all of the available awards or other game outcomes over the course of the play cycle and guarantees the amount of actual wins and losses.

It should be appreciated that the present invention may be employed in a central determination system where a central controller picks the outcome from a pool of outcomes. In one such embodiment, after the central server determines an outcome for a gaming machine, the gaming system will store such outcome until that gaming machine is selected to receive the bonus event and the selected gaming machine makes a request for an outcome.

In one embodiment, as illustrated in FIG. 19A, the gaming machine 200*a* includes one or more display devices controlled by the processor. The display devices are preferably connected to or mounted to the cabinet of the gaming machine. The embodiment shown in FIG. 19A includes a central display device 216 which displays a primary game. This display device may also display any suitable secondary game associated with the primary game as well as information relating to the primary or secondary game. The alternative embodiment shown in FIG. 19B includes a central display device 216 and an upper display device 218. The upper display device may display the primary game, any suitable secondary game associated with the primary game and/or information relating to the primary or secondary game. As seen in FIGS. 19A and 19B, in one embodiment, the gaming machines includes a credit display 220 which displays a player's current number of credits, cash, account balance or the equivalent. In one embodiment, the gaming machine includes a bet display 222 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming machine are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 20, in one embodiment, the gaming machine includes at least one payment acceptor 224 in communication with the processor. As seen in FIGS. 19A and 19B, the payment acceptor may include a coin slot 226 and a payment, note or bill acceptor 228, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming machine. In one embodiment, the identification card is a smart card having a programmed microchip or a magnetic strip coded with a player's identification, credit totals and other relevant information. In one embodiment, money may be transferred to a gaming machine through electronic funds transfer. When a player funds the gaming machine, the processor determines the amount of funds entered and the corresponding amount is shown on the credit or other suitable display as described above.

As seen in FIGS. 19A, 19B and 20, in one embodiment the gaming machine includes at least one and preferably a plurality of input devices 230 in communication with the processor. The input devices can include any suitable device which enables the player to produce an input signal which is read by the processor. In one embodiment, after appropriate funding of the gaming machine, the input device is a game activation device, such as a pull arm 232 or a play button 234 which is used by the player to start any primary game or sequence of events in the gaming machine. The play button can be any suitable play activator such as a bet one button, a max bet button or a repeat the bet button. In one embodiment, upon appropriate funding, the gaming machine begins the game play automatically. In another embodiment, upon the player engaging one of the play buttons, the gaming machine automatically activates game play.

In one embodiment, as shown in FIGS. 19A and 19B, one input device is a bet one button 236. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming machine.

In one embodiment, one input device is a cash out button 238. The player may push the cash out button and cash out to receive a cash payment or other suitable form of payment corresponding to the number of remaining credits. In one embodiment, when the player cashes out, the player receives the coins or tokens in a coin payout tray 240. In one embodiment, when the player cashes out, the player may receive other payout mechanisms such as tickets or credit slips redeemable by a cashier or funding to the player's electronically recordable identification card.

In one embodiment, as mentioned above and seen in FIG. 20, one input device is a touch-screen 242 coupled with a touch-screen controller 244, or some other touch-sensitive display overlay to allow for player interaction with the images on the display. The touch-screen and the touch-screen controller are connected to a video controller 246. A player can make decisions and input signals into the gaming machine by touching touch-screen at the appropriate places.

The gaming machine may further includes a plurality of communication ports for enabling communication of the processor with external peripherals, such as external video sources, expansion buses, game or other displays, an SCSI port or a key pad.

In one embodiment, as seen in FIG. 20, the gaming machine includes a sound generating device controlled by one or more sounds cards 248 which function in conjunction with the processor. In one embodiment, the sound generating device includes at least one and preferably a plurality of speakers 250 or other sound generating hardware and/or software for generating sounds, such as playing music for the primary and/or secondary game or for other modes of the gaming machine, such as an attract mode. In one embodiment, the gaming machine provides dynamic sounds coupled with attractive multimedia images displayed on one or more of the display devices to provide an audio-visual representation or to otherwise display full-motion video with sound to attract players to the gaming machine. During idle periods, the gaming machine may display a sequence of audio and/or visual attraction messages to attract potential players to the gaming machine. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming machine and/or the surrounding area of the gaming machine. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

As indicated above and as illustrated in FIG. 1, two or more of the gaming machines of the present invention are connected through a data network or a remote communication link. The processor of each gaming machine is designed to facilitate transmission of signals between the individual gaming machine and the central server or controller.

The plurality of the gaming machines of the present invention are capable of being linked through a data network. In one embodiment, the data network is a local area network (LAN), in which one or more of the gaming machines are substantially proximate to each other and an on-site central server or controller as in, for example, a gaming establishment or a portion of a gaming establishment. In another embodiment, the data network is a wide area network (WAN) in which one or more of the gaming machines are in communication with at least one off-site central server or controller. In this embodiment, the plurality of gaming machines may be located in a different part of the gaming establishment or within a different gaming establishment than the off-site central server or controller. Thus, the WAN may include an off-site central server or controller and an off-site gaming machine located within gaming establishments in the same geographic area, such as a city or state. The WAN gaming system of the present invention may be substantially identical to the LAN gaming system described above, although the number of gaming machines in each system may vary relative to each other.

In another embodiment, the data network is an internet or intranet. In this embodiment, the operation of the gaming machine can be viewed at the gaming machine with at least one internet browser. In this embodiment, operation of the gaming machine and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming machines at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming machines distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming machine hardware and software and the host site computer.

In one embodiment, as illustrated in FIGS. 19A and 19B, a base or primary game may be a slot game with one or more paylines 252. The paylines may be horizontal, vertical, circular, diagonal, angled or any combination thereof. In this embodiment, the gaming device displays at least one and preferably a plurality of reels 254, such as three to five reels 254 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 254 are in video form, the plurality of simulated video reels 254 are displayed on one or more of the display devices as described above. Each reel 254 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active payline or otherwise occur in a winning pattern.

In one embodiment, a base or primary game may be a poker game wherein the gaming machine enables the player to play a conventional game of video poker and initially deals five cards all face up from a virtual deck of fifty-two card deck. Cards may be dealt as in a traditional game of cards or in the case of the gaming machine, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, the secondary game may be any type of suitable game, either similar to or completely different from the base or primary game. In one embodiment, the gaming machine includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 19A and 19B. In another embodiment, the triggering event or qualifying condition may be by exceeding a certain amount of game play (number of games, number of credits, amount of time), reaching a specified number of points earned during game play or as a random award.

In one embodiment, once a player has qualified for a secondary game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A gaming system comprising a plurality of gaming machines, each gaming machine including:
  at least one input device;
  at least one display device;
  at least one processor; and
  at least one memory device which stores a plurality of instructions, which when executed by the at least one processor cause the at least one processor to operate with the at least one display device and the at least one input device to:
    (a) enable a player to place a wager to play wagering game, and
    (b) for the play of the wagering game:
      (i) randomly generate a wagering game outcome,
      (ii) determine any wagering game award associated with the randomly generated wagering game outcome,
      (iii) display any determined wagering game award, and
      (iv) provide any determined wagering game award;

a controller configured to communicate with the plurality of gaming machines, the controller programmed to:
  (a) maintain an accumulated wager pool, the accumulated wager pool based at least in part on any of the wagers placed on any of the plays of the wagering games of the gaming machines; and
  (b) determine that a bonus event will occur;

wherein after the controller determines that the bonus event will occur, the controller and the plurality of gaming machines are programmed to display and provide a bonus award to the player of a selected one of the gaming machines, said bonus award determined based on:
  (i) a value component determined by the selected gaming machine wherein said value component is independent of the accumulated wager pool and independent of any of the wagering game outcomes generated in any of the plays of any of the wagering games of any of the gaming machines, and
  (ii) one of a plurality of different possible multiplier components determined by the controller, said determination based in part on an accumulated amount in the accumulated wager pool.

2. The gaming system of claim 1, wherein the determination by the controller that the bonus event will occur is independent of any event in any of the plays of any of the wagering games or of any plays of any non-wagering games of the gaming machines.

3. The gaming system of claim 1, wherein if the bonus event is determined to occur, the controller is programmed to: (a) determine which of the gaming machines were in an active state during a bonus event qualification period for said bonus event; and (b) select at least one of the gaming machines in the active state.

4. The gaming system of claim 3, wherein the controller is programmed to:
  (a) for each gaming machine, maintain a total of the wagers placed on the plays of the wagering games of said gaming machine during a bonus event accumulation period;
  (b) maintain the accumulated wager pool including a total of the wagers placed on the plays of the wagering games of all of gaming machines during the bonus event accumulation period; and
  (c) determine, at designated intervals during the bonus event accumulation period, if the bonus event will occur.

5. The gaming system of claim 4, wherein if the bonus event is determined to occur, the controller is programmed to select at least one of the gaming machines in the active state to provide said bonus award, wherein said selection is determined based on the total wagers placed during the bonus event accumulation period for each gaming machine in the active state relative to a total of the wagers placed for all of said gaming machines in the active state during the bonus event accumulation period.

6. The gaming system of claim 5, wherein if at least two of the gaming machines are each in the active state, the controller is programmed to select at least one of said gaming machines in the active state to provide a secondary bonus award, wherein said selection excludes the gaming machine selected to provide the bonus award and a number of secondary bonus awards provided is less than a total number of gaming machines in the active state.

7. The gaming system of claim 5, wherein if at least two gaming machines are each in the active state, the controller is programmed to determine a number of secondary bonus awards based on the number of active gaming machines, said determined number being less than the number of active gaming machines.

8. The gaming system of claim 4, wherein the controller is programmed to determine which of the gaming machines were in the active state during the bonus event qualification period by determining for each gaming machine if any wagers were placed on any of the plays of any of the wagering games of that gaming machine during the bonus event qualification period.

9. The gaming system of claim 4, wherein the controller is programmed to determine which of the gaming machines were in the active state during the bonus event qualification period by determining for each gaming machine if any wagers of a designated wager level were placed on any of the plays of any of the wagering games of that gaming machine during the bonus event qualification period.

10. The gaming system of claim 4, wherein the controller is programmed to determine which of the gaming machines were in the active state during the bonus event qualification period by determining for each gaming machine if a designated number of wagers were placed on the plays of the wagering games of that gaming machine during the bonus event qualification period.

11. The gaming system of claim 4, wherein the designated intervals are time based.

12. The gaming system of claim 4, wherein the designated intervals are based on the accumulated wager pool.

13. The gaming system of claim 1, wherein the accumulated wager pool includes any remainder from a previous bonus event accumulated wager pool.

14. The gaming system of claim 1, wherein the at least one processor of one of the gaming machines functions as the controller.

15. The gaming system of claim 1, wherein at least two of said wagering games of at least two of the plurality of gaming machines are different.

16. The gaming system of claim 1, wherein said controller and at least one of said gaming machines are at different remote locations.

* * * * *

UNITED STATES PATENT AND TRADEMARK OFFICE

CERTIFICATE OF CORRECTION

PATENT NO. : 7,854,654 B2
APPLICATION NO. : 11/204101
DATED : December 21, 2010
INVENTOR(S) : Baerlocher et al.

It is certified that error appears in the above-identified patent and that said Letters Patent is hereby corrected as shown below:

In Claim 1, column 55, line 34, replace “play wagering” with --play a wagering--.

Signed and Sealed this
Eighth Day of March, 2011

David J. Kappos
*Director of the United States Patent and Trademark Office*